(12) United States Patent
Kawabata et al.

(10) Patent No.: US 6,555,985 B1
(45) Date of Patent: Apr. 29, 2003

(54) STEPPING MOTOR CONTROL DEVICE

(75) Inventors: Tohru Kawabata, Osaka (JP);
Yoshihiro Mushika, Osaka (JP);
Osamu Kajino, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/831,474
(22) PCT Filed: Nov. 12, 1999
(86) PCT No.: PCT/JP99/06321
§ 371 (c)(1),
(2), (4) Date: Jul. 11, 2001
(87) PCT Pub. No.: WO00/30244
PCT Pub. Date: May 25, 2000

(30) Foreign Application Priority Data

| Nov. 12, 1998 | (JP) | 10-322282 |
| May 31, 1999 | (JP) | 11-152565 |
| Jun. 2, 1999 | (JP) | 11-155312 |

(51) Int. Cl.$^7$ .................................................. G05B 19/40
(52) U.S. Cl. ....................... 318/685; 318/138; 318/254; 318/432; 318/434; 318/696; 360/78.13
(58) Field of Search ............................... 318/138, 685, 318/254, 432, 434, 696; 360/78.13, 78.04

(56) References Cited

U.S. PATENT DOCUMENTS

| 4,330,739 A | * | 5/1982 | Chiang | 318/696 |
| 4,761,598 A | * | 8/1988 | Lovrenich | 318/685 |
| 4,963,808 A | * | 10/1990 | Torisawa | 318/685 |
| 5,150,030 A | * | 9/1992 | Ito et al. | 318/811 |
| 5,196,777 A | * | 3/1993 | Kataoka | 318/696 |
| 5,291,111 A | * | 3/1994 | Hirano | 318/563 |
| 5,428,284 A | * | 6/1995 | Kaneda et al. | 318/778 |
| 5,670,855 A | * | 9/1997 | Okunishi | 318/696 |
| 5,844,394 A | * | 12/1998 | Mushika et al. | 318/696 |
| 5,963,006 A | * | 10/1999 | Otani | 318/696 |
| 6,016,044 A | * | 1/2000 | Holdaway | 318/696 |
| 6,034,500 A | * | 3/2000 | Nagase et al. | 318/685 |
| 6,100,662 A | * | 8/2000 | Hansen | 318/685 |
| 6,121,745 A | * | 9/2000 | Komm | 318/696 |
| 6,147,832 A | * | 11/2000 | Kano | 360/78.13 |
| 6,222,340 B1 | * | 4/2001 | Kawabata et al. | 318/685 |

FOREIGN PATENT DOCUMENTS

| JP | 63-035208 | * | 1/1988 | H02P/8/00 |
| JP | 0313046 A1 | * | 10/1988 | H02P/8/00 |
| JP | 8-331896 | * | 12/1996 | H02P/8/14 |

\* cited by examiner

*Primary Examiner*—Robert E. Nappi
*Assistant Examiner*—Tyrone Smith
(74) *Attorney, Agent, or Firm*—Renner, Otto, Boisselle & Sklar

(57) ABSTRACT

In a stepping motor control method using an encoder, a timer means is provided, and an excessive advance of a phase during low rotation is restricted to attain a high speed without compromising stability during low rotation by driving the motor in such a manner that a pre-reversal state is recovered a predetermined time after a voltage reversal and a post-reversal state is recovered after one cycle of an angle detecting means. A device is provided which controls a speed by a pulse generator generating pulses at predetermined intervals, which detects a sudden drop in speed from a predetermined time elapsed from the last pulse, and which detects, when a speed is to be recovered, an abnormal drop in motor rotation independent of the motor rotation speed by changing a threshold value of an elapsed time according to an actual speed, a speed command value and an acceleration command value. A device is provided which controls deceleration by switching from a close-loop control to microstep driving in deceleration, wherein a drive amplitude in microstep drive into a predetermined relation with a drive amplitude in closed-loop control so that unnecessary vibration when switching to microstep driving is prevented while out-of-step is prevented.

20 Claims, 29 Drawing Sheets

FIG. 1B

| Rotational direction | Angular position θ of rotor | Instruction value of forced driving |
|---|---|---|
| Clockwise | 0° ≤ θ < 67.5° | Excitation of A phase in negative direction<br>Excitation of B phase in positive direction |
| | 67.5° ≤ θ < 90° | Excitation of only A phase in negative direction |
| | 90° ≤ θ < 157.5° | Excitation of A phase in negative direction<br>Excitation of B phase in negative direction |
| | 157.5° ≤ θ < 180° | Excitation of only B phase in negative direction |
| | 180° ≤ θ < 247.5° | Excitation of A phase in positive direction<br>Excitation of B phase in negative direction |
| | 247.5° ≤ θ < 270° | Excitation of only A phase in positive direction |
| | 270° ≤ θ < 337.5° | Excitation of A phase in positive direction<br>Excitation of B phase in positive direction |
| | 337.5° ≤ θ < 360° | Excitation of only B phase in positive direction |

FIG.1C

| Rotational direction | Angular position θ of rotor | Instruction value of forced driving |
|---|---|---|
| Counterclockwise direction | 0° ≤ θ < 22.5° | Excitation of only B phase in negative direction |
| | 22.5° ≤ θ < 90° | Excitation of A phase in positive direction<br>Excitation of B phase in negative direction |
| | 90° ≤ θ < 112.5° | Excitation of only A phase in positive direction |
| | 112.5° ≤ θ < 180° | Excitation of A phase in positive direction<br>Excitation of B phase in positive direction |
| | 180° ≤ θ < 202.5° | Excitation of only B phase in positive direction |
| | 202.5° ≤ θ < 270° | Excitation of A phase in negative direction<br>Excitation of B phase in positive direction |
| | 270° ≤ θ < 292.5° | Excitation of only A phase in negative direction |
| | 292.5° ≤ θ < 360° | Excitation of A phase in negative direction<br>Excitation of B phase in negative direction |

FIG. 17

| Ia<br>(Amplitude of current instruction value in closed-loop driving) | Ib<br>(Amplitude of current instruction value in microstep driving) |
|---|---|
| +127 | 127 |
| . | . |
| . | . |
| +5 | 34 |
| +4 | 33 |
| +3 | 32 |
| +2 | 32 |
| +1 | 31 |
| 0 | 30 |
| −1 | 31 |
| −2 | 32 |
| −3 | 32 |
| −4 | 33 |
| −5 | 34 |
| . | . |
| . | . |
| −127 | 127 |

FIG.20B

| Rotational direction | Angular position Θ of rotor | Instruction value of forced driving |
|---|---|---|
| Clockwise | 0° ≤ Θ < 90° | Excitation of A phase in negative direction |
| | | Excitation of B phase in positive direction |
| | 90° ≤ Θ < 180° | Excitation of A phase in negative direction |
| | | Excitation of B phase in negative direction |
| | 180° ≤ Θ < 270° | Excitation of A phase in positive direction |
| | | Excitation of B phase in negative direction |
| | 270° ≤ Θ < 360° | Excitation of A phase in positive direction |
| | | Excitation of B phase in positive direction |
| Counterclockwise direction | 0° ≤ Θ < 90° | Excitation of A phase in positive direction |
| | | Excitation of B phase in negative direction |
| | 90° ≤ Θ < 180° | Excitation of A phase in positive direction |
| | | Excitation of B phase in positive direction |
| | 180° ≤ Θ < 270° | Excitation of A phase in negative direction |
| | | Excitation of B phase in positive direction |
| | 270° ≤ Θ < 360° | Excitation of A phase in negative direction |
| | | Excitation of B phase in negative direction |

STEPPING MOTOR CONTROL DEVICE

TECHNICAL FIELD

The present invention relates to a stepping motor and the control of the same. More particularly, the present invention relates to a stepping motor having an encoder and a control device for controlling the stepping motor.

BACKGROUND ART

Stepping motors have features such as small size, high torque, and long life. Stepping motors are typically driven by open-loop control by utilizing the easy-to-control property. On the other hand, stepping motors have problems such as out-of-step, vibration, and a low rotational speed. To solve such problems, a method for driving a stepping motor by a closed-loop control has been proposed, where the stepping motor is provided with an encoder.

Japanese Patent Application No. 10-011069 describes the following arrangement. The number of output pulses in one cycle of an encoder is set to an integral multiple of the number of magnetic poles of a stepping motor. An exciting current to the stepping motor is switched every time a predetermined number of encoder pulses are detected with reference to an arbitrary rest position of the stepping motor. This allows the phase accuracy between the output signal of the encoder and the exalting current to the stepping motor to be smaller than or equal to a predetermined error.

In the case of this arrangement, it is necessary to cause a drive phase to be sufficiently advanced with respect to the actual angular position of a rotor in order to obtain a sufficiently large number of revolutions. However, a sufficiently advanced phase angle causes an actual phase to be excessively advanced when the rotor is operated at a low speed. In extreme cases, the rotor is adversely rotated in a reverse direction in the low-speed operation.

When the operation of the motor is initiated, the angular position of the rotor, which has been held due to microstep driving before the start of the operation, is determined by a ratio between the currents of each motor coil phase. The angular position of the rotor determined in such a manner includes an error. When an attempt is made to control the error, sufficient starting torque is sometimes not obtained, leading to a failure to start an operation.

Further, when a closed-loop driving is performed using such a stepping motor, the high positioning accuracy, which is a characteristic of the stepping motor, cannot be obtained only by closed-loop driving. Therefore, microstep driving is used in conjunction with closed-loop driving. Closed-loop driving is initially used to transfer a subject to be controlled at a high speed, thereafter, partway when the subject is decelerated, closed-loop driving is switched to microstep driving to perform accurate positioning. However, when closed-loop driving is switched to microstep driving, an unnecessary rotational amplitude often occurs, so that it is difficult to control a position and a speed accurately.

The above-described application describes no solution to these problems.

Further, conventionally, with the above-described arrangement in which a stepping motor may alternatively be used in place of a DC motor, speed control has been generally performed using an output signal of an encoder.

A problem with this arrangement is that when a head is moved at a high speed to an intended track (e.g., head movement control in a disk apparatus), a speed command value is considerably small at the point in time when the head reaches a position a few tracks away from the intended track, so that overshoot over the intended track, runaway of a motor, or the like are likely to occur due to an offset voltage or the like. To solve such a problem, Japanese Laid-open Publication No. 2-18766 discloses an arrangement in which a speed command value is increased when no signal is received from an encoder within a predetermined time.

However, it is difficult to provide an optimal value of the predetermined time with respect to any number of revolutions of a motor.

Specifically, when the predetermined time is provided so as to be suitable for a higher number of revolutions of a motor, then if the number of revolutions is small, it is often erroneously detected that temporal expansion of pulse intervals due to normal deceleration is abnormal. When the predetermined time is provided so as to be optimal for a lower number of revolutions, then if the number of revolutions is high, abnormalities cannot sometimes be detected.

Further, it is difficult to provide a corrected speed command value optimal for all cases.

Specifically, a driving system has variations in the frictional load of a motor or a transmission system, or the like. Therefore, it cannot be expected that the same increase in the speed command value leads to the same response. For example, even when the same increase in the speed command value is given to a motor, if the frictional load of a driving system is large, it may be impossible to inhibit the halt of the motor in spite of the increase. In this case, similar to the case where the speed command value is not increased, the device continues to wait for a next input pulse signal, resulting in no improved effect. Conversely, when the frictional load of the driving system is small, a high level of overshoot occurs due to an increase in the speed command value. In this manner, it is difficult to design such an increase in the speed command value that addresses variations in characteristics of a driving system. It is also difficult to perform reliable control.

The above-described application describes no solution to the above-described problems.

Hereinafter, a conventional technology will be described with reference to FIGS. 20A through 26.

FIG. 20A is a schematic diagram showing an exemplary configuration of an optical disk drive using a conventional motor control device. FIG. 20B is a table showing a relationship between an angular position θ of a rotor prior to starting and a command value for forced driving.

FIG. 21 is a timing chart showing a temporal relationship between driving voltages applied to exciting coils of conventional A-phase and B-phase stators, and an output of a position detecting means.

FIG. 22 is a diagram showing a conventional relationship of a phase between a rotor and driving with respect to the time of Ta in FIG. 21.

FIG. 23 is a diagram showing a conventional relationship between the position of a rotor and electromagnetic force when the position of the rotor is shifted towards a rotational direction.

FIG. 24 is a flowchart used for explaining a conventional speed control operation.

FIGS. 25A and 25B are diagrams used for explaining an excitation sequence, showing a time-varying current command value output from an instruction amplitude control means and a microstep driving means.

FIGS. 26A and 26B are a conventional profile of an intended speed of a rotor and a conventional time chart of a current command value output from a command value selector.

In FIG. 20A, 301 indicates a head which optically records and reproduces information to and from an optical disk 302. A nut piece 303 attached to the head 301 is engaged with the grooves of a lead screw 304. The lead screw 304 has a screw pitch of 3 mm and is coupled with a stepping motor 305. Therefore, the head 301 is straightly driven back and forth along a guide shaft 306 in accordance with the rotation of the stepping motor 305. Reference numeral 307 indicates a bearing which is fixed to a chassis 308 and supports the screw 304 so that the screw 304 is freely rotated. A spindle motor 309 drives and rotates the optical disk 302. When the head 301 is moved to an intended position, a direction and a distance in which the head 301 is moved are determined based on the addresses of a current position and an intended position. In accordance with the direction and distance, a control means 310 performs a control operation for the stepping motor 305.

The driving means 311 includes an A-phase current driver 312 and a B-phase current driver 313 which are independent two-channel current drivers. The current drivers 312 and 313 supply a current to an A-phase stator 320 and a B-phase stator 321, respectively, based on digital data representing a respective current instruction amount output from the control means 310, thereby driving the stepping motor 305.

The A-phase and B-phase-current drivers 312 and 313 include power amplifiers, D/A converters, and the like. The stepping motor 305 is of A two-phase PM type and has a step angle of 18° in two-phase excitation. The stepping motor 305 includes a rotor 322, and a two-phase exciting coil having an A-phase stator 320 and a B-phase stator 321. The rotor 322 includes a permanent magnet in which five polarized poles for each of N and S poles are evenly spaced at intervals of an angle of 72° in a circumferential direction.

The A-phase stator 320 and the B-phase stator 321 each have a magnetic pole caused by a yoke which generates five poles for each of N and S poles at intervals of an angle of 72°. Each magnetic pole faces the rotor 322 when a current is applied to the excitation coils. The magnetic poles caused by the yokes of the A-phase stator 320 and the B-phase stator 321 are deviated by 18° from each other.

A light shield plate 324 having slits provided at intervals of an angle of 4.5° is fixed to a rotor axis 328. The slit angle cycle value of 4.5° of the light shield plate 324 is determined to be an integral fraction (herein $1/16$) of the angle cycle of 72° of the magnetic poles of the magnet of the rotor 322. Particularly, since the number of phases of the stepping motor 305 is two, the slit angle cycle value of 4.5° of the light shield plate 324 is also selected so as to satisfy a one divided by an integral multiple of 2 (i.e., $1/16=1/(2\times8)$) of the angle cycle of 72° of the magnetic poles of the magnet of the rotor 322.

A photosensor 325 is of a transmission type and includes an LED at a light emitting side thereof and a phototransistor at a light receiving side thereof. The photosensor 325 outputs an output signal depending on the presence or absence of a slit of the light shield plate 324.

The photosensor 325 and the light shield plate 324 are accommodated in a housing 326 so as to be prevented from being damaged in handling or the like and smudged due to dust or the like.

The output of the photosensor 325 is converted by a binary conversion circuit 327 to binary data. The binary conversion circuit 327 does not output High or Low only by comparing the output of the photosensor 325 with a certain reference value, but switches outputs of High and Low only when the output of the photosensor 325 is transitioned between the two reference values, thereby preventing an erroneous operation due to chattering.

A position detecting means 323 includes the light shield plate 324, the photosensor 325, and the binary conversion circuit 327.

The position detecting means 323 outputs a single pulse every time when the rotor axis 328 to rotated by an angle of 4.5°. Therefore, when the rotor 322 is rotated by a phase difference of 18° between the poles of the A-phase and B-phase stators 320 and 321, the position detecting means 323 outputs exactly four pulses.

The output of the position detecting means 323 is input to the control means 310, a closed-loop driving means 317, and a speed detecting means 334.

The microstep driving means 316 outputs digital data representing a current command value to the driving means 311 in accordance with a timing signal internally generated by the microstep driving means 316 itself, thereby performing microstep driving using open-loop control. Specifically, microstep driving is performed by changing a ratio of a driving current through the A-phase stator 320 to a driving current through the B-phase stator 321, thereby controlling the rest angle of the rotor 322 with a high resolution.

A relationship between the rest angle of the rotor 322 and the current ratio depends on the states of the magnetic circuits and loads of the stepping motor 305. Therefore, current command values for providing evenly spaced rest angles of the rotor are determined as a function or a table. This leads to a consistent relationship between the rest angle of the rotor 322 and the output of the microstep driving means 316. The rest angular position of the rotor 322 can be determined from the output of the microstep driving means 316.

Microstep driving easily causes out-of-step since the driving torque is small at high speed rotation compared to a closed-loop driving described later. Therefore, microstep driving is mainly used in a low speed revolution range in which the driving torque is not required and precise positioning is required. Further, in the low speed revolution range, the precision of speed detection by an encoder is poor, and it is difficult to perform the closed-loop control in which speed is fed back. Therefore, microstep driving is typically controlled by an open loop in accordance with a pattern in which current command values and amplitude thereof are predetermined, thereby controlling the rotor 322 so that the rotor 322 is forced to follow the excitation position.

A forced driving means 338 generates eight command values far forced driving, based on information on the angular position of the rotor 322 prior to starting, the rotor 322 being held by the output of the microstep driving means 316, and a direction in which the rotor 322 is intended to be rotated.

A driving voltage determined by the command value from the forced driving means 338 to the driving means 311 takes two values, i.e., +12 V and −12 V when a power supply voltage is 12 V. In FIG. 20B, a rotational direction is a direction in which the rotor 322 is intended to be rotated. An angular position θ is the angular position of the rotor 322 prior to starting, when the rotor 322 is held by the output of the microstep driving means 316. The angular position is 0° only when the A-phase stator 320 is excited in a positive direction and is represented by an electrical angle where a clockwise direction is positive.

A relationship between the electrical angle θ and an actual angle θ1 is given as follows:

θ1=θ/5+72N (N: any integer of 0 to 4).

Thereby, the stepping motor 305 is forcedly driven.

The closed-loop driving means 317 includes a programmable counter and the like, and generates a command value to the driving means 311 by dividing the output of the position detecting means 323. In this case, the division pattern can be selected from predetermined patterns in accordance with a signal from the control means 310.

Closed-loop driving allows a great driving torque and a large number of revolutions. The closed-loop is used to quickly raise the revolution so as to move the head 301 at a high speed. However, the precision of speed detection by an encoder is poor in a low speed revolution range and therefore a sufficient amount of speed is not allowed to be fed back. For this reason, the closed-loop cannot be used when precision at a low speed is required for final positioning or the like. To avoid this, closed-loop driving is switched to the above-described microstep driving when the number of revolutions is smaller than or equal to a certain value. Thereby, it is possible to manage both speed and positioning precision.

A driving voltage in accordance with the command value from the closed-loop means 317 to the driving means 311 takes+12 V and −12 V when the power supply voltage is 12 V.

This output is input to an instruction amplitude control means 315 described later. The voltage of the output to then modified by multiplying a necessary coefficient in order to control a speed and a position, and thereafter input to a command value selector 314.

In accordance with a signal from the control means 310, the command value selector 314 selects one of the output of the closed-loop driving means 317, the output of the forced driving means 338, and the output of the microstep driving means 316.

The speed detecting means 334 calculates the rotational speed value of the rotor 322 based on a pulse output from the position detecting means 323, and transits the result to a speed comparator 335 described later.

The speed comparator 335 compares the rotational speed value of the rotor 322 transmitted from the speed detecting means 334 with an intended speed value transmitted from the control means 310 to calculate the error between the intended speed value and the rotational speed value of the rotor 322.

The instruction amplitude control means 315 modifies the amplitude of a current command value transmitted from the closed-loop driving means 317, based on the speed error information output from the speed comparator 335. Specifically, whether the rotor 322 is accelerated or decelerated to cause the rotational speed value of the rotor 322 to be close to the intended speed value, is determined based on the magnitude of the speed error. Based on the result of the determination, the amplitude of the current command value is modified. The change in the amplitude of the current command value leads to a change in attraction and repulsion force between the A-phase stator 320 and the B-phase stator 321, thereby making it possible to accelerate and decelerate the rotor 322. As a result, the rotor 322 is controlled so that the actual speed is close to the speed command value.

The control means 310 controls the closed-loop driving means 317, the forced driving means 338, the microstep driving means 316, and the command value selector 314 in accordance with the rotational direction, the angular position information of the rotor 322 prior to starting held by the output of the microstep driving means 316, and the output of the position detecting means 323.

Further, a remaining distance by which the rotor 322 is to be driven by the closed-loop driving means 317 is calculated based on a pulse signal P from the position detecting means 323. This is represented by a count which is the number of pulses N from the position detecting means 323. An intended speed value SD selected in accordance with the count is read from a speed command value table (not shown), and output to the speed comparator 335.

The speed command value table is designed as follows. The rotor 322 is accelerated by the fullest capacity of the device in order to raise the speed as quickly as possible at the start of rotation. Thereafter, the number of revolutions is made equal to a predetermined value so that the rotor 322 stably stops at an intended position. When the rotor 322 is close to the intended position, the rotor 322 is decelerated at a relatively high rate in order to stop as quickly as possible and stably with a high level of precision. Up to this point, the above-described closed-loop driving is used in order to obtain a high accelerating value and a high number of revolutions. When the speed is smaller than or equal to a certain set speed, microstep driving for accurate positioning is used and the decelerating value is decreased.

When the above-described count is smaller than or equal to a predetermined reference value M, i.e., the rotor is close to the intended position and the intended speed value is lowered, an intended speed value SD corresponding to the count is selected as described above. In addition, if a next pulse signal P' from the position detecting means 323 is not input within a predetermined time T, a correction value is added to the intended speed value SD and the increased intended speed value SD is output to the speed comparator 335.

Further, when the rotor 322 is close to the intended position and the speed is smaller than or equal to a predetermined speed, closed-loop driving is switched to microstep driving for accurate positioning.

Hereinafter, a current command value generated by the instruction amplitude control means 315 and the microstep driving means 316 will be described with reference to FIGS. 25A and 25B.

FIG. 25A is a diagram used for explaining an excitation sequence indicating a temporal change in the current command value output from the instruction amplitude control means 315. The current command value is 8-bit digital data having a numerical value ranging from +127 to −127. In this case, the positive and negative signs indicate directions of a driving current. The magnitude of a driving current generated by the driving means 311 is proportional to the current command value. The waveform output from the instruction amplitude control means 315 is a rectangular wave where the amplitude of the current command value is Ia. The value of the amplitude Ia can take an arbitrary value ranging from −127 to +127, depending on the magnitude of an accelerating value or a decelerating value by the speed control. The amplitude Ia of the current command value output from the instruction amplitude control means 315 is defined as follows: the direction in Which the stepping motor 305 is accelerated is positive, while the direction in which the stepping motor 305 is decelerated is negative. The same definition is applied to the amplitude of a current command value output of an instruction amplitude control means 315 in embodiments of the present invention described later, irrespective of the rotational directions of the stepping motor 305.

FIG. 25B is a diagram used for explaining an excitation sequence indicating a temporal change in a current command value output from the microstep driving means 316. Similar to the output of the instruction amplitude control means 315, the current command value is 8-bit digital data having a numerical value ranging from +127 to −127. The output waveform of the microstep driving means 316 to a substantially triangular wave where the amplitude of the current command value is Ib. Microstep driving is performed by changing the ratio of a driving current of the A-phase to a driving current of the B-phase to gradually change an excitation phase. The value of the amplitude Ib of the current command value is fixed to the maximum of 127. Since the microstep driving means 316 performs open-loop control, the reversal of acceleration and deceleration does not particularly need to be taken into account, and the amplitude Ib to always defined as a positive value. This definition is applied to the amplitude of a current command value of a microstep driving means 316 described in embodiments of the present invention described later.

An operation of the thus-constructed control device for the stepping motor will be described.

The head 301 traces a certain track of the disk 302 when typical recording and reproduction are performed in an optical disk drive.

In this case, the stepping motor 305 is driven using the microstep driving means 316.

The microstep driving means 316 performs 16-division microstep driving by changing the driving current ratio of the A-phase stator 320 to the B-phase stator 321 in 16 levels. The head 301 is moved at a high resolution of 9.375 $\mu$m which to $\frac{1}{16}$ of that of a typical two-phase excitation driving (in this case, one step corresponds to 150 $\mu$m). Therefore, the stepping motor 305 stops not only at the rest angular positions of the two-phase excitation but also substantially arbitrary angular positions.

An operation in which the head 301 is moved from a track, on which reproduction is currently performed, to another track, is called seek. In this case, the control means 310 determines a method of moving the head 301 by comparing a current position address stored in the disk 302 with an intended position address.

When a movement distance is extremely short, i.e., several tracks, the head 301 is moved only by an operation of a tracking actuator without rotation of the stepping motor 305.

When the movement distance is about 1 mm, the head 301 is moved to an intended track by driving the stepping motor 305 in microsteps using the microstep driving means 316.

When the distance is greater than or equal to those of the above-described situations, the output of the displacement detecting means 323 is converted by means of division or the like using the closed-loop driving means 317 to generate a driving command value for the stepping motor 305. In accordance with the driving command value, driving is performed in association with the output of the displacement detecting means 323, thereby moving the head 301.

Hereinafter, an operation of the stepping motor 305 in such a situation will be described.

Initially, the control means 310 stops the operation of a tracking actuator of the head 301. Thereafter, a rotational direction of the stepping motor 305 is determined. In this case, the rotational direction is clockwise. At this point in time, the stepping motor 305 is driven by the microstep driving means 316. The stepping motor 305 normally remains at rest.

Thereafter, the control means 310 gives the forced driving means 338 information, such as information on the angular position of the rotor 322 prior to starting, the rotor 322 being held by the output of the microstep driving means 316, and a direction in which the rotor 322 is intended to be rotated. Further, the control means 310 causes the command value selector 314 to select the output of the forced driving means 338. The forced driving means 338 outputs a new command value to the driving means 311 in accordance with FIG. 20B based on the above-described information, independent of the output of the position detecting means 323.

Thereby, the rotor 322 begins rotating. The position detecting means 323 outputs pulses at intervals of an actual rotational angle of 4.5°.

When output of the pulses begins, the control means 310 gives the closed-loop driving means 317 information, such as information on the angular position of the rotor 322 prior to starting, the rotor 322 being held by the output of the microstep driving means 316, and a direction in which the rotor 322 is intended to be rotated. Further, the control means 310 causes the command value selector 314 to select the output of the closed-loop driving means 317.

The closed-loop driving means 317 generates a command value to the driving means 311 by dividing the output of the position detecting means 323 in accordance with a predetermined pattern. Thereby, a sequence of the command values are output to the driving means 311 in such a manner that the timing is associated with the output from the position detecting means 323.

The sequence of the command values is shown in FIG. 21 where a driving voltage applied to each excitation coil is 12 V at maximum, a driving voltage of 12 V is applied to the excitation coils of the A-phase stator 320 and a driving voltage of 0 V is applied to the excitation coils of the B-phase stator 321, and the rotor 322 is, under such conditions, actuated.

FIG. 21 is a timing chart showing a temporal relationship between driving voltages applied to the excitation coils of the conventional A-phase and B-phase stators 3 and the output of the position detecting means 3.

In FIG. 21, Av shows 2 relationship between time and a voltage applied to the excitation coils of the A-phase stator 320 as a result of the command value being input from the control means 310 to the driving means 311. Bv shows a relationship between time and a voltage applied to the excitation coils of the B-phase stator 321. FG shows a relationship between time and the output of the position detecting means 323.

The voltages applied to the excitation coils are modified by the instruction amplitude control means 315 multiplying a necessary coefficient for the purpose of controlling a speed and a position. For the sake of simplicity, FIG. 21 shows the case where such modification of the voltages is not performed.

In FIG. 21, driving independent of the output of the position detecting means 323 in performed in an interval T1 as described above. As a results in an interval T2, driving is performed in such a manner that the timing is associated with pulses output from the position detecting means 323. In an interval T3, the outputs of the A-phase and the B-phase are alternately reversed every four pulses output from the position detecting means 323. The output voltages are +12 V and −12 V.

FIG. 22 shows a relationship between the phases of the rotor 322 and driving at time Ta in FIG. 21 immediately after the reversal of the output.

In FIG. 22, reference numeral 320 indicates an A-phase stator, 321 indicates a B-phase stator, 322 is a rotor, 339 indicates a virtual N pole, and θd indicates a driving angle.

The virtual N pole 339 is generated by combining magnetic fields generated by the A-phase stator 320 and the B-phase stator 321. The S pole of the rotor 322 is attracted in a direction of the virtual N pole. The S pole of the rotor 322 is attracted to the virtual N pole 339. An angle by which the rotor 322 is to be rotated is the driving angle θd.

In this case, as shown in FIG. 22, the driving angle is 180°.

Generally, in the case of a two-phase motor, the driving angle is typically 135°. The reason for such a great angle is the following.

The winding of the stepping motor 305 has an inductance component. Therefore, a current through the winding is delayed by a certain time with respect to a change in a driving voltage. For example, when a stepping motor is rotated by pulses of 3000 PPS, an interval of a pulse is 333 μsec. In this case, the delay time is as great as about 150 μsec for a stepping motor which is used in an optical head movement mechanism in a typical CD-ROM apparatus. Such a delay time cannot be ignored.

For that reason, the driving phase is caused to be advanced from an optimal phase obtained when there is no delay with respect to the angular position of the rotor. Therefore, the delay time is corrected.

In accordance with the above-described procedure, the motor is actuated, and the number of revolutions is increased. Thereby, the head 301 begins to move towards an intended address.

The control means 310 calculates the remaining distance, over which the head 301 is driven by the closed-loop driving means 317, based-on the pulse signal P from the position detecting means 323. The control means 310 selects the intended speed value SD in accordance with the count, and outputs the intended speed value SD to the speed comparator 335. The intended speed is selected as follows. The rotor 322 is accelerated by the fullest capacity of the device in order to raise the speed as quickly as possible at the start of rotation. Thereafter, the number of revolutions is made equal to a predetermined value so that the rotor 322 stably stops at an intended position. When the rotor 322 is close to an intended position, the rotor 322 is decelerated at a relatively high rate in order to stop as quickly as possible and stably with a high level of precision. Up to this point, the above-described closed-loop driving is used in order to obtain a high accelerating value and a high number of revolutions. When the speed is smaller than or equal to a predetermined set speed, microstep driving for accurate positioning is used and the decelerating value is decreased.

In this manner, the deceleration operation is performed in two steps. In a period from the start of deceleration to a predetermined speed, the command value selector 314 selects the output of the instruction amplitude control means 315 and performs speed control by closed-loop driving.

FIGS. 26A and 26B are a profile of an intended speed of the rotor 322 and a time chart showing a current command value output by the command value selector 314, respectively. For the sake of simplicity, the current command value is shown for only one of the A-phase and B-phase stators 3.

The deceleration by the instruction amplitude control means 315 is performed as follows. The speed comparator 335 calculates a speed error by comparing the rotational speed of the rotor 322 detected by the speed detecting means 334 with the intended speed value. The instruction amplitude control means 315 changes the amplitude Ia of the current command value in such a manner as to cause the rotational speed of the rotor 322 to be close to the intended speed value. The torque of a motor is generally proportional to a driving current. In this example, however, a driving current is changed by controlling a driving voltage.

In this case, the amplitude Ia of the current command value takes various values, depending on variations in driving load, such as friction, and different intended speed values.

For example, when a subject to be controlled has a friction load and the acceleration of the natural deceleration due to the friction load is equal to an intended decelerating value by chance, the amplitude Ia of the current command value is substantially zero. When the friction load of a subject is great due to variation, the subject is decelerated by a decelerating value greater than an intended decelerating value. Therefore, the amplitude Ia of the current command value takes a positive value to accelerate the rotor 322 so that the speed of the rotor 322 is recovered. Further, when the friction load of a subject is small, the subject is decelerated by a decelerating value smaller than an intended decelerating value. Therefore, the amplitude Ia of the current command value takes a negative value to decelerate the rotor 322 so that the speed of the rotor 322 is further reduced.

As described above, the instruction amplitude control means 315 performs the closed-loop control in which the rotor 322 is controlled while monitoring the rotational speed of the rotor 322 by the speed detecting means 324 so that the rotational speed of the rotor 322 is equal to an intended speed value. A driving current having a different magnitude depending on variations in a bearing load of the stepping motor 305, a frictional load of the lead screw 304, and the like, is supplied to the stepping motor 305.

In this manner, the deceleration of the rotor 322 is performed by closed-loop driving, so that the speed thereof is gradually reduced while the head 301 approaches an intended address.

The above-described structure has the following problem. When a distance to an intended address is small, a speed command value is small. An overshoot over the intended address or the runaway of a motor due to an offset voltage, a halt during deceleration due to a small increase in a friction load, and the like, is likely to occur. To avoid this, a speed command value is increased if no signal is received from an encoder within a predetermined time.

FIG. 24 is a flowchart used for explaining a conventional speed control operation. The flowchart shows a procedure in which a speed command value is increased if no signal is received from an encoder within a predetermined time, in order to remove drawbacks such as a halt during deceleration due to a small increase in a friction load.

Initially, the number of remaining tracks N existing up to the track of an intended position is counted, and whether the count is "0" is determined (S1). If it is determined that the count is "0", a deceleration operation is ended.

In step S1, if it is determined that the number N of the remaining tracks over which the head will be moved is not "0", a pulse signal P is received from the position detecting means 323 and one is subtracted from the number N of the remaining tracks over which the head will be moved (S2). A speed command value SD corresponding to the number of the remaining tracks N is selected in accordance with the count (S3), and output to the speed comparator 335.

Thereafter, an actual speed detected by the speed detecting means 334 is compared with a switching speed v at which closed-loop driving is switched to microstep driving. If the actual speed is smaller than or equal to v, the deceleration by closed-loop driving is ended, and closed-loop driving is switched to microstep driving (S9).

Thereafter, whether the number of the remaining tracks N is smaller than or equal to a predetermined reference value M is determined based on the count (S4). If it is determined that the number of the remaining tracks N is greater than the reference value M, whether a next pulse signal P' is input from the position detecting means 323 is determined (S5). If it is determined that the next pulse signal P' is input, the process returns to step S1 and the above-described series of operations are repeated.

In step S4, if it is determined that the number of the remaining tracks N is smaller than or equal to the reference value M, whether the next pulse P' is input from the position detecting means 323 within the predetermined time T is determined (S6). If it is determined that the next pulse P' is input within the predetermined time T, the process returns to step S1 and the above-described series of operations are repeated.

In step S6, if it is determined that the next pulse P' is input within the predetermined time T, a correction value is added to the speed command value SD, and the increased speed command value SD is output to the speed comparator 335, resulting in an increase in the movement speed of the head 301 (S7). Following this, whether a next pulse P' is input from the position detecting means 323 within the predetermined time T is determined (S8). If it is determined that the next pulse P' is input, the process returns to step S1 and the above-described series of operations are repeated until the actual speed becomes smaller than or equal to v.

As described above, unless a next pulse P' is not input from the position detecting means 323 within the predetermined time T, the speed command value SD is increased so that the movement speed of the head 301 is increased. The stepping motor 305 is controlled in this manner, thereby improving reliability against failures such as overshoot or runaway due to an offset voltage, a variation in a friction load, or the like, a halt during deceleration, and the like.

Thereafter, when the actual speed is smaller than or equal to the switching speed v at which closed-loop driving is switched to microstep driving and an intended position is close, the control means 310 for precise positioning in a stopping operation switches to the microstep driving means 316. In microstep driving, a current command value is substantially in the form of a triangular wave as shown in FIG. 25B. The decelerating operation is performed by the open-loop control in which the switching frequency of the current command value is lowered (the state of the current waveform is varied from dense to sparse). In this case, the driving is performed while the amplitude Ib of the current command value is set to a predetermined fixed value (=127), independent of the magnitude of a driving load.

In microstep driving, conditions are produced so as to further decelerate the head 301, control the position and speed of the head 301 in a subtle way, and operate the tracking actuator again.

The switching speed v at which closed-loop driving is switched to microstep driving is 440 PPS (=66 mm/s). In other word, when the speed is reduced to such a value, closed-loop driving is switched to microstep driving.

In deceleration by microstep driving, the head 301 is gradually decelerated while being moved over a distance corresponding to several hundreds of tracks of the optical disk 302.

After the deceleration, the tracking actuator is operated to trace a track after seeking. The control means 310 then compares a current position address stored in the disk 302 with an intended position address again. If both are the same, the movement operation is ended. If both are not the same, the above-described operations are repeated until both are the same.

However, the above-described method of controlling a stepping motor has the following problems.

First, as to a delay caused by an inductance component, since a delay time is constant, a delay angle is raised as the number of revolutions is increased. A circuit for advancing the driving by a predetermined time is typically complicated. Therefore, typical driving is performed in such a manner that, the phase of the division of the angular angle detecting means is caused to be advanced, and a lead angle is constant.

However, this has the following problem. Such a lead angle typically has substantially the same resolution as that of the rotational angle detecting means 3. Further, when the number of revolutions is small, the phase is excessively advanced. In an extreme case, the phase is reversed. For this reason, the lead angle cannot take a value greater than or equal to a certain value, so that a driving angle is limited to 180° of the conventional example.

Actually, this is often insufficient for the correction of the delay time.

Second, a driving pattern generated by the forced driving device 317 upon starting is limited to two-phase excitation. Therefore, for example, in this conventional example, an angular position at which the rotor 322 is driven by electromagnetic force is one of four positions, i.e., 45°, 135°, 225°, and 315° even when the rotor 322 prior to starting is at any position θ from 0 to 360°. Thus, the angular position at which the rotor 322 is driven by electromagnetic force varies in the range from 45° to 135°. Further, the angular position information of the rotor 322 prior to starting, the rotor 322 being held by the output of the microstep driving means 316 (FIG. 20A), typically has an error of about 14°. Taking such an error into account, the range is further increased.

For example, FIG. 23 shows a relationship between the position of the rotor 322 and electromagnetic force, when the rotor 322 is actuated from a position smaller than θ=0° and the actual position of the rotor 322 is shifted towards the rotational direction.

When an error angle θg is zero, the driving angle θd in 45°. In FIG. 23, the driving angle θd is considerably small due to the error angle θg. A driving torque is maximum when the driving angle is 90°. When the driving angle is small, the driving torque is proportional to the driving angle. When the driving angle is 0°, the driving torque is zero.

As described above, when the driving angle is small, the driving torque is considerably small. No rotation may occur due to friction force or the like.

In this case, when no rotation occurs, there is no output from the position detecting means 323 (FIG. 20A). Therefore, the process does not move to the subsequent driving procedure, resulting in an actuation failure.

Third, since the predetermined time T has a fixed value, a delay of control is significant with respect to the quick deceleration of a motor. In general, the control of a motor is most unstable when the motor is rotated at a low speed. This is because the lower speed leads to a relatively large increase in influence of a non-linear factor, such as the friction of a motor bearing. In low speed rotation, the motor is quickly out of control and the speed of the motor is largely deviated from an intended speed in a short time, resulting in frequent halts of the motor. Therefore, in order to stabilize the rotation, it is extremely important to detect, at an early stage, that the motor is out of control, and to control the motor. According to the structure of the conventional example, it is difficult to realize such early detection and control. Specifically, the number of revolutions beyond which the motor is out of control varies depending on variations in friction load. In some cases, the motor may begin to be out of control from a relatively high revolution range. In other cases, the motor can be controlled in a low revolution range. When a predetermined time which has a fixed value is provided as in the conventional example and a speed command value is modified in comparison with the predetermined time, it is difficult to detect the out-of-control in a short time while preventing erroneous detection of the out-of-control in the low revolution range.

Fourth, when it is determined that a next pulse P' is not input within the predetermined time T, the correction value for the speed command value SD is constant. Actually, when the correction value is constant, it is difficult to provide the setting of the correction value for the speed command value SD, and the reliability of the control is poor. A driving system has variations in a friction load of a motor itself and a transmission system, and the like. For this reason, it cannot be expected that the same increase in the speed command value leads to the same response. For example, even when the same increase in the speed command value is given to a motor, if the frictional load of the driving system is large, it may be impossible to inhibit the halt of the motor in spite of the increase. In this case, similar to when the speed command value is not increased, the device continues to wait for a next input pulse signal, resulting in no improved effect. Conversely, when the frictional load of the driving system is small, a high level of overshoot occurs due to an increase in the speed command value. In this manner, it is difficult to design such an increase in the speed command value that addresses variations in characteristics of a driving system. It is also difficult to perform reliable control.

Fifth, it to difficult to prevent an unnecessary vibration generated in switching from closed-loop driving to microstep driving while preventing out-of-step from occurring in microstep driving. This will be described in greater detail.

In closed-loop driving, a driving current having a different magnitude depending on variations in a driving load, such as a bearing load of the stepping motor 305, a frictional load of the lead screw 304, and the like, is supplied to the stepping motor 305. For example, as described above, the case where a subject to be controlled has a friction load and the acceleration of the natural deceleration due to the friction load is equal to an intended decelerating value by chance, and the amplitude Ia of the current command value is substantially zero, is considered. This is the case where the least external control torque is required. Needless to say, no vibration due to excitation occurs. When this situation is switched to microstep driving, any given excitation energy is transformed to unnecessary vibration since excitation occurs due to a constant current amplitude Ib in microstep driving, independent of variations in a driving load. In other words, every time closed-loop driving is switched to microstep driving, the amplitude of the current command value is rapidly increased while the driving force is rapidly increased, resulting in unnecessary vibration.

On the other hand, when the amplitude Ib of the current command value is set to a small value in advance in microstep driving so as to prevent the occurrence of unnecessary vibration, if the friction load is large due to the variations, the driving force is excessively small, resulting in out-of-step.

As described above, in the conventional speed control method for a stepping motor, since the amplitude of a current command value is fixed in microstep driving, it is difficult to prevent both the occurrence of unnecessary vibration and out-of-step and therefore it is difficult to obtain stable control.

DISCLOSURE OF THE INVENTION

According to the present invention, a stepping motor control device comprises a stepping motor including a rotor having magnetic poles equally spaced in a circumferential direction at intervals of an angle of $\theta°$, and M-phase excitation coils (M is an integer greater than or equal to two, and the M-phase does not include a reverse phase), driving means for supplying a driving current having a plurality of levels to the excitation coils in accordance with command values, command value generating means for generating the command value, where the driving current takes a different value having at least K levels (K is an integer), rotational angle detecting means for generating n pulses (n is an integer satisfying $n \geq M \cdot K$) corresponding to rotation of the rotor, and excitation switching timing generating means for selecting pulses from the n pulses of the rotational angle detecting means in a predetermined order, and generating an excitation switching timing in the K levels to each M-phase excitation coil. In accordance with an output of the excitation switching timing generating means, the command value generating means switches between a first command value for supplying a positive first driving current to the excitation coils, a second command value for supplying a negative second driving current whose direction is reverse to that of the first driving current to the excitation coils, and a third command value for supplying a third driving current taking a value between the first and second driving currents to the excitation coils, where K is three or more.

The command value generating means may include timer means. When the command value generating means may generate the third command value, the command values are switched in accordance with an output of the timer means.

When the command value generating means outputs the third command value, the command value generating means may generate a command value which causes a large lead angle in excitation in such a direction as to compensate an excitation delay due to an inductance of the excitation coils, and thereafter, generate a value which causes a lead angle in excitation smaller than that lead angle in accordance with an output of the timer means.

The third command value of the command value generating means may be a constant value designed in such a manner that a driving current to the excitation coils is zero.

According to the present invention, another stepping motor control device comprises a stepping motor including a rotor having magnetic poles equally spaced in a circumferential direction at intervals of an angle of $\theta°$, and M-phase excitation coils (M is an integer greater than or equal to two, and the M-phase does not include a reverse phase), driving means for supplying a driving current having a plurality of levels to the excitation coils in accordance with command values, command value generating means for generating the command value where the driving current takes a different value having at least K levels (K is an integer), rotational angle detecting means for generating n pulses (n is an integer satisfying $n \geq M \cdot K$) corresponding to rotation of the rotor, excitation switching timing generating means for selecting pulses from the n pulses of the rotational angle detecting means in a predetermined order, and generating an excitation switching timing in the K levels to each M-phase excitation coil, control means for switching between first, second, and third operation modes. In the first operation mode, microstep driving is performed by the driving means, and the rotor is held at a predetermined angular position when the stepping motor is at rest. In the second operation mode, when the stepping motor in rotated by a predetermined amount or more, the command value generating means is caused to generate a command value in accordance with a timing generated by the control means itself, and thereafter, the second operation mode is switched to the third operation mode. In the third is operation mode, the stepping motor is controlled by changing the command value in accordance with an output of the excitation switching timing means. In the second operation mode, the command value generating means generates a first command value for supplying a positive first driving current to the excitation coils, a second command value for supplying a negative second driving current whose direction is reverse to that of the first driving current to the excitation coils, and a third command value for supplying a third driving current taking a value between the first and second driving currents to the excitation coils, and generates different command values to the command value generating means in accordance with an angular position of the rotor by the control means.

The third command value in the second operation mode of the control means may be a constant value designed in such a manner that a driving current to the excitation coils is zero.

According to the present invention, a still another stepping motor control device for controlling a speed of a subject to be controlled by a driving current to the stepping motor, comprises displacement detecting means for generating a detection pulse signal in accordance with a certain amount of displacement of the subject to be controlled, timer means for measuring a time interval from the last detection pulse signal to the present time, control means for changing the driving current when an output of the timer means exceeds a certain reference value, and reference value updating means for updating the reference value in accordance with an output of the displacement detecting means.

The reference value updating means may include speed detecting means for detecting a speed of the subject to be controlled by measuring a time interval between each detection signal generated by the displacement detecting means, and converting means for converting an output of the speed detecting means to the reference value in accordance with predetermined correspondence. An output of the converting means may be updated as a reference value every time the displacement detecting means generates the detection signal.

The converting means may calculate an allowable speed based on an output of the speed detecting means and a predetermined allowable accelerating value value, and generate the reference value in such a manner as to be proportional to an inverse of the allowable speed.

According to the present invention, a still another stepping motor control device, comprises a stepping motor including a rotor and a plurality of excitation coils, displacement detecting means for generating a detection pulse signal corresponding to a rotational displacement of the rotor, driving means for supplying a driving current to each excitation coil in accordance with an input command value, control means for controlling the stepping motor by changing the command value supplied to the driving means in accordance with a timing corresponding to the detection pulse signal of the displacement detecting means, and timer means for measuring a time interval from the last detection pulse signal to the present time. The control means changes a ratio of a driving current supplied to each excitation coil by changing the command value when an output of the timer means exceeds a reference value.

The stepping motor control device may further comprise means for changing the ratio of the driving current in such a direction as to delay an excitation phase of the stepping motor when a change in an intended speed is in a deceleration direction.

According to the present invention, a still another stepping motor control device for controlling a speed of a subject to be controlled by a driving current to the stepping motor, comprises displacement detecting means for generating a detection signal corresponding to a predetermined amount of displacement of the subject to be controlled, timer means for measuring a time interval from the last detection signal to the present time, and control means for changing the driving current when an output of the timer means exceeds a certain reference value. A change in the driving current is increased in accordance with an output of the timer means.

According to the present invention, a still another stepping motor control device, comprises a stepping motor including a rotor and an excitation coils, driving means for supplying a driving current to the excitation coils in accordance with an input command value, control means for controlling the stepping motor by changing the command value supplied to the driving means, displacement detecting means for generating a detection signal corresponding to a rotational displacement of the rotor, and timer means for measuring a time interval from the last detection signal to the present time. The control means switches between a first operation mode and a second operation mode, changes the command value supplied to the driving means in accordance with a timing generated by the control means itself in the first operation mode, and changes the command value supplied to the driving means in accordance with a timing corresponding to the detection signal of the displacement detecting means in the second operation mode, to control the stepping motor. The control means switches the operation mode from the second operation mode to the first operation mode when an output of the timer means exceeds a certain reference value.

The reference value may be a predetermined constant value.

The stepping motor control device may further comprise reference value updating means for updating the reference value in accordance with an output of the displacement detecting means. An output of the speed detecting means may be updated by converting to the reference value in accordance with correspondence predetermined by the reference value updating means every time the displacement detecting means generates the detection signal.

According to the present invention, a still another stepping motor control device, comprises a stepping motor including an armature and an excitation coil, control means for controlling an amplitude and an excitation phase of a driving current supplied to the excitation coils, and a position detecting means for generating a detection signal corresponding to a position of the armature. The control means provides a first operation mode and a second operation mode, the first and second operation modes being capable of being switched. In the first operation mode, an excitation phase of the driving current is controlled in accordance with a timing corresponding to the detection signal of the position detecting means. In the second operation mode, an excitation phase of the driving current is controlled in accordance with a timing generated by the control means itself. When an operation mode of the control means is switched from the first operation mode to the second operation mode, an amplitude of the driving current in the second operation mode is designed in accordance with an amplitude of the driving current in the first operation mode.

The control means may perform speed control of the stepping motor in accordance with a predetermined intended speed profile. The control means may decelerate the stepping motor with a first decelerating value in the first operation mode, and thereafter, decelerates the stepping motor with a second decelerating value in the second operation mode. The control means may set the first and second decelerating values to substantially the same value, and as an amplitude of the driving current in the first operation mode is decreased, an amplitude of the driving current in the second operation mode to decreased.

An amplitude Ia of the driving current in the first operation mode and an amplitude Ib of the driving current in the second operation mode may have a relationship represented by $$Ib = k \cdot |Ia| + C$$

where k and C are positive constants, Ia is positive when the driving current is supplied in such a direction as to accelerate the stepping motor and is negative when the driving current is supplied in such a direction as to decelerate the stepping motor.

The control means may perform speed control of the stepping motor in accordance with a predetermined intended speed profile. The control means may decelerate the stepping motor with a first decelerating value in the first operation mode, and thereafter, decelerates the stepping motor with a second decelerating value in the second operation mode. The control means may set the first and second decelerating values so that the first decelerating value is greater than the second decelerating value, and an amplitude Ia of the driving current in the first operation mode and an amplitude Ib of the driving current in the second operation mode have a relationship represented by $$Ib = k' \cdot |Ia + b| + C'$$

where k', b, and C' are positive constants, Ia is positive when the driving current is supplied in such a direction as to accelerate the stepping motor and is negative when the driving current Ia supplied in such a direction as to decelerate the stepping motor.

The control means may perform speed control of the stepping motor in accordance with a predetermined intended speed profile. The control means may decelerate the stepping motor with a first decelerating value in the first operation mode, and thereafter, decelerates the stepping motor with a second decelerating value in the second operation mode. The control means may set the first and second decelerating values so that the first decelerating value is smaller than the second decelerating value, and an amplitude Ia of the driving current in the first operation mode and an amplitude Ib of the driving current in the second operation mode has a relationship represented by $$Ib = k'' \cdot |Ia - b'| + C''$$

where k", b', and C" are positive constants, Ia is positive when the driving current is supplied in such a direction as to accelerate the stepping motor and is negative when the driving current is supplied in such a direction as to decelerate the stepping motor.

BRIEF DESCRIPTION OF THE DRAWINGS

FIGS. 1B and 1C are tables showing a relationship between an angular position θ of a rotor prior to starting and a command value in forced driving in Example 1 of the present invention.

FIG. 17 is a table defining a relationship between amplitudes Ia and Ib of current command values stored in a storage means in Example 5 of the present invention.

FIG. 20B is a table showing a relationship between an angular position θ of a rotor prior to starting and a command value for forced driving.

BEST MODE FOR CARRYING OUT THE INVENTION

Hereinafter, the present invention will be described by way of illustrative examples with reference to the accompanying drawings.

Example 1

Figure 1A:
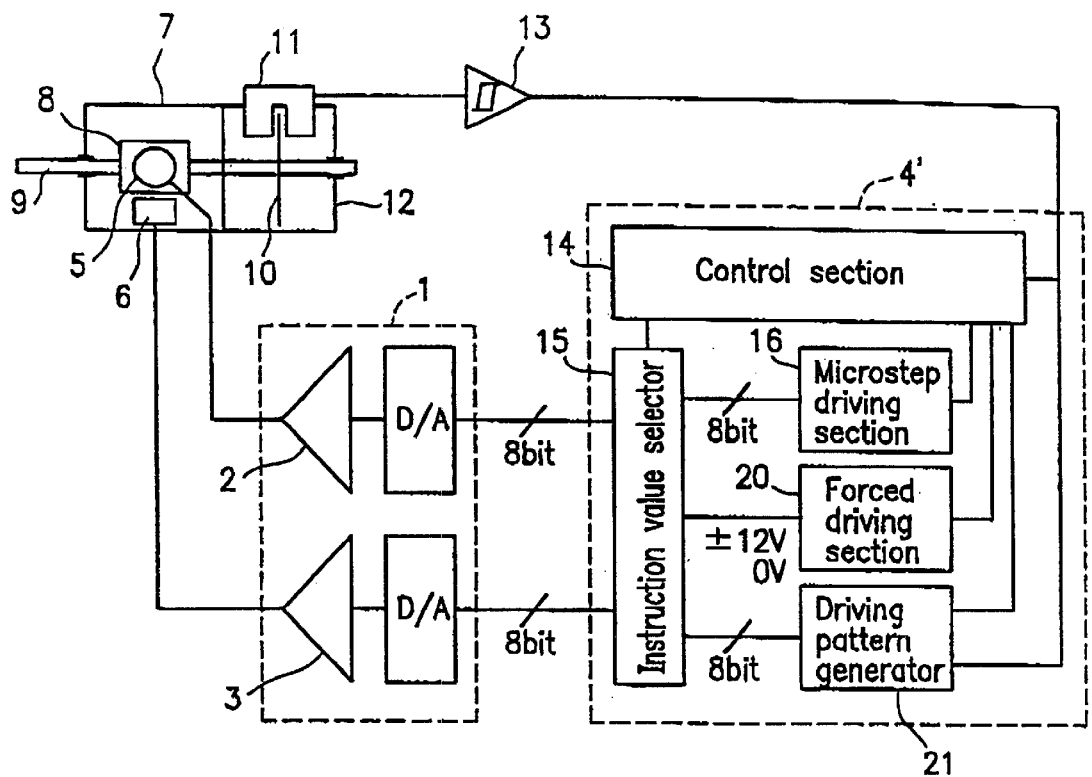
FIG. 1A is a block diagram showing a configuration of a stepping motor control device according to Example 1 of the present invention.

FIG. 1A is a block diagram showing a schematic configuration of a stepping motor control device according to Example 1 of the present invention. In FIG. 1, reference numeral 1 indicates a driving means, 2 indicates an A-phase current driver, 3 indicates a B-phase current driver, 4' indicates a control means, 5 indicates an A-phase stator, 6 indicates a B-phase stator, 7 indicates a stepping motor, 8 indicates a rotor, 9 indicates a rotor axis, 10 indicates a light shield plate, 11 indicates a photosensor, 12 indicates a housing, 13 indicates a binary conversion circuit, 14 indicates a control section, 15 indicates a command value selector, 16 indicates a microstep driving section, 20 indicates a forced driving section, and 21 indicates a driving pattern generation section.

The driving means 1 includes a current driver having two separate channels for the A- and B-phase current drivers 2 and 3. The driving means 1 drives the stepping motor by supplying a current to the A- and B-phase stators 5 and 6 based on digital data representing a current instruction amount, the digital data being output from the control means 4'. Specifically, the A- and B-phase current drivers 2 and 3 include a D/A converter for converting input digital data to an analog signal, and an amplifier for amplifying and outputting the analog signal from the D/A converter.

Further, the stepping motor 7 is of a two-phase PM type, and has a step angle of 18° upon two-phase excitation. The stepping motor 7 includes a rotor 8 including a permanent magnet in which five polarized poles for each of N and S poles are evenly spaced at intervals of an angle of 72° in a circumferential direction, and a two-phase excitation coil including the A- and B-phase stators 5 and 6. Further, the A- and the B-phase stators 5 and 6 each have a magnetic pole caused by a yoke which generates five poles for each of N and S poles at intervals of an angle of 72°. Each magnetic pole faces the rotor 8 when a current is applied to the excitation coil. The magnetic poles caused by the yokes of the A- and the B-phase stator 5 and 6 are deviated by 18° from each other.

A light shield plate 10 having slits provided at intervals of an angle of 4.5° is fixed to a rotor axis 9. The slit angle cycle value of 4.5° of the light shield plate 9 is determined to be an integral fraction (herein 1/16) of the angle cycle of 72° of the magnetic poles of the magnet of the rotor 8. Particularly, since the number of phases of the stepping motor 7 is two, the slit angle cycle value of 4.5° of the light shield plate 10 is also selected so as to satisfy a one divided by an integral multiple of 2 (i.e., 1/16=1/(2×8)) of the angle cycle of 72° of the magnetic poles of the magnet of the rotor 8.

A photosensor 11 is of a transmission type and includes an LED at a light emitting side thereof and a phototransistor at a light receiving side thereof. The photosensor 11 outputs an output signal depending on the presence or absence of a slit of the light shield plate 10. The photosensor 11 and the light shield plate 10 are accommodated in a housing 12 so as to be prevented from being damaged in handling or the like and smudged due to dust or the like. The output of the photosensor 11 is converted by a binary conversion circuit 13 to binary data. The binary conversion circuit 13 does not output "High" or "Low" only by comparing the output of the photosensor 11 with a certain reference value, but switches outputs of "High" and "Low" only when the output of the photosensor 11 to transferred between the two reference values, thereby preventing an erroneous operation due to chattering. The output of the binary conversion circuit 13 is input to the control means 4'.

The control means 4' includes a control section 14, a command value selector 15, a microstep driving section 16, a forced driving section 20, and a driving pattern generation section 21.

The microstep driving section 16 performs microstep driving for controlling the rest angle of the rotor 8 with a high resolution, by varying a current command value in accordance with a signal from the control section 14 to change a ratio of a current through the A-phase stator 5 to a current through the B-phase'stator 6 of the stepping motor 7. A relationship between the rest angle of the rotor 8 and the current ratio is dependent on the states of a magnetic circuit and a load of the stepping motor 7. Therefore, current command values for providing evenly spaced rest angles of the rotor 8 are determined as a function or a table. This leads to a consistent relationship between the rest angle of the rotor 8 and the output of the microstep driving section 16. The rest angular position of the rotor 8 can be determined from the output of the microstep driving section 16.

The forced driving section 20 generates sixteen command values for forced driving as shown in FIGS. 1B and 1C, based on information on the angular position of the rotor 8 prior to starting, the rotor 8 being held by the output of the microstep driving section 16. A driving voltage determined by the command value from the forced driving section 20 to the driving means 1 takes three values, i.e., +12 V, −12 V, and 0 V when a power supply voltage is 12 V. In FIGS. 1B and 1C, a rotational direction is a direction in which the rotor 8 of the stepping motor 7 is intended to be rotated, and an angular position θ is the angular position of the rotor 8 prior to starting, the rotor 322 being held by the output of the microstep driving section 16, where the angular position is 0° when only the A-phase stator 5 is excited in a positive direction and is represented by an electrical angle where a clockwise direction is positive.

A relationship between the electrical angle θ and an actual angle θ1 is given as follows:

$$\theta 1 = \theta/5 + 72N \quad \text{(formula 2)}$$

where N is any integer of 0 to 4. Thereby, the stepping motor 7 is forcedly driven.

The driving pattern generation section 21 includes a programmable counter and the like, and as a command value generating means, generates a command value to the driving means 1 by dividing the output of the binary conversion circuit 13. In this case, the driving pattern generation section 21 also serves as an excitation switching timing generating means, so that the division pattern can be selected from predetermined patterns in accordance with a signal from the control section 14. A driving voltage can take an arbitrary value in accordance with a command value from the driving pattern generation section 21 to the driving means 1.

The command value selector 15 selects one of the output of the driving pattern generation section 21, the output of the forced driving section 20, and the output of the microstep driving section 16 in accordance with a signal from the control section 14.

The control section 14 controls the driving pattern generation section 21, the forced driving section 20, the microstep driving section 16, and the command value selector 15 in accordance with the information on the angular position of the rotor 8 prior to starting, the rotor 8 being held by the output of the microstep driving section 16, and the output of the binary conversion circuit 13.

An operation of the thus-constructed control device for a stepping motor will be described.

According to the configuration of Example 1, the motor needs to be actuated by certain forced driving. When the stepping motor is rotated by a certain angle or more, the control means 14 supplies information, such as the information on the angular position of the rotor 8 prior to starting, the rotor 8 being held by the output of the microstep driving section 16, a direction in which the rotor 8 is rotated, and the like, to the forced driving section 20. Thereby, the command value selector 15 is caused to select the output of the forced driving section 20. The forced driving means 20 outputs a new command value to the driving means 1 in accordance with FIGS. 1B and 1C based on these pieces of information, independent of the output of the binary conversion circuit 13. Thereby, the rotor 8 begins to be rotated, while the binary conversion circuit 13 outputs pulses at intervals of an actual rotational angle of 4.5°.

When output of the pulses begins, the control section 14 outputs information, such as the information on the angular position of the rotor 8 prior to starting, the rotor 8 being held by the output of the microstep driving section 16, a direction in which the rotor 8 is rotated, and the like, to the driving pattern generation section 21. Thereby, the command value selector 15 is caused to select the output of the driving pattern generation section 21. The driving pattern generation section 21 generates a command value for the driving means 1 by dividing the output of the binary conversion circuit 13 in accordance with a predetermined pattern. Thereby, a sequence of command values are output to the driving means 1 in such a manner that the timing is associated with the output from the binary conversion circuit 13.

Figure 2:
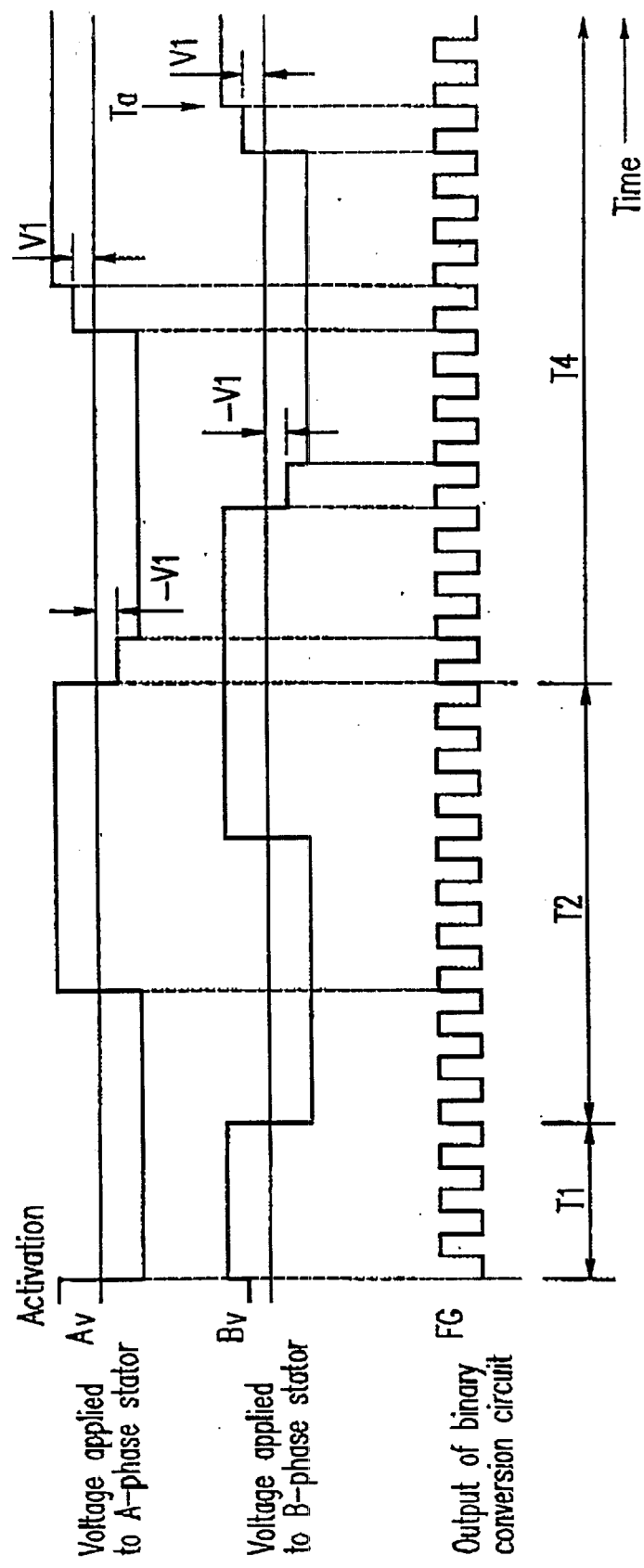
FIG. 2 is a timing chart showing a temporal relationship between driving voltages applied to the excitation coils of A-phase and B-phase stators and the output of a binary conversion circuit in Example 1 of the present invention.

The sequence of the command values is shown in FIG. 2 where a driving voltage applied to each excitation coil is 12 V at maximum, a driving voltage of 12 V is applied to the excitation coil of the A-phase stator 5 and a driving voltage of 0 V is applied to the excitation coil of the B-phase stator 6, and where the rotor 8 is actuated under such conditions.

FIG. 2 is a timing chart showing a temporal relationship between driving voltages applied to the excitation coils of the A-phase and B-phase stators and the output of the binary conversion circuit. In FIG. 2, AV shows a relationship between time and a voltage applied to the excitation coil of the A-phase stator 5 as a result of the command value being input from the control means 4' to the driving means 1. BV shows a relationship between time and a voltage applied to the excitation coil of the B-phase stator 6. FG shows a relationship between time and the output of the binary conversion circuit 13.

In FIG. 2, driving independent of the output of the binary conversion circuit 13 is performed in an interval T1 as described above. As a result, in an interval T2, driving is performed in such a manner that the timing is associated with pulses output from the binary conversion circuit 13. In an interval T4, normally, the outputs of the A-phase and the B-phase are alternately reversed every four pulses output from the binary conversion circuit 13. The output voltages are normally +12 V and −12 V. It should be noted that the output voltage takes a low value, i.e., ±1, for a time corresponding to a cycle of an output of the binary conversion circuit 13 immediately after an output of each phase is reversed.

Figure 3:
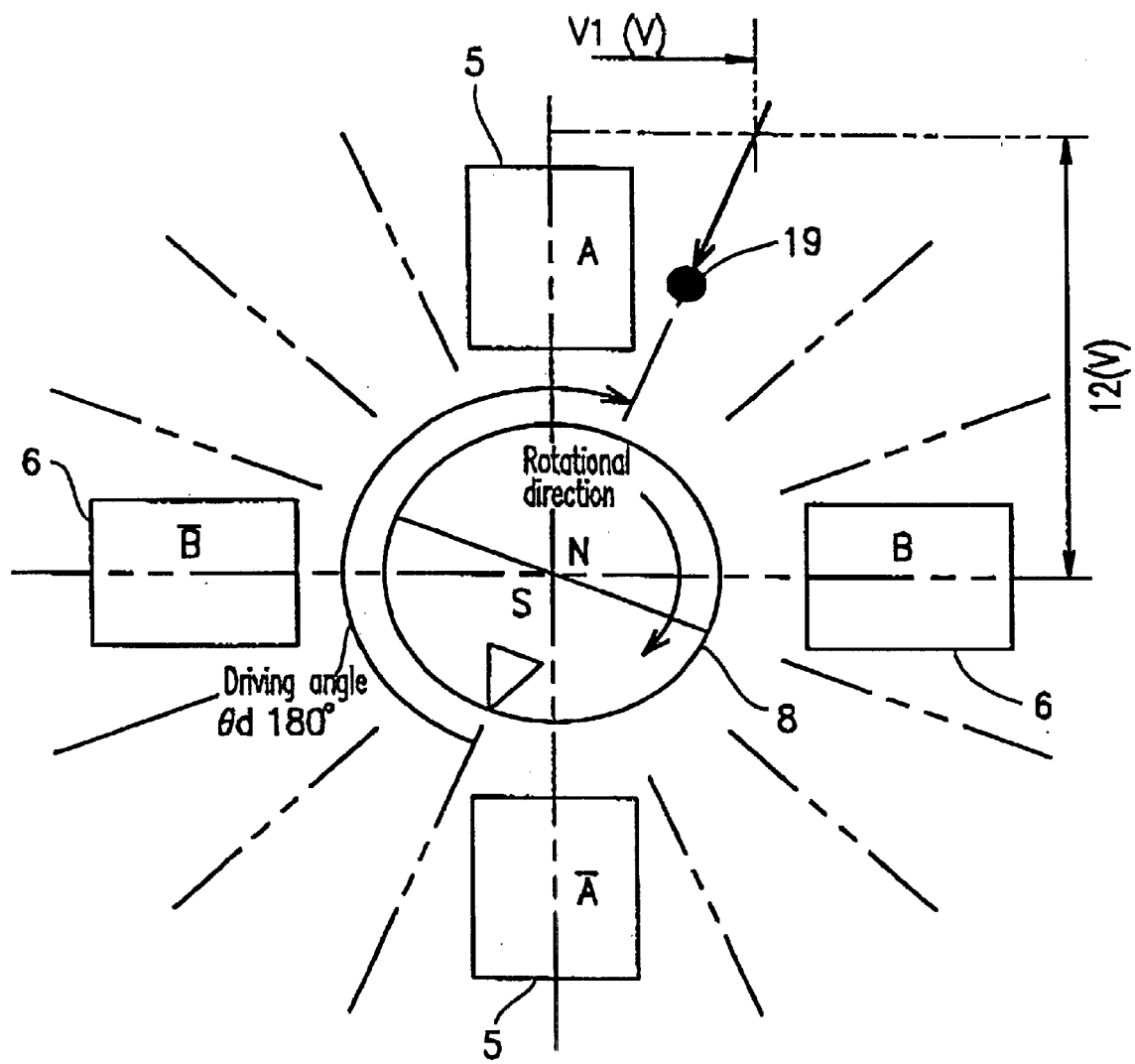
FIG. 3 is a relationship between the phases of the rotor and driving at time Ta in FIG. 2 in Example 1 of the present invention.

FIG. 3 shows a relationship between the phases of the rotor and driving at time Ta in FIG. 2. It should be noted that in FIG. 3, 18° is depicted as 90°. In FIG. 3, reference numeral 5 indicates an A-phase 'stator, 6 indicates a B-phase stator, 8 indicates a rotor, 19 indicates a virtual N pole, and θd indicates a driving angle.

The virtual N pole 19 is generated by combining magnetic fields generated by the A-phase stator 5 and the B-phase stator 6. The S pole of the rotor 8 is attracted in a direction of the virtual N pole. The S pole of the rotor 8 is attracted to the virtual, N pole 19. An angle by which the rotor 8 is to be rotated is the driving angle θd.

In this case, as shown in FIG. 3, the driving angle θd is 180° which is the upper limit, as is the conventional example. However, the phases of the output of the binary conversion circuit 13 are switched at a time substantially one cycle earlier than the conventional example. Therefore, a correction amount for a delay time due to an inductance component can be large.

It should be noted that a relationship between the driving maximum voltage Vmax and V1 is represented by:

$$V1 = V\text{max} \cdot \tan 22.5° \quad \text{(formula 3)}.$$

When Vmax 12 V, V1 is equal to about 5 V.

Even when V1=0 V for the purpose of simplification of the circuit, a substantial effect can be obtained.

As shown in FIGS. 1B and 1C, by providing an excitation pattern having a single phase rather than two phase excitation in addition to a command value pattern of the forced driving, angular positions at which the rotor 8 is driven by electromagnetic force occur in eight positions, i.e., 0°, 45°, 90°, 135°, 180°, 225°, 270° and 315°. Thus, the angular position at which the rotor 8 is rotated by electromagnetic force varies in the range from 90° to 135°. Thus, the variation is reduced.

Figure 4:
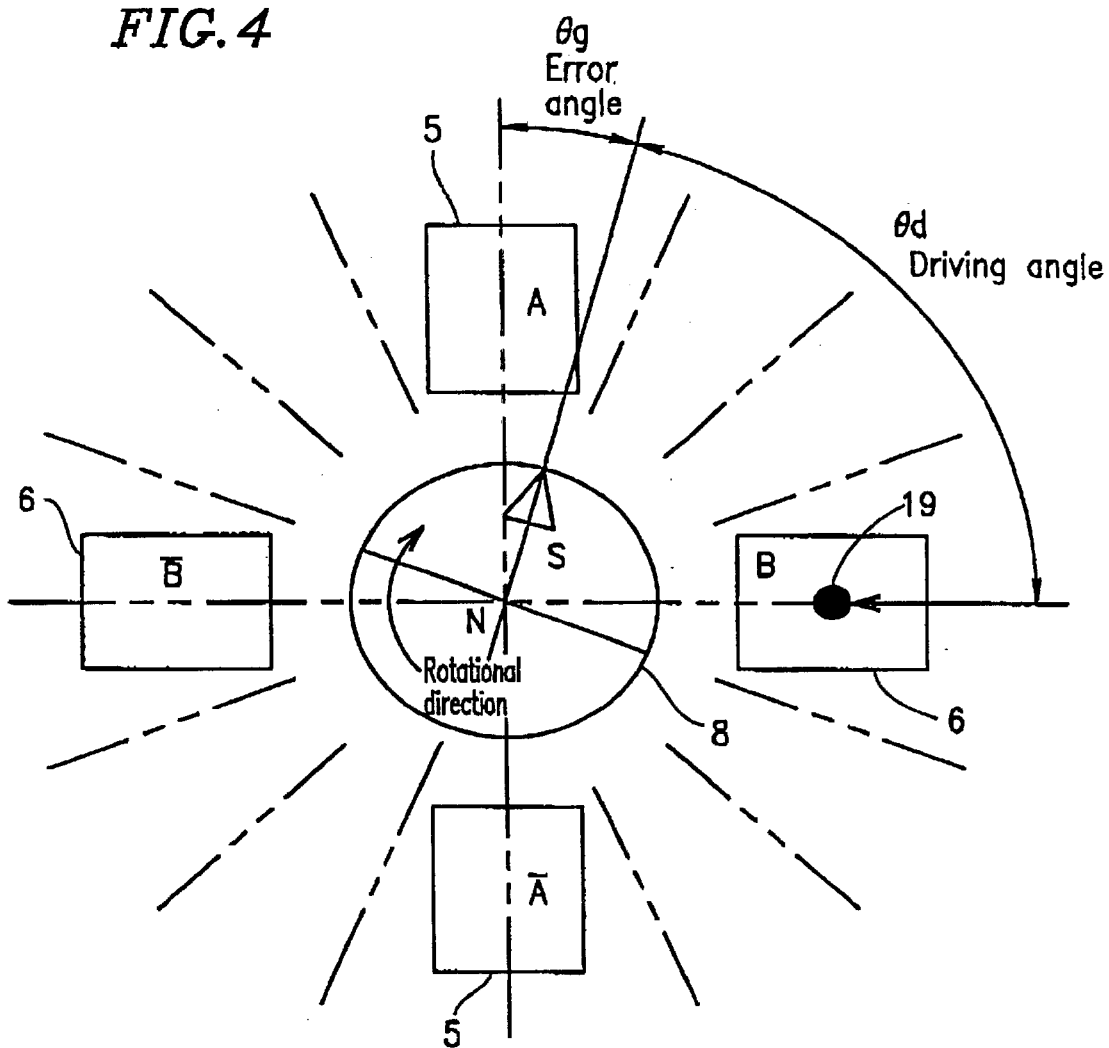
FIG. 4 is a relationship between the position of the rotor and an electromagnetic force when the rotor is shifted towards a rotational direction in Example 1 of the present invention.

For example, FIG. 4 shows a relationship between the position of the rotor 8 and electromagnetic force when the rotor 8 is actuated from a position smaller than θ=0° and the actual position of the rotor 8 is shifted towards the rotational direction.

The driving angle θd to considerably small due to the error angle eg. However, in Example 1, when an error angle θg is zero, the driving angle θd is 90°. Therefore, even if there exist an error angle θg of a certain size, the rotor 8 can be actuated by the driving angle θd which is close to 90° at which the maximum torque is obtained, resulting in a large decrease in the possibility of an actuation failure.

Example 2

Figure 5:
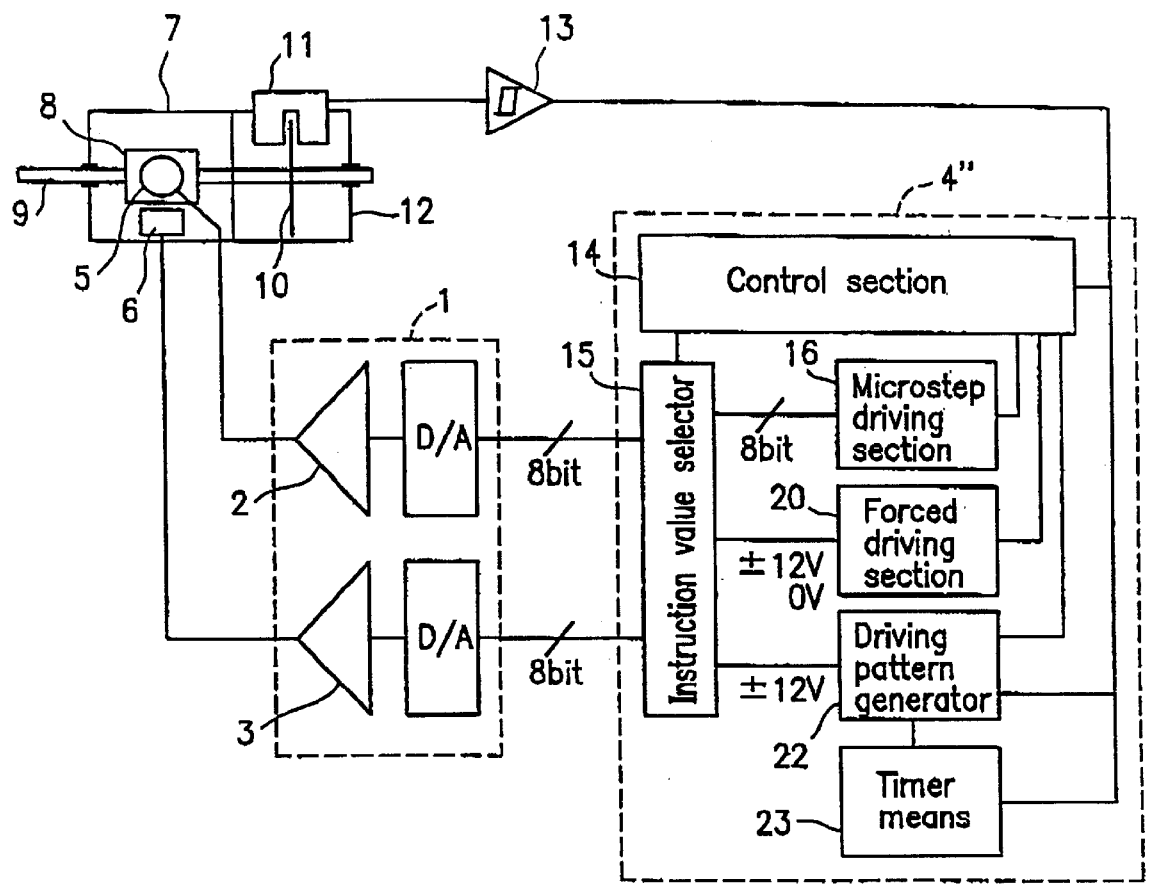
FIG. 5 is a block diagram showing a configuration of a stepping motor control device according to Example 2 of the present invention.

FIG. 5 is a block diagram showing a schematic configuration of a stepping motor control device according to Example 2 of the present invention. In FIG. 5, reference numeral 1 indicates a driving means, 2 indicates an A-phase current driver, 3 indicates a B-phase current driver, 4" indicates a control means, 5 indicates an A-phase stator, 6 indicates a B-phase stator, 7 indicates a stepping motor, 8 indicates a rotor, 9 indicates a rotor axis, 10 indicates a light shield plate, 11 indicates a photosensor, 12 indicates a housing, 13 indicates a binary conversion circuit, 14 indicates a control section, 15 indicates a command value selector, 16 indicates a microstep driving section, 20 indicates a forced driving section, 22 indicates a driving pattern generation section, and 23 indicates a timer means.

FIG. 5 of Example 2 shows the same configuration as shown in FIG. 1 of Example 1, but the timer means 23 is additionally provided. The internal structures and operations of a driving means 1, a stepping motor 7, a binary conversion circuit 13, and the like are similar to Example 1. The same descriptions are thus omitted. As shown in FIG. 5, the control means 4W includes a control section 14, a command value selector 15, a microstep driving section 16, a forced driving section 20, and a driving pattern generation section 22, and a timer means 23. A brief description of these sections will be provided below.

The microstep driving section 16 performs microstep driving for controlling the rest angle of the rotor 8 with a high resolution, by varying a current command value in accordance with a signal from the control section 14 to change a ratio of a current through the A-phase stator 5 to a current through the B-phase stator 6 of the stepping motor 7. A relationship between the rest angle of the rotor 8 and the current ratio is dependent on the states of a magnetic circuit and a load of the stepping motor 7. Therefore, current command values for providing evenly spaced rest angles of the rotor 8 are determined as a function or a table. This leads to a consistent relationship between the rest angle of the rotor 8 and the output of the microstep driving section 16. The rest angular position of the rotor 8 can be determined from the output of the microstep driving section 16.

Similar to Example 1, the forced driving section 20 generates sixteen command values for forced driving as shown in FIGS. 1B and 1C, based on information on the angular position of the rotor 8 prior to starting, the rotor 8 being held by the output of the microstep driving section 16. Thereby, the stepping motor 7 is forcedly driven.

The driving pattern generation section 22 includes a programmable counter and the like, and generates a command value to the driving means 1 by dividing the output of the binary conversion circuit 13. The division pattern can be selected from predetermined patterns in accordance with a signal from the control section 14. A driving voltage can take +12 V and −12 V in accordance with a command value from the driving pattern generation section 22 to the driving means 1, when the power supply voltage is 12 V.

The command value selector 15 selects one of the output of the driving pattern generation section 22, the output of the forced driving section 20, and the output of the microstep driving section 16 in accordance with a signal from the control section 14.

The control section 14 controls the driving pattern generation section 22, the forced driving section 20, the microstep driving section 16, and the command value selector 15 in accordance with a rotational direction, the information on the angular position of the rotor 8 prior to starting, the rotor 8 being held by the output of the microstep driving section 16, and the output of the binary conversion circuit 13.

The timer means 23 receives the output of the binary conversion circuit 13 and performs outputting a predetermined time after the outputting of the binary conversion circuit 13.

An operation of the thus-constructed control device of Example 2 for a stepping motor will be described with reference to the drawings. Similar to Example 1, when the stepping motor 7 is rotated, the control means 14 supplies information, such as the information on the angular position of the rotor 8 prior to starting, the rotor 8 being held by the output of the microstep driving section 16, a direction in which the rotor 8 is rotated, and the like, to the forced driving section 20. Thereby, the command value selector 15 is caused to select the output of the forced driving section 20. The forced driving means 20 outputs a new command value to the driving means 1 in accordance with these pieces of information (FIG. 13), (FIG. 1C), independent of the output of the binary conversion circuit 13. Thereby, the rotor 8 begins to be rotated while the binary conversion circuit 13 outputs pulses at intervals of an actual rotational angle of 4.5°.

When output of the pulses begins, the control section 14 outputs information such as the information on the angular position of the rotor 8 prior to starting, the rotor 8 being held by the output of the microstep driving section 16, a direction in which the rotor 8 is rotated, and the like, to the driving pattern generation section 22. Thereby, the commend value selector 15 is caused to select the output of the driving pattern generation section 22.

The driving pattern generation section 22 generates a command value for the driving means 1 by dividing the output of the binary conversion circuit 13 in accordance with a predetermined pattern. Thereby, a sequence of command values are output to the driving means 1 in such a manner that the timing is associated with the output from the binary conversion circuit 13.

Figure 6:
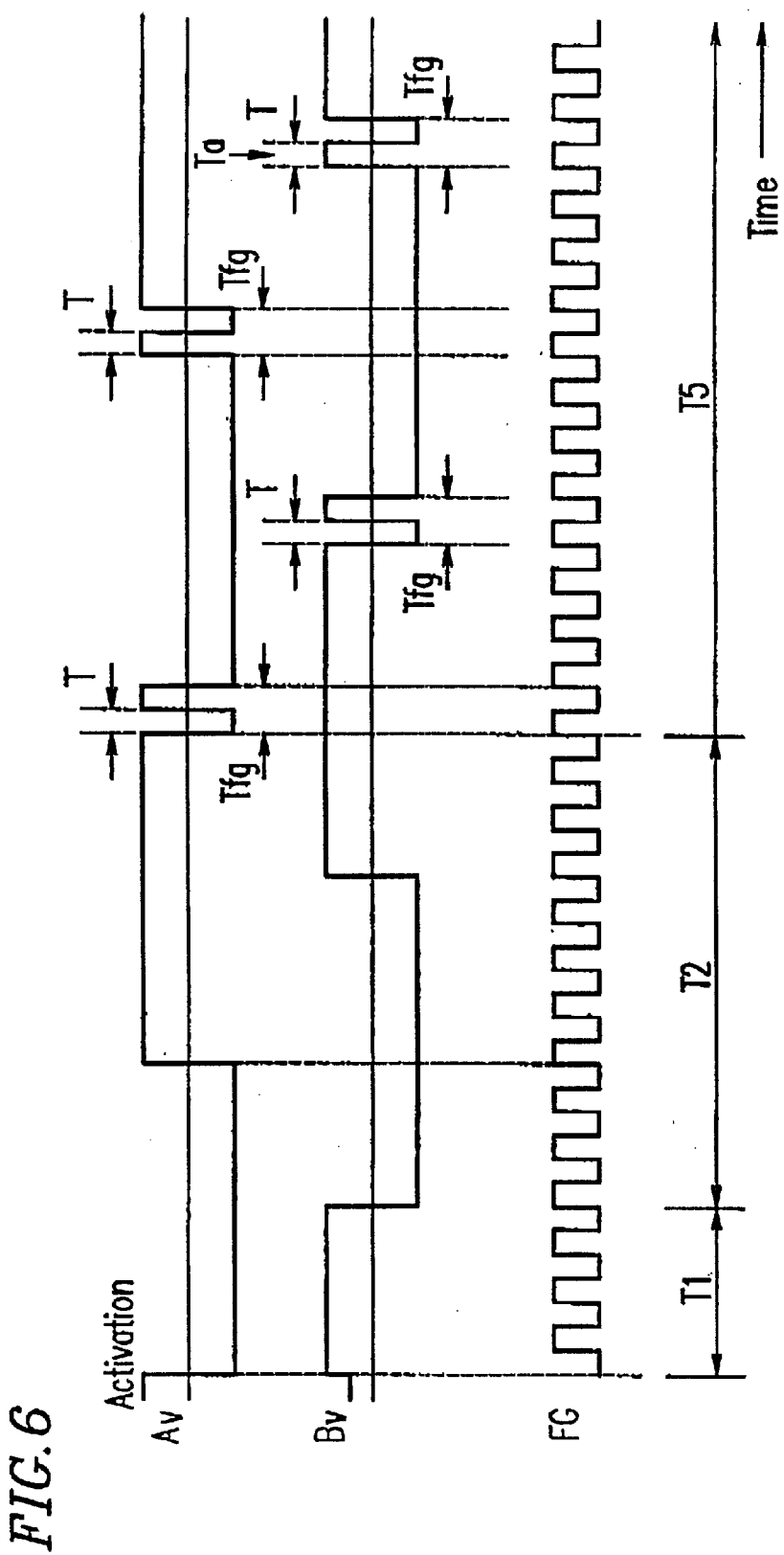
FIG. 6 is a timing chart showing a temporal relationship between driving voltages applied to the excitation coils of A-phase and B-phase stators and an output of a binary conversion circuit in Example 2 of the present invention.

The sequence of the command values is shown in FIG. 6 where a driving voltage applied to each excitation coil is 12 V at maximum, a driving voltage of 12 V is applied to the excitation coil of the A-phase stator 5 and a driving voltage of 0 V is applied to the excitation coil of the B-phase stator 6, for example, and the rotor 8 is actuated under such conditions.

FIG. 6 is a timing chart showing a temporal relationship between driving voltages applied to the excitation coils of the A-phase and B-phase stators and the output of the binary conversion circuit. In FIG. 6, Av shows a relationship between time and a voltage applied to the excitation coil of the A-phase stator 5 as a result of the command value being input from the control means 4" to the driving means 1. Bv shows a relationship between time and a voltage applied to the excitation coil of the B-phase stator 6. FG shows a relationship between time and the output of the binary conversion circuit 13.

In FIG. 6, driving independent of the output of the binary conversion circuit 13 is performed in an interval T1 as described above. As a result, in an interval T2, driving is performed in such a manner that the timing is associated with pulses output from the binary conversion circuit 13. In an interval T5, the outputs of the A-phase and the B-phase are alternately reversed substantially every four pulses output from the binary conversion circuit 13. The output voltages are +12 V and −12 V. It should be noted that after each phase has been reversed, the output of each phase is caused to be returned to the same value as that prior to the reversing from a predetermined time T determined by the timer means 23 to time Tfg, i.e., for a time corresponding to a cycle of the output of the binary conversion circuit 13. The output does not need to be returned to exactly the same value as that prior to the reversing, and may be equal to zero V.

Figure 7:
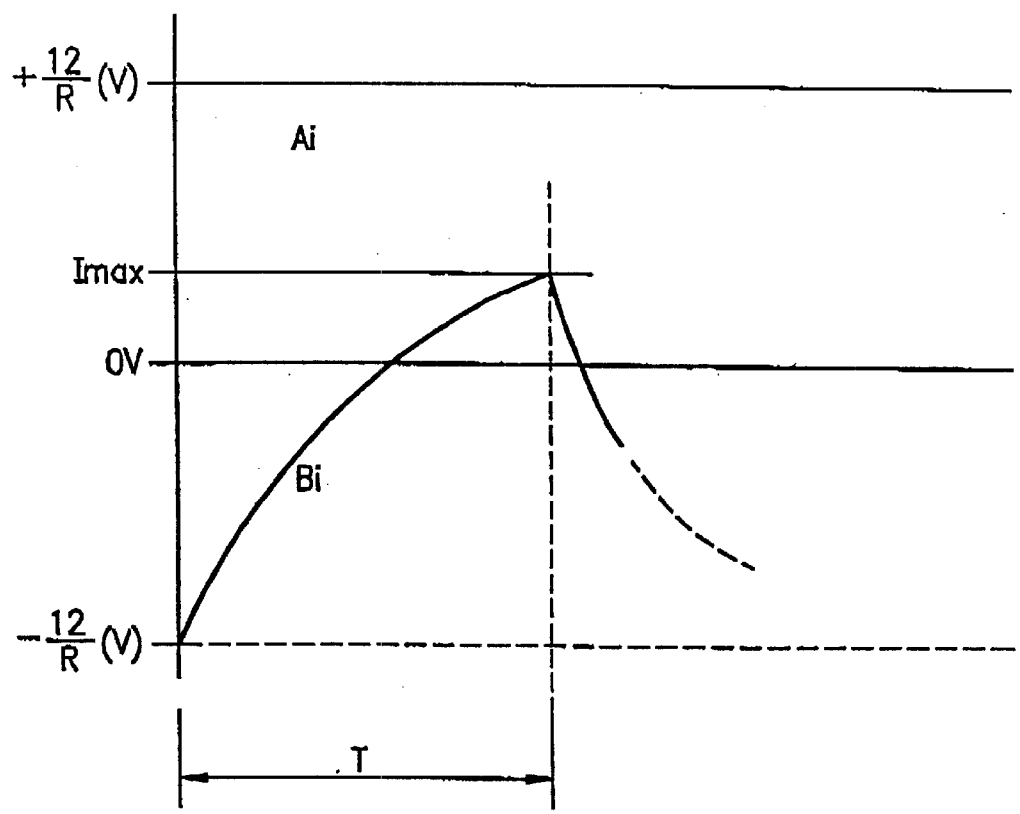
FIG. 7 is a diagram showing temporal changes in currents of the A- and B-phases at time Ta of FIG. 6, where the number of revolutions is low and time T<Tfg.

FIG. 7 shows temporal changes in currents of the A- and B-phases at time Ta of FIG. 6, where the number of revolutions is low and T<Tfg. In FIG. 7, Ai shows a temporal change in the A-phase current, and Bi shows a temporal change in the B-phase current. As shown in FIG. 7, the rising of a current to delayed due to the inductance component of a coil when a voltage is reversed. At time Ta of FIG. 6, the current takes a value of Imax smaller than a value of 12(V)/R (R=the resistance of a coil DC). The current does not exceed such a value until time Tfg. Imax is a certain value determined by the inductance of the coil, the coil DC resistance, and time T.

Figure 8:
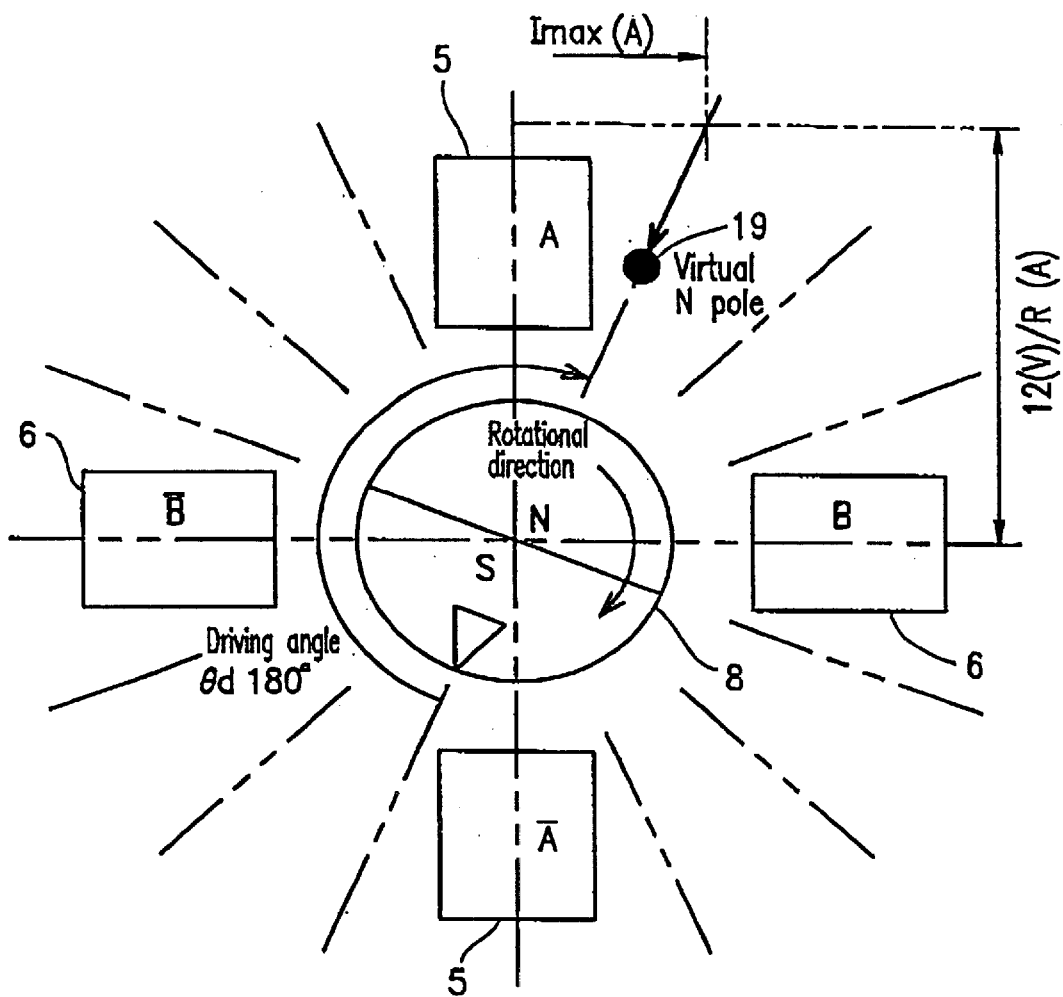
FIG. 8 is a diagram showing a relationship between the phases of the rotor and the driving at time Ta of FIG. 6 in Example 2 of the present invention.

FIG. 8 is a diagram showing a relationship between the phases of the rotor and the driving at time Ta of FIG. 6. It should be noted that in FIG. 8, 18° is depicted as 90°, In FIG. 8, reference numeral 5 indicates an A-phase stator, 6 indicates a B-phase stator, 8 indicates a rotor, 19 indicates a virtual N pole, and θd indicates a driving angle.

The virtual N pole 19 is generated by combining magnetic fields generated by the A-phase stator 5 and the B-phase stator 6. The S pole of the rotor 8 is attracted in a direction of the virtual N pole. The S pole of the rotor 8 is attracted to the virtual N pole 19. An angle by which the rotor 8 is to be rotated is the driving angle θd.

When an appropriate value of time T is selected, the driving angle θd can be smaller than or equal to 180° even at time Ta of FIG. 6, as shown in FIG. 8.

When the number of revolutions is increased and time T>Tfg, there is no interval in which the output is returned to a value prior to reversing. Phase switching it performed a time corresponding to a cycle of the output of the binary conversion circuit 13 earlier than the conventional example. A correction amount of the delay time due to the inductance component can be large.

Further, similar to Example 1, by providing an excitation pattern having a single phase rather than two phase excitation in addition to a command value pattern of the forced driving, an angular position at which the rotor 8 is driven by electromagnetic force occur at one of eight positions, i.e., 0°, 45°, 90°, 135°, 180°, 225°, 270° and 315°. Thus, the angular position at which the rotor 8 is rotated by electromagnetic force varies in the range from 90° to 135°. Thus, the variation is reduced.

Therefore, even if there exist an error angle of a certain size, the rotor 8 can be actuated by the driving angle θd which is close to 90°, resulting in a large decrease in the possibility of an actuation failure.

Example 3

Figure 9:
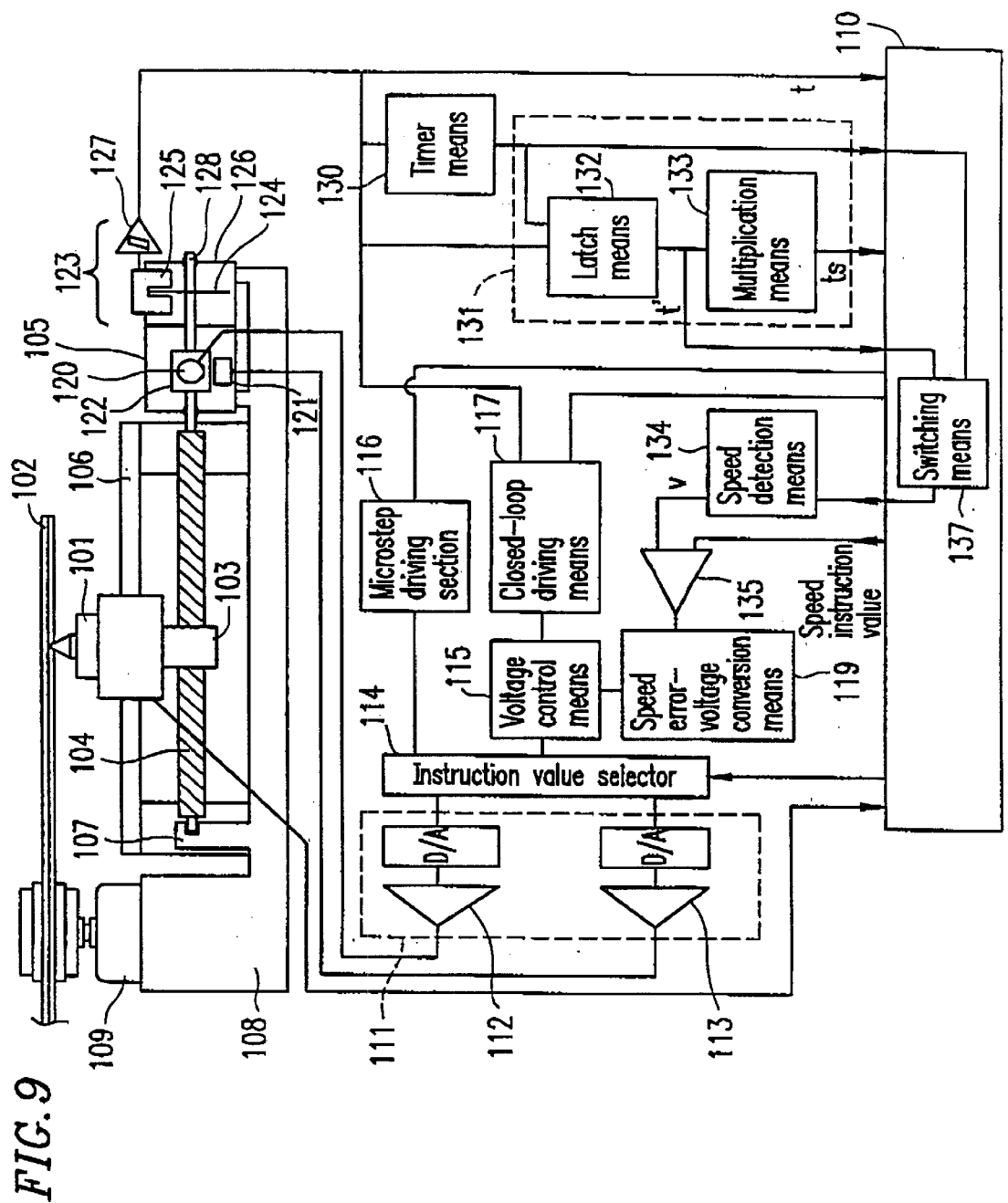
FIG. 9 is a block diagram showing a configuration of a stepping motor control device according to Example 3 of the present invention.
Figure 10:
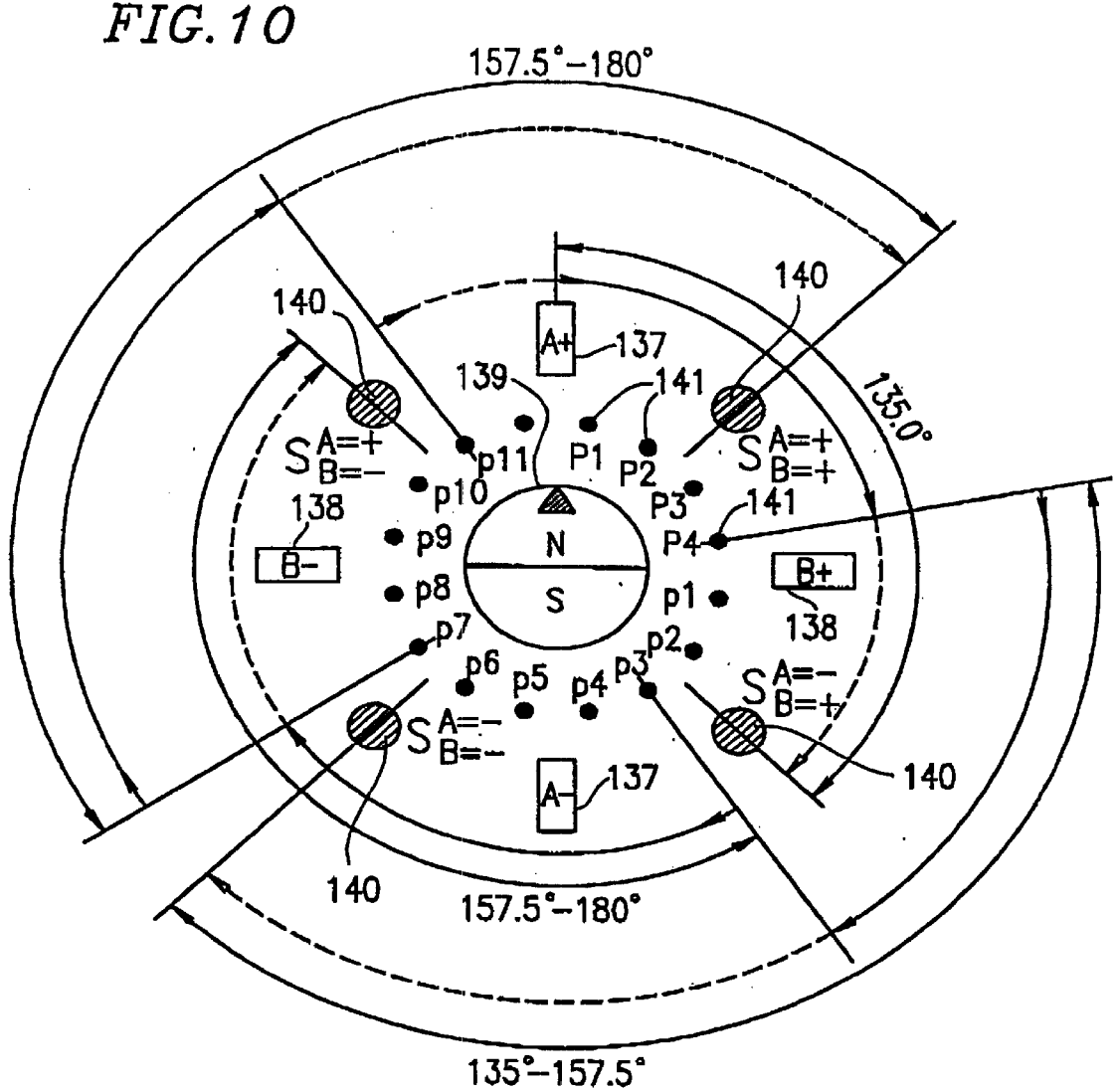
FIG. 10 is a diagram used for explaining a relationship between a position of a rotor and a position of excitation upon closed-loop control for a stepping motor in Example 3 in the stepping motor control device of the present invention.
Figure 11:
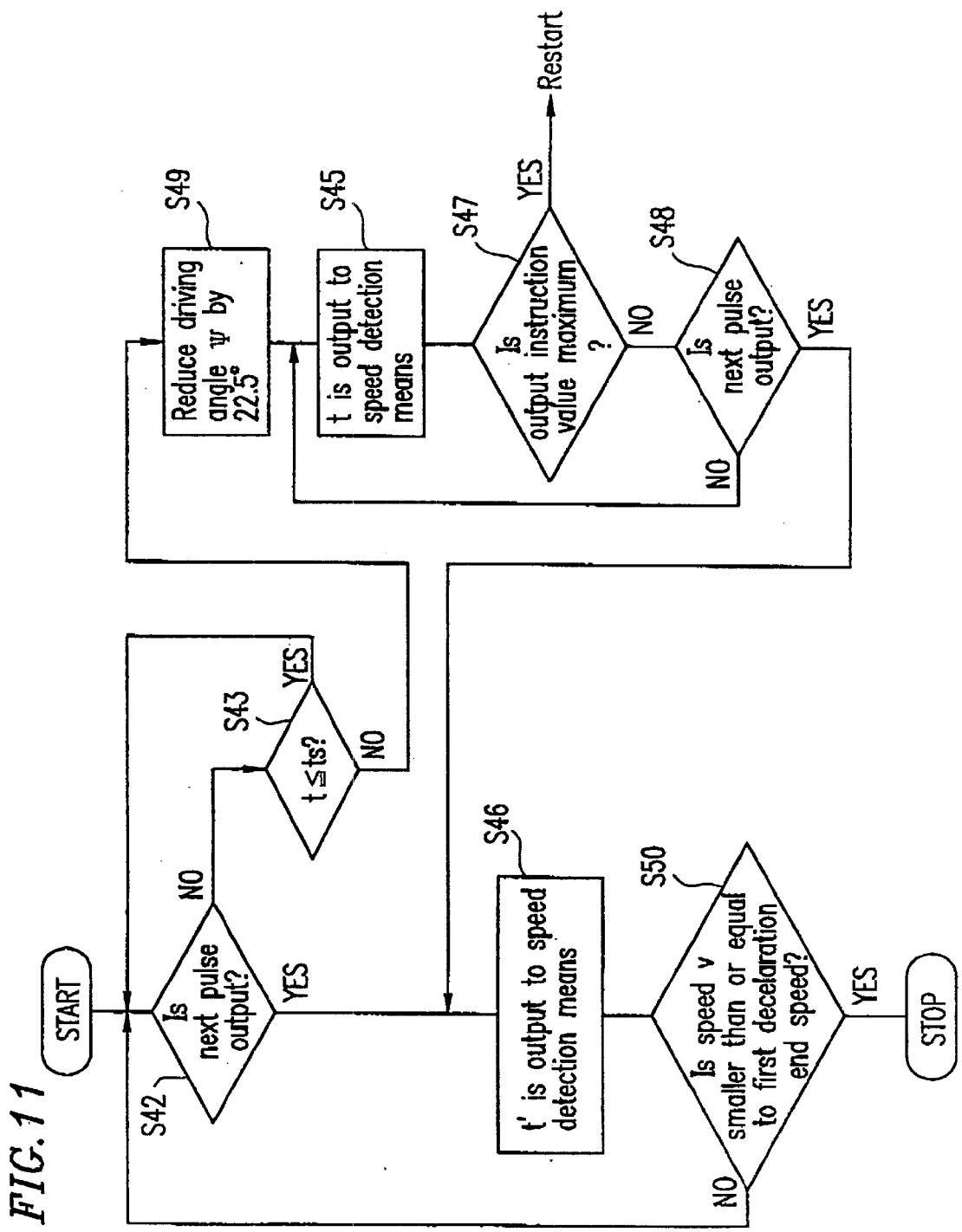
FIG. 11 is a flowchart showing a control of a stepping motor control device according to Example 3 of the present invention upon first deceleration.

FIG. 9 is a block diagram showing a configuration of a stepping motor control device according to Example 3 of the present invention. The control device of Example 3 is applied to an optical disk drive. FIG. 10 is a diagram used for explaining a relationship between the position of a rotor and the position of excitation upon the close-loop control for the stepping motor in Example 3, in the stepping motor control device of the present invention. FIG. 11 is a flowchart showing a control of the stepping motor control device of the present invention upon first deceleration.

In FIG. 9, reference numeral 101 indicates a head which optically records and reproduces information to and from an optical disk 102. A nut piece 103 attached to the head 101 is engaged with the grooves of a lead screw 104. The lead screw 104 has a screw pitch of 3 mm and is coupled with a stepping motor 105. Therefore, the head 101 is straightly driven back and forth along a guide shaft 106 in accordance with the rotation of the stepping motor 105. Reference numeral 107 indicates a bearing which is fixed to a chassis 108 and supports the screw 104 so that the screw 104 is freely rotated. A spindle motor 109 drives and rotates the optical disk 102. When the head 101 is moved to an intended position, a direction and a distance in which the head 101 is moved are determined based on the addresses of a current position and an intended position stored in the optical disk 102. In accordance with the direction and distance, a control means 110 performs a control operation for the stepping motor 105.

The stepping motor 105 is of a two-phase PM type and has a step angle of 18° in two-phase excitation. The stepping motor 105 includes a rotor 122, and a two-phase exciting coil having an A-phase stator 120 and a B-phase stator 121. The rotor 122 includes a permanent magnet in which five polarized poles for each of N and S poles are spaced at intervals of an angle of 72°. The A-phase stator 120 and the B-phase stator 121 each have excited N and S poles at intervals of an angle of 72° and yokes which generates five N poles and five S poles in one cycle of circumference. These yokes are provided around the rotor. The magnetic poles of the A-phase stator and the B-phase stator are deviated by 18° from each other.

A displacement detecting means 123 includes a light shield plate 124, a photosensor 125, a housing 126 and a binary conversion circuit 127, The light shield plate 124 is a circular plate having slits provided at intervals of an angle of 4.5, and is fixed to a rotor axis 128. The slit angle cycle value of 4.5° of the light shield plate 124 is determined to be an integral fraction (herein ¹⁄₂₀) of the angle cycle of 72° of the magnetic pole formation of the magnet of the rotor 122. Particularly, since the number of phases of the stepping motor 105 is two, the slit angle cycle value of 4.5° of the light shield plate 124 is also selected so as to satisfy a one divided by an integral multiple of 2 (i.e., 20=1/(2×8)) of the angle cycle of 72° of the magnetic poles of the magnet of the rotor 122. The photosensor 125 is of a transmission type and includes an LED at a light emitting side thereof and a phototransistor at a light receiving side thereof. The photosensor 125 outputs an output signal depending on the presence or absence of a slit of the light shield plate 124. The photosensor 125 and the light shield plate 124 are accommodated in a housing 126 so as to be prevented from being damaged in handling or the like and smudged due to dust or the like. The output of the photosensor 125 is converted by the binary conversion circuit 127 to binary data.

With such a configuration, the displacement detecting means 123 generates a single pulse every rotational angle of 4.5° of the stepping motor 105, and detects the rotational angle of the stepping motor. The rotor axis 128 is rotated together with the lead screw 104. Since the screw pitch of the lead screw 104 is 3 mm, the displacement detecting means 123 generates a single pulse every time the head 101 is moved by 0.0375 mm. The output of the displacement detecting means 123 is input to the control means 110, a timer means 130, a reference value updating means 131, and a closed-loop driving means 117.

A driving means 111 includes an A-phase current driver 112 and a B-phase current driver 113 which are independent two-channel current drivers. The current drivers 112 and 113 supply a current to an A-phase stator 120 and a B-phase stator 121, respectively, based on digital data representing a respective current instruction amount output from the command value selector 114, thereby driving the stepping motor 105. Specifically, the A- and B-phase current drivers 112 and 113 include a D/A converter for converting received digital data to an analog signal, and an amplifier for amplifying the analog signal from the D/A converter and outputting the amplified analog signal.

The microstep driving means 116 outputs digital data representing a current command value to the driving means 111 in accordance with a timing signal internally generated by the microstep driving means 116 itself, thereby performing microstep driving using open-loop control. Specifically, the microstep driving is performed by changing a ratio of a driving current through the A-phase stator 120 to a driving current through the B-phase stator 121, thereby controlling the rest angle of the rotor 122 with a high resolution.

The closed-loop driving means 117 normally detects a magnetic pole of the rotor 122 by converting the output of the displacement detecting means 123 by means of division or the like. In accordance with the timing of such detection, current command values are switched, thereby performing closed-loop driving of the stepping motor. Specifically, when the stepping motor 105 is actuated by the closed-loop driving means 117 to be rotated, initial excitation states of the A- and B-phase stators 120 and 121 are selected based on information on the angular position of the rotor 122 prior to starting, the rotor 122 being held by the output of the microstep driving means 116, and an output pulse of the displacement detecting means 123 is initially positioned with a magnetic pole of the rotor 122. Thereby, when a pulse is output from the displacement detecting means 123 after the rotor 122 begins to be rotated, the closed-loop driving means 117 counts the pulse, and switches current command values every predetermined number of pulses.

A voltage control means 115 changes a voltage to be output, based on a speed v described later and information from a speed error-voltage converting means 119 which receives an output from a speed comparator 135 for calculating an error of a speed command value.

The timer means 130 has a cycle sufficiently shorter than the output of the displacement detecting means 123, and includes a reference clock generator for generating a reference clock having a sufficiently small cycle error, a counter for counting reference clocks, and the like. The timer means 130 counts clocks from a time when the last pulse is output by the displacement detecting means 123 to a current point in time, to measure a time from the last pulse output by the displacement detecting means 123, and outputs the value of t.

The reference value updating means 131 includes a latch 132 and a multiplication means 133. The reference value updating means 131 outputs a reference value of is which is a reference to be compared with the output of the timer means 130 as described later, in accordance with an instruction from the control means 110. The latch 132 holds the output of the timer means 130 using the output of the displacement detecting means 123 as a trigger. Thereby, the latch 132 outputs a cycle t' between the last pulse and a pulse immediately therebefore. The multiplication means 133 multiplies the output t' by a predetermined constant k, and outputs the reference value ts. The constant k is set to a value greater than one, for example, 1.5.

The output is of the reference value updating means 131 is compared with the output t of the timer means, thereby switching between a normal deceleration operation and a speed recovery state described later, upon deceleration. If the output t of the timer means is smaller than the output ts of the reference value updating means 131, the normal deceleration operation is performed. If the output t of the timer means is greater than the output ts of the reference value updating means 131, i.e., the cycle of a pulse from the displacement detecting means 123 is k times or more as long as the previous cycle, the speed recovery state occurs, as described later.

A switching means 137 is a part of the control means 110. The switching means 137 selects one of received t and t' under the following conditions, and outputs the selected one. Specifically, if the output t of the timer means is smaller than the output is of the reference value updating means, t' is selected. If the output t of the timer means is greater than the output ts of the reference value updating means, i.e., the cycle of a pulse from the displacement detecting means 123 is k times or more as long as the previous cycle, and the speed recovery state occurs, t is selected.

The speed detecting means 134 multiplies an inverse of t or t' by an appropriate constant to calculate the speed v, and outputs the result. The meaning of the speed v is the following. When the speed detecting means 134 receives t, the speed v is a measured speed obtained by measuring the cycle of a pulse from the displacement detecting means 123. In the normal deceleration operation, speed control is performed based on this value. When the speed detecting means 134 receives t', the speed v is a virtual speed which would be assumed if a pulse was currently output from the displacement detecting means 123.

The speed comparator 135 compares a speed command value with the speed v, and outputs a value which is proportional to the difference. The speed error-voltage converting means 119 converts the output of the speed comparator 135 to a driving voltage for the stepping motor by a manipulation, such as multiplying the output of the speed comparator 135 by an appropriate gain, compensating a frequency characteristic, or the like. The command value selector 114 selects one of the output of the microstep driving means 116 and the output of the voltage control means 115, in accordance with a signal from the control means 110. The control means 110 controls the command value selector 114, the microstep driving means 116, the closed-loop driving means 117, and the reference value updating means 131.

An operation of the thus-constructed optical disk drive will be described.

The head 101 traces a certain track of the disk 102 when typical recording and reproduction are performed in the optical disk drive. In this case, the stepping motor 105 is driven by the microstep driving means 116. The microstep driving means 116 performs 16-division microstep driving by changing the driving current ratio of the A-phase stator 120 to the B-phase stator 121 in 16 levels. The head 101 is moved at a high resolution of 9.375 μm which is 1/16 of that of a typical two-phase excitation driving (in this case, one step corresponds to 150 μm). Therefore, the stepping motor 105 stops not only at the rest angular positions of the two-phase excitation but also substantially arbitrary angular positions.

An operation in which the head 101 is moved from a track, on which reproduction is currently performed, to another track, is called seek. In this case, the control means 110 determines a method of moving the head 101 by comparing a current position address stored in the disk 102 with an intended position address. When a movement distance is extremely short, i.e., several tracks, the head 101 is moved only by an operation of a tracking actuator without rotation of the stepping motor 105. When the movement distance is about 1 mm, the head 101 is moved to an intended track by driving the stepping motor 105 in microsteps using the microstep driving means. When the distance is greater than those of the above-described situations, the output of the displacement detecting means 123 is converted by means of division or the like using the closed-loop driving means 117 to generate a driving command value for the stepping motor 105. In accordance with the driving command value, driving is performed in association with the output of the displacement detecting means 123, thereby moving the head 101.

Hereinafter, an operation of the stepping motor 105 in such a situation will be described.

Initially, the control means 110 stops the operation of a tracking actuator of the head 101. Thereafter, a rotational direction of the stepping motor 105 is determined. In this case, the rotational direction is clockwise. At this point in time, the stepping motor 105 is driven by the microstep driving means 116. The stepping motor 105 normally remains at rest. When the stepping motor 105 is intended to be rotated by a certain angle or more, the control means 110 initially gives the closed-loop driving means 117 information, such as information on the angular position of the rotor 122 prior to starting, the rotor 122 being held by the output of the microstep driving means 116, and a direction in which the rotor 122 is intended to be rotated. Further, the control means 110 causes the command value selector 114 to select the output of the closed-loop driving means 117. The closed-loop driving means 117 outputs a new command value to the driving means 111 in accordance with a predetermined procedure based on those pieces of information, independent of the output of a rotational angle detecting means. Thereby, the rotor 122 begins rotating. The displacement detecting means 123 outputs pulses at intervals of an actual rotational angle of 4.5°.

When output of the pulses begins, the control means 110 gives a division means information, such as information on the angular position of the rotor 122 prior to starting, the rotor 122 being held by the output of the microstep driving means 116, and a direction in which the rotor 122 is intended to be rotated. Further, the control means 110 causes the command value selector 114 to select the output of the voltage control means 115. Thereby, the command value of the closed-loop driving means 117 is input to the driving means 111. The closed-loop driving means 117 generates a command value to the driving means 111 by dividing the output of the displacement detecting means 123 in accordance with a predetermined pattern. Thereby, a sequence of the command values are output to the driving means 111 in such a manner that the timing is associated with the output from the displacement detecting means 123.

The output of the displacement detecting means 123 has a cycle of a rotational angle of 4.5° which is exactly 1/4 of a step angle of 18°. Further, the closed-loop driving means 117 varies the output every four pulses output from the displacement detecting means 123. Therefore, an excitation current to each stator can be switched at a predetermined position in accordance with a relationship between a magnetic pole of the rotor and an angular position of the stator. This situation will be further described with reference to FIG. 10.

FIG. 10 shows one pair of N and S poles of the A-and B-phase stators, although an actual rotor has five pairs of N and S poles of permanent magnets. Therefore, an angle θ in FIG. 10 and the actual angle θ0 in the stepping motor of Example 3 has a relationship represented by:

$$\theta 0=\theta/5+72N \quad \text{(formula 4)}$$

where N is any integer from 0 to 4, and the angle B is called an electrical angle. Hereinafter, all angles are electrical angles, unless otherwise mentioned.

In FIG. 10, reference numeral 137 indicates an A-phase stator, 138 indicates a B-phase stator, 139 indicates a rotor, 140 indicates a virtual S pole position, and 141 indicates a pulse generation position of the displacement detecting means 123. It is assumed that the virtual S pole 140 is generated at an angular position (A=+, B=+in FIG. 10) by combining magnetic fields generated by the A- and B-phase stators 137 and 138. The virtual S pole 140 is similarly generated when excitation occurs in other situations. In this case, θ=0° when the N pole of the rotor 139 is at the angular position shown in FIG. 10, and the clockwise direction is positive.

A description will be given of a case where the N pole of the rotor 139 is rotated in the clockwise direction from θ=0°. Initially, a command value for initial forced driving output from the closed-loop driving means 117 causes the A- and B-phases to be excited in the negative and positive directions, respectively. In this case, the virtual S pole 140 is located at an angular position (A=−, B=+ in FIG. 10). The N pole of the rotor 139 is attracted to the virtual S pole 140.

In this situation, the N pole of the rotor 139 and the virtual 6 pole 140 form an angle of 135°. Such an angle formed by the magnetic pole generated by the excitation and the magnetic pole of the rotor 139 attracted by that magnetic pole is referred to as a driving angle ψ. It is assumed that the driving angle ψ is positive when the rotor is attracted in the rotational direction (in this case, the clockwise direction). The rotor 139 begins rotating from the driving angle ψ (=135°), and the displacement detecting means 123 then outputs pulses. Phase switching is first performed when the count of the pulses is equal to four. A command value, immediately after the first phase switching has been performed, is designed so as to cause the A- and B-phases to be both excited in the negative direction. With such a command value, as is apparent from FIG. 10, the rotor is advanced by 90° with respect to the first command value for the forced driving. In this case, ψ=135° to 157.5°. The value of ψ has a certain range since a relationship between a light shield plate 124, and the rotor 122 and the photosensor 125 is not adjusted and therefore the phase of the pulse output from the displacement detecting means 123 varies in a range of 22.5°. Such a variation does not have a large influence on the characteristics of a motor.

The rotor 139 is further rotated by such phase switching, and pulses are output from the displacement detecting means 123. As shown in FIG. 10, second phase switching is performed when the count of pulses after the first phase switching is three. A command value is designed so as to cause the A- and B-phases to be excited in the positive direction and the negative direction, respectively. With such a command value, as is apparent from FIG. 10, the rotor is advanced by 90° with respect to the first command value for the forced driving. At this point in time, the rotor 139 is advanced by 67.50 from the position after the first phase switching (67.58 corresponds to three pulses from the displacement detecting means 123). Therefore, the balance of ψ is 22.5°, and therefore ψ=157.50 to 180°. This is because an influence of a delay in current due to the inductance component of a coil caused by the increased number of revolutions is corrected.

Thereby, the rotor 139 is further rotated, and pulses are output from the displacement detecting means 123. As shown in FIG. 10, a third phase switching is performed when the count of pulses after the first phase switching is seven. A command value is designed so as to cause the A- and B-phases to be both excited in the positive direction. With such a command value, as is apparent from FIG. 10, the rotor is advanced by 90° with respect to the second command value for the forced driving. At this point in time, the rotor 139 is advanced by 90° from the position after the second phase switching (90° corresponds to four pulses from the displacement detecting means 123). Therefore, the value of ψ is not changed, and therefore ψ=157.5° to 180°. Subsequently, a command value is advanced by 90° every four pulses in a similar manner. The value of ψ remains 157.5° to 180°.

In accordance with the above-described procedure, the motor is actuated, and the number of revolutions is increased.

The output of the displacement detecting means 123 is also input to the timer means 130 and the latch 132. An actual speed is output by the speed detecting means 134. The speed comparator 135 compares an actual speed with a speed command value output from the speed detecting means 134, and outputs a value which is proportional to the difference. The speed error-voltage converting means 119 converts the output of the speed comparator 135 to a driving voltage for the stepping motor by a manipulation, such as multiplying the output of the speed comparator 135 by an appropriate gain, compensating a frequency characteristic, or the like. The voltage control means 115 receives and controls the driving voltage. Thereby, the motor is driven by the driving voltage which is substantially proportional to the difference between the speed command value and the speed v. The angular speed of the motor is controlled so that the speed of the head 101 is equal to the speed command value. The speed command value is typically designed so that the stepping motor is initially driven with a maximum voltage and then a predetermined speed is established.

In accordance with the above-described procedure, the head 101 is moved towards an intended track.

When the head 101 is close to the intended track, deceleration begins to be performed. The deceleration operation is performed in two steps. Specifically, the head 101 is driven by the closed-loop driving means 117 from the start of the deceleration to a certain speed. A predetermined deceleration curve is input as a speed command value to the speed comparator. The deceleration is performed by the voltage control means 115 controlling a driving voltage This process is referred to as first deceleration.

The first deceleration is performed by a large deceleration rate in order to reduce the speed of the head in a short time. In Example 3, 30 m/s/s corresponds to 200,000 PPS/s. When the speed reaches a certain value, e.g., 66 mm/s corresponding to 440 PPS, closed-loop driving is switched to an operation by the microstep driving means 116, thereby performing further deceleration. This process is referred to as second deceleration. The second deceleration is performed in order to produce conditions under which the position and speed of the head 101 is controlled in a subtle way and a tracking actuator is operated. The deceleration rate is as small as 2.1 m/s/s corresponding to 14,000 PPS/s.

An actual speed value is output from the speed detecting means 134. When the speed is decreased, the cycle of the output of the displacement detecting means 123 is elongated, the output of the actual speed value from the speed detecting means 134 is delayed as compared to when the speed is high.

The operation of the first deceleration will be described with reference to FIG. 11 below.

When the first deceleration begins, whether the displacement detecting means 123 outputs a pulse is determined in step 42 (step is indicated by S in the drawings). When a pulse is output, an updated value of t' which is an interval of the pulse is output from the displacement detecting means 123 to the speed detecting means 134. Thereby, the speed detecting means 134 perform normal speed control in which a measured speed obtained by the cycle of the pulse from the displacement detecting means 123 is output an a speed v.

Thereafter, whether the speed v satisfies a condition under which the first deceleration is ended, is determined in step 50. When the condition is satisfied, the first deceleration is ended. When the condition is not satisfied, the determination of step 42 is repeated.

Until a pulse is output, the output t of the timer means 130 is compared with the reference value is in step 43. When the output t of the timer means 130 is smaller than the reference value is, the determination of step 42 is repeated. If the displacement detecting means 123 outputs a next pulse, step 46 and thereafter are performed. Otherwise, the determination of step 43 is repeated.

In the determination of step 43, if the output t of the timer means 130 is larger than the reference value to but a pulse is not output from the displacement detecting means 123, i.e., the cycle of a pulse from the displacement detecting means 123 is k times or more the previous cycle, step 49 and thereafter are performed, so that a speed recovery state occurs and an operation for increasing speed is performed. The details of the speed recovery state will be described later.

The timer means 130 outputs a time which has passed since the last pulse was output from the displacement detecting means 123. As described above, the output value is increased over time. The reference value ts is updated every time a pulse is output;from the displacement detecting means 123. The reference value ts is always a value obtained by multiplying t' by a constant coefficient where t' is the last pulse interval. In other words, when pulses are output at intervals of the reference value ts, the speed is always smaller by a predetermined proportion than a speed calculated in t' which is the last pulse interval.

Therefore, the speed is used as a lower limit of a speed at that point in time. An abnormal decrease in a speed can always be detected when the speed is smaller by a predetermined proportion than a speed calculated in t' which is the last pulse interval. It is possible both to detect a decrease in any speed reliably and detect the out-of-control in a high rotation range in a short time, and to prevent erroneous detection due to the out-of-control in a low rotation range.

When the speed recovery state occurs in step 49 and thereafter, the driving angle ψ is reduced by 22.5° in step 49 so that ψ=135° to 157.5°. This is easily realized by changing the division cycle of the output of the displacement detecting means 123 in closed-loop driving means 117 from normal four divisions to five divisions for a single instance. Thereafter, in step 45, the switching means 137 switches the output to the speed detecting means 134 from t' to t which is the output of the timer means 130, so that the speed vis switched to a virtual speed which would be assumed if a pulse was currently output from the displacement detecting means 123. Thereby, the voltage control means 115 outputs a value corresponding to the virtual speed, so that the driving output is changed.

The value of t is an elapsed time since the last pulse has been output from the displacement detecting means 123. Therefore, the speed v obtained by outputting the value to the speed detecting means 134 is decreased over time. The decreased speed leads to an increase in a speed error detected by the speed comparator. The output of the voltage control means 115 is proportional to the speed error. Therefore, the output is gradually increased.

In general, when a speed is reduced, the torque of the motor is raised by increasing the driving voltage, thereby making an attempt to increase accelerating value, i.e., the speed. In Example 3, as described above, ψ=157.5° to 180°. This is because an influence of a delay in current due to the inductance component of a coil caused by the increased number of revolutions is corrected. Thereby, a higher maximum number of revolutions can be obtained, resulting in high speed seek.

However, in actual driving, information on the angular position of the rotor 122 prior to starting, the rotor 122 being held by the output of the microstep driving means 116, includes error due to friction. The error is estimated to be about ±14° in an optical disk device. In this case, the actual driving angle ψ is in the range of 143.5° to 194°. Even though the actual driving angle exceeds 180°, no problem arises. The reasons are as follows. Accelerating value is typically performed by a maximum accelerating value force. Subtle speed control is not required in a low rotation range. Further, in Example 3, a special procedure for stable actuation is used upon actuation. In the procedure, when the number of revolutions is low upon the start of the rotation, the driving angle ψ is small. Furthermore, rotation is performed at a constant speed after the accelerating value, the driving angle ψ with respect to a driving current is small due to an influence of a delay in current due to the inductance component of a coil caused by the increased number of revolutions.

In deceleration, however, subtle speed control needs to be required in a low rotation range in which an influence of a delay in current due to the inductance component of a coil is small. In particular, if a driving current is increased so as to perform accelerating value at a low speed where ψ exceeds 180°, the driving conversely functions as a brake, so that the operation is likely to be stable or stop. A substantial problem does not arise when the speed is monotonically decelerated. When an accelerating value operation is performed, particularly when the speed is low, in order to recover the speed which has been decelerated due to a sudden increase in a load, if driving is performed by an angle exceeding a dead point, it is needless to Say that deceleration conversely occurs.

It is assumed that the driving angle ψ is reduced by 22.5° so that ψ=135° to 157.5°. In this case, information on the angular position of the rotor 122 prior to starting, the rotor 122 being held by the output of the microstep driving means 116, includes an error of about ±14° due to friction. Even allowing for such an error, the driving angle ψ is in the range of 24° to 171.5° and does not exceed 180°. Therefore, by increasing the driving voltage, the torque of the motor can be certainly increased.

As described above, the value of t is an elapsed time since the last pulse has been output from the displacement detecting means 123. Therefore, the speed v obtained by outputting the value to the speed detecting means 134 is decreased over time. The decreased speed leads to an increase in a speed error detected by the speed comparator. The output of the voltage control means 115 is proportional to the speed error. Therefore, the output is gradually increased.

As described above, the output voltage is gradually increased over time, and such an increase is proportional to a speed error, just as in a normal control. Therefore, even if a driving system has variations in the frictional load of a motor or a transmission system, or the like, a halt of the motor can be certainly prevented and large overshoot does not occur.

Thereafter, in step 47, whether the output of the voltage control means 115 is a possible maximum value is determined. If the output of the voltage control means 115 is not the possible maximum value, the displacement detecting means 123 determines in step 48 whether a next pulse is output. If the next pulse is not output, step 45 and thereafter are repeated. If the next pulse is output, step 46 and thereafter are performed.

When no pulse is output from the displacement detecting means 123 and it is therefore determined that the output of the voltage control means is maximum, the stepping motor is actuated again and seek is performed again from the beginning.

In this manner, the first deceleration operation is performed.

When the first deceleration operation is ended, the second deceleration operation is performed and the microstep driving means 116 it switched into operation again. The head 101 is further decelerated. The position and speed of the head 101 are controlled in a subtle way, and conditions under which a tracking actuator is operated again are produced.

In Example 3, the first deceleration operation is switched to the second deceleration operation when the speed is decreased to 66 mm/s corresponding to 440 PPS. The second deceleration operation is performed by microstep driving. An initial speed command value of microstep driving is equal to the speed command value when the first deceleration operation is ended. Further, the value of the driving angle ψ upon switching has a predetermined relationship with the value when the first deceleration is ended, and takes a smaller value. When the difference between the speed command value upon the start of the second deceleration operation and the speed v at that time is large, vibration may occur when the second deceleration operation begins. In view of this, the speed needs to be controlled with high precision in the first deceleration.

In the second deceleration operation, the head 101 is gradually decelerated while moving over a distance corresponding to several hundreds of tracks on the optical disk 102. After the deceleration, the tracking actuator is operated again to trace a track after seeking. The control means 110 then compares a current position address stored in the disk 102 with an intended position address again. If both are the same, the movement operation is ended. If both are not the same, the above-described operations are repeated until both are the same.

As described above, the following effects can be obtained according to Example 3.

(1) Since the reference value varies depending on a current speed, a reduction in speed can be reliably detected for any speed, and out-of-control in a high rotation range can be detected in a short time while the erroneous detection of the out-of-control in a low rotation range can be prevented.

(2) The output voltage is gradually increased over time. Further, the increase of the output voltage is proportional to a speed error, just as in normal control. Therefore, even if a driving system has variations in the frictional load of a motor or a transmission system, or the like, a halt of the motor can be certainly prevented and large overshoot does not occur.

(3) Even when an accelerating value operation is performed, particularly when the speed is low, in order to recover the speed which has been decelerated due to a sudden increase in a load, for example, driving to not performed by an angle exceeding a dead point and therefore the speed can be certainly recovered.

It should be noted that in Example 3, in the speed recovery state, the driving output is varied by the voltage control means 115 outputting a value corresponding to the value of t which is output from the speed detecting means 134 to the voltage control means 115. Alternatively, the relationship between the driving output and the speed error may be changed to be different from a normal relationship upon the onset of the speed recovery state. Further, the output may be maximum upon the onset of the speed recovery state, and when no pulse is output from the displacement detecting means 123 after a certain time has passed, actuation may be performed again. As described above, the driving angle ψ is changed to a small value upon the onset of the speed recovery state. Alternatively, such a changing is performed after deceleration is initiated.

Example 4

Figure 12:
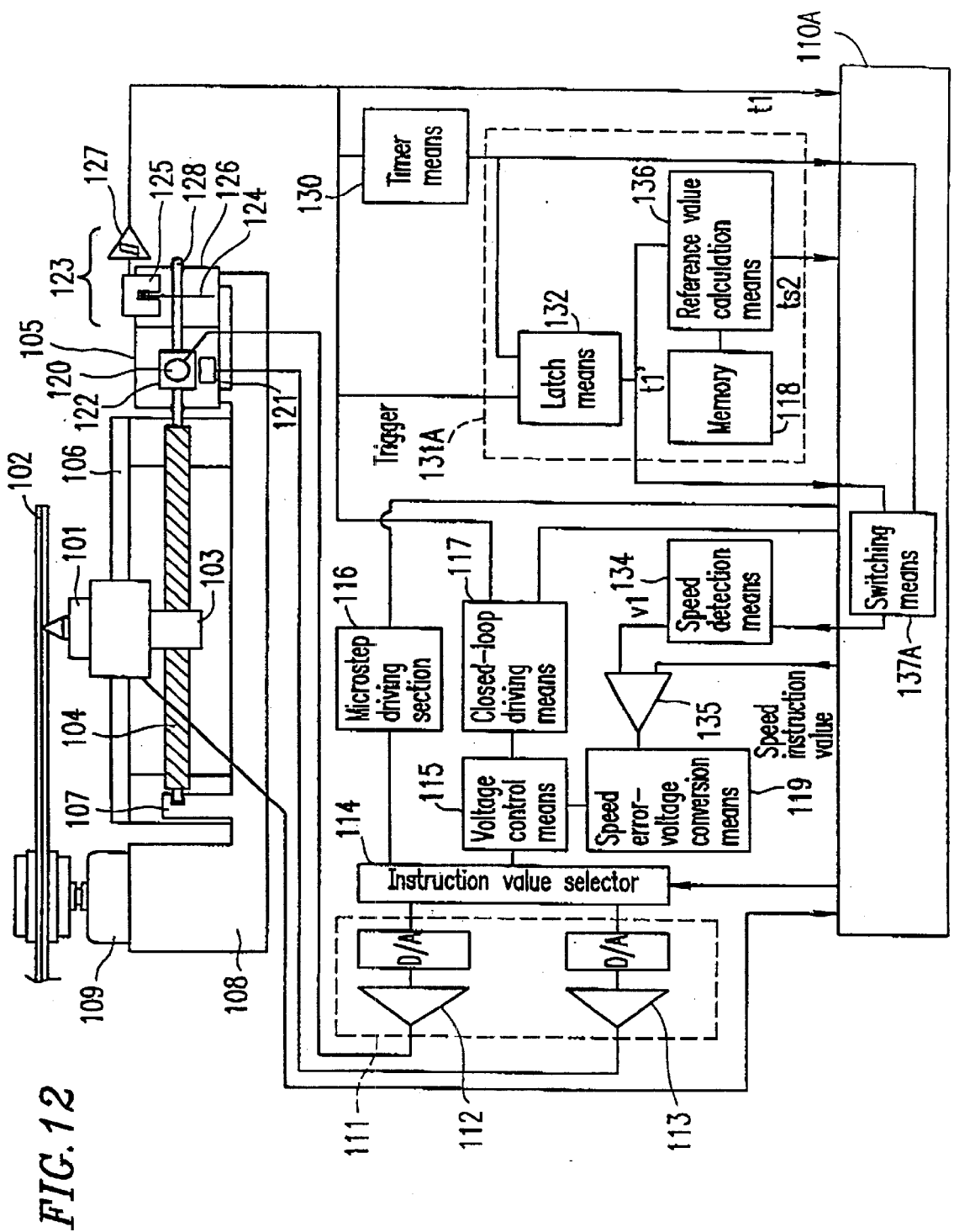
FIG. 12 is a block diagram showing a configuration of a stepping motor control device according to Example 4 of the present invention.
Figure 13:
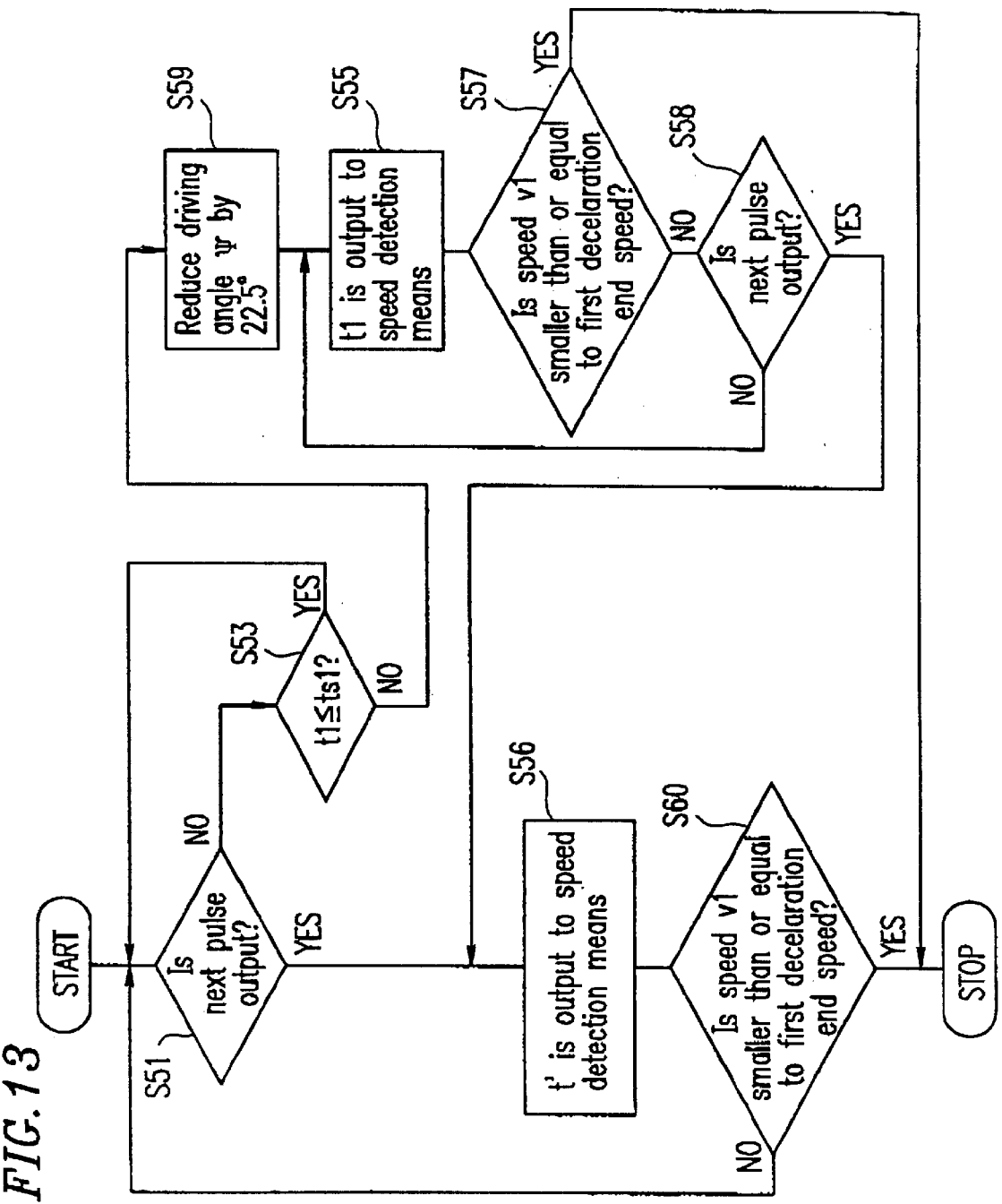
FIG. 13 is a flowchart showing a control of a stepping motor control device according to Example 4 of the present invention upon first deceleration.

FIG. 12 is a block diagram showing a configuration of a stepping motor control device according to Example 4 of the present invention. In this case, the control device of Example 4 is applied to an optical disk drive. FIG. 13 is a flowchart showing a control of the stepping motor control device of the present invention in deceleration.

The control device of FIG. 12 has the same configuration and operation as those of the control device of Example 3, except for a control means 110A, a reference value updating means 131A, and a switching means 137A. The same parts are indicated by the same reference numerals. The descriptions thereof are thus omitted.

Unlike Example 3, the reference value updating means 131A includes a memory 118 in which an allowable accelerating value is stored, and a reference value calculation means 136 instead of the multiplication means 133. The operation of the switching means 137A, and a condition under which actuation is performed in the operation of the control means 110A in first deceleration and the operation under the condition are different from those of Example 3.

The reference value updating means 13LA includes a latch 132, the reference value calculation means 136 and the memory 118. The reference value updating means 131A outputs a reference value of ts1 which is a reference to be compared with the output of the timer means 130 as described later, in accordance with an instruction from the control means 110A. The latch 132 holds the output of the timer means 130 using the output of the displacement detecting means 123 as a trigger. Thereby, the latch 132 outputs a cycle t1' between the last pulse and a pulse immediately therebefore. An inverse of the cycle t1' is multiplied by an appropriate constant, resulting in a speed v1 described later. An allowable accelerating value for each speed is stored in the memory 118.

The reference value calculation means 136 multiplies an inverse of t1' by an appropriate constant to calculate an actual current speed. The allowable accelerating value for the actual speed is calculated by referring to the actual speed stored in the memory 118. The allowable accelerating value is added to the actual speed. The inverse of the resultant value is calculated. The inverse is multiplied by an appropriate constant, resulting in the reference value ts1 which is output.

In an actual deceleration operation, an intended decelerating value is predetermined for any speed. A change in speed is controlled so as to be equal to the value of the intended decelerating value. For example, the decelerating value is multiplied by a certain constant k1. The resultant value is regarded as an allowable accelerating value. The actual speed added by the allowable accelerating value is always smaller by a predetermined proportion than an intended, current speed value. The value of k1 is about 1.5, for example.

The output ts1 of the reference value updating means 131A is compared with the output t1 of the timer means, thereby switching between a normal deceleration operation and a speed recovery state described later, upon deceleration. If the output t of the timer means is smaller than the output ts of the reference value updating means, the normal deceleration operation is performed.

If the output t of the timer means is greater than the output ts of the reference value updating means, i.e., the cycle of a pulse from the displacement detecting means 123 is longer than the previous cycle, and a speed obtained by the inverse of that cycle being multiplied by an appropriate constant is k1 times or more as small as the allowable accelerating value for the speed stored in the memory 118, as compared to a speed obtained by the inverse of the previous cycle being multiplied by an appropriate constant, then a speed recovery state described later occurs.

A switching means 137A is a part of the control means 110. The switching means 137 selects one of received t1 and t1' under the following conditions, and outputs the selected one. Specifically, if the output t1 of the timer mean is smaller than the output ts1 of the reference value updating means, t1' is selected. If the output t1 of the timer means is greater than the output ts1 of the reference value updating means, i.e., the cycle of a pulse from the displacement detecting means 123 is k times or more as long as the previous cycle, a speed obtained by the inverse of that cycle being multiplied by an appropriate constant is k1 times or more as small as the allowable accelerating value for the speed stored in the memory 118, as compared to a speed obtained by the inverse of the previous cycle being multiplied by an appropriate constant, and the speed recovery state described later occurs, then t is selected. The meaning of the speed v is as follows. When the switching means 137A receives t1, the speed v1 is a measured speed obtained by measuring the cycle of a pulse from the displacement detecting means 123. In the normal deceleration operation, speed control is performed based on this value.

When the switching means 137A receives t1', the speed v1 is a virtual speed which would be assumed if a pulse was currently output from the displacement detecting means 123. In the speed recovery state, the speed control is performed based on the virtual speed. The speed comparator 135 compares a speed command value with the speed v1, and outputs a value which is proportional to the difference.

The operation of the control means 110A in the first deceleration will be described with reference to FIG. 13 below.

When the first deceleration begins, whether the displacement detecting means 123 outputs a pulse is determined in step 51. When a pulse is output, an updated value of t1' which is an interval of the pulse is output from the displacement detecting means 123 to the speed detecting means 134. Thereby, the speed detecting means 134 performs normal speed control in which a measured speed obtained by the cycle of the pulse from the displacement detecting means 123 is output as a speed v1.

Thereafter, whether the speed v1 satisfies a condition under which the first deceleration is ended, is determined in step 60. When the speed v1 is smaller than or equal to a certain value, the condition is satisfied. In Example 4, the certain value in 66 mm/s or less. When the condition is satisfied, the first deceleration is ended. When the condition is not satisfied, the determination of step 51 is repeated. Until a pulse is output, the output t1 of the timer means 130 is compared with the reference value ts1 in step 53.

When the output t1 of the timer means 130 is smaller than the reference value ts1, the determination of step 51 is repeated. If the displacement detecting means 123 outputs a next pulse, step 56 and thereafter are performed. Otherwise, the determination of step 53 is repeated. In the determination of step 53, if the output t1 of the timer means 130 is larger than the reference value ts1 but a pulse is not output from the displacement detecting means 123, i.e., the cycle of a pulse from the displacement detecting means 123 is longer than the previous cycle, and a speed obtained by the inverse of that cycle being multiplied by an appropriate constant is k1 times or more as small as the allowable accelerating value for the speed stored in the memory 118, as compared to a speed obtained by the inverse of the previous cycle being multiplied by an appropriate constant, then step 59 and thereafter is performed to increase the speed.

This state is referred to as a speed recovery state. The details of the speed recovery state is similar to that of Example 3.

The timer means 130 outputs a time which has passed since the last pulse was output from the displacement detecting means 123. The output value is increased over time. As described above, the reference value ts1 is updated every time a pulse is output from the displacement detecting means 123. When pulses are output with this cycle from the displacement detecting means 123, an actual speed is always smaller by a predetermined proportion than an intended speed.

Therefore, the speed is used as a lower limit of a current speed. An abnormal decrease in a speed can always be detected when the speed is smaller by a predetermined proportion than an intended speed. It is possible both to detect a decrease in any speed reliably and detect the out-of-control in a high rotation range in a short time, and to prevent erroneous detection due to out-of-control in a low rotation range.

When the speed recovery state occurs in step 59 and thereafter, the driving angle $\psi$ is reduced by 22.5° so that $\psi$=135° to 157.5°, similar to Example 3. This is easily realized by changing the division cycle of the output of the displacement detecting means 123 in closed-loop driving means 117 from normal four divisions to five divisions for a single instance.

Thereafter, in step 55, the switching means 137A switches the output to the speed detecting means 134 from t1' to t1 which is the output of the timer means 130, so that the speed v1 is switched to a virtual speed which would be assumed if a pulse was currently output from the displacement detecting means 123. Thereby, the voltage control means 115 outputs a value corresponding to the virtual speed, so that the driving output is changed.

The value of t1 is an elapsed time since the last pulse has been output from the displacement detecting means 123. Therefore, the speed v1 obtained by outputting the value to the speed detecting means 134 is decreased over time. The decreased speed leads to an increase in a speed error detected by the speed comparator. The output of the voltage control means 115 is proportional to the speed error. Therefore, the output is gradually increased.

As described above, the output voltage is gradually increased over time, and such an increase is proportional to a speed error, just as in a normal control. Therefore, even if a driving system has variations in the frictional load of a motor or a transmission system, or the like, a halt of the motor can be certainly prevented and large overshoot does not occur.

Thereafter, in step 57, whether the speed v1 is smaller than or equal to a first deceleration ending speed is determined. If the speed v1 is smaller than or equal to the first deceleration ending speed, the displacement detecting means 123 determines in step 58 whether a next pulse is output. If the next pulse is not output, step 55 and thereafter are repeated. If the next pulse is output, step 56 and thereafter are performed.

When no pulse is output from the displacement detecting means 123 and it is therefore determined that the speed v1 is smaller than or equal to the first deceleration ending speed, the first deceleration is ended and a second deceleration operation occurs. At this point in time, the speed detecting means 134 outputs t1. Therefore, if the displacement detecting means 123 does not output a pulse, the end of the first deceleration can be detected more reliably, as compared to t1' which is not updated. At thin point in time, when the first deceleration operation is ended, the first deceleration is ended in a state which is deviated from the curve of a predetermined deceleration command value, and second deceleration occurs. Therefore, when the second deceleration is ended, the difference between a current position address and an intended position address is large. Thereby, the procedure for restart can be omitted, resulting in a reduction in an average seek time.

In this manner, the first deceleration operation is performed.

When the first deceleration operation is ended, the second deceleration operation is performed and the microstep driving means 116 is switched into operation again. The head 101 is further decelerated. The position and speed of the head 101 are controlled in a subtle way, and conditions under which a tracking actuator is operated again are produced.

In Example 4, the first deceleration operation is switched to the second deceleration operation when the speed is decreased to 66 mm/s corresponding to 440 PPS. The second deceleration operation is performed by microstep driving. An initial speed command value of microstep driving is equal to the speed command value when the first deceleration operation is ended. Further, the value of the driving angle ψ upon the switching has a predetermined relationship with the value when the first deceleration is ended, and takes a smaller value. When the difference between the speed command value upon the start of the second deceleration operation and the actual speed at that time is large, vibration may occur when the second deceleration operation begins. In view of this, the speed needs to be controlled with high precision in the first deceleration.

In the second deceleration operation, the head 101 is gradually decelerated while moving over a distance corresponding to several hundreds of tracks on the optical disk 102. After the deceleration the tracking actuator is operated again to trace a track after seeking. The control means 110A then compares a current position address stored in the disk 102 with an intended position address again. If both are the same, the movement operation is ended. If both are not the same, the above-described operations are repeated until both are the same.

As described above, according to Example 4, when the output t1 of the timer means exceeds a certain reference value, the control means controls the stepping motor in such a manner that the operation mode is switched from the second operation mode to the first operation mode and the stepping motor is forcedly rotated. Therefore, almost the same response is obtained in spite of variations in a friction load of the driving system, or the like. In other words, even if there exist a frictional load of the driving means of a certain size, a halt of the motor can be certainly prevented and excessive overshoot does not occur.

It should be noted that similar to Example 3, in Example 4, the output of the reference updating means is changed by a speed or the like, but may be a constant. In this case, the effects described in Example 1 cannot be obtained. Nevertheless, whether the first deceleration is ended can be reliably determined. The above-described effects can be obtained. Further, an intended profile of an intended speed value may be used instead of an actual speed.

Example 5

Figure 14:
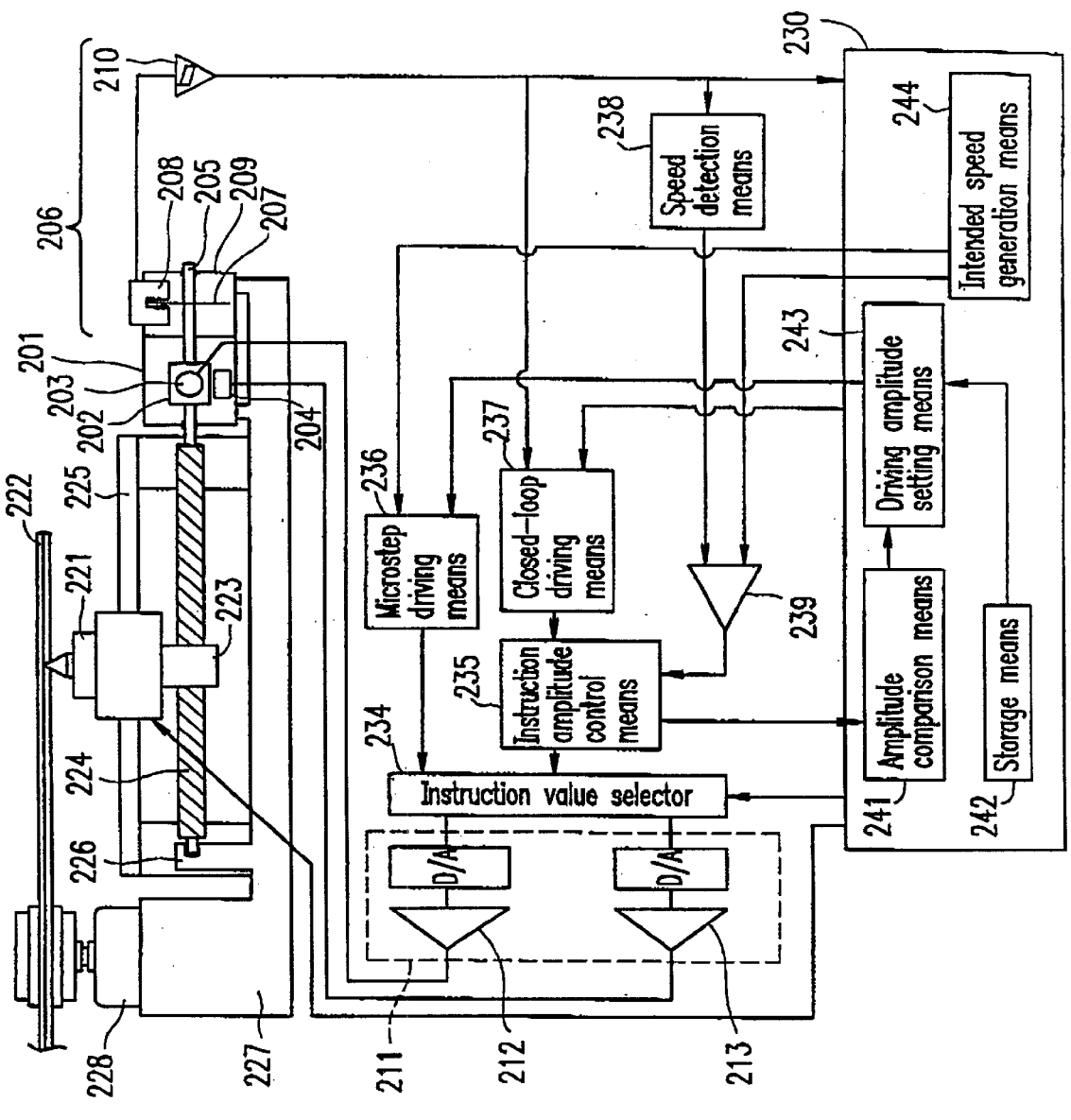
FIG. 14 is a block diagram showing a schematic configuration of a stepping motor control device according to Example 5 of the present invention used in an optical disk drive.

FIG. 14 is a block diagram showing a schematic configuration of a stepping motor control device according to Example 5 of the present invention.

In FIG. 14, reference numeral 201 indicates a stepping motor, 202 indicates a rotor, 203 indicates an A-phase stator, 204 indicates a B-phase stator, 205 indicates a rotor axis, 206 indicates a position detecting means, 207 indicates a light shield plate, 208 indicates a photosensor, 209 indicates a housing, 210 indicates a binary conversion circuit, 211 indicates a driving means, 212 indicates an A-phase current driver, and 213 indicates a B-phase current driver.

Further, 221 indicates a head, 222 indicates an optical disk, 223 indicates a nut piece, 224 indicates a lead screw, 225 indicates a guide shaft, 226 indicates a bearing, 227 indicates a chassis, 228 indicates a spindle motor, 230 indicates a control means, 234 indicates a command value selector, 235 indicates an instruction amplitude control means, 236 indicates a microstep driving means, 237 indicates a closed-loop driving means, 238 indicates a speed detecting means, 239 indicates a speed comparator, 241 indicates an amplitude comparison means, 242 indicates a storage means, 243 indicates a driving amplitude setting means, and 244 indicates an intended speed generating means.

As shown in FIG. 14, the optical disk drive optically records and reproduces information to and from an optical disk 222 using the head 221. The nut piece 223 attached to the head 221 is engaged with the grooves of a lead screw 224. The lead screw 224 has a screw pitch of 3 mm and is coupled with the stepping motor 201. Therefore, the head 221 to straightly driven back and forth along a guide shaft 225 in accordance with the rotation of the stepping motor 201. The bearing 226 which is fixed to the chassis 227 supports the lead screw 104 so that the screw 224 is freely rotated.

The spindle motor 228 drives and rotates the optical disk 222. When the head 221 is moved to an intended position, a direction and a distance in which the head 221 is moved are determined based on the address of a current position stored in the optical disk 222 and the address of an intended position. In accordance with the direction and distance, the control means 230 performs a control operation for the stepping motor 201.

The stepping motor 201 is of a two-phase PM type and has a step angle of 18° in two-phase excitation. The stepping motor 201 includes a rotor 202, and a two-phase exciting coil having an A-phase stator 203 and a B-phase stator 204. The rotor 202 includes a permanent magnet in which five polarized poles for each of N and S poles are spaced at intervals of an angle of 72°. The A-phase stator 203 and the B-phase stator 204 each have excited N and S poles at intervals of an angle of 72° and yokes which generates five N poles and five S poles in one cycle of circumference of the rotor 202. The magnetic poles of the A-phase stator and the B-phase stator are deviated by 16° from each other.

The position detecting means 206 includes a light shield plate 207, a photosensor 208, a housing 209, and a binary conversion circuit 210. The light shield plate 207 is a circular plate having slits provided at intervals of an angle of 4.5°, and is fixed to a rotor axis 205. The slit angle cycle value of 4.5° of the light shield plate 207 is determined to be an integral fraction (herein 1/16) of the angle cycle of 72° of the magnetic pole formation of the magnet of the rotor 202. Particularly, since the number of phases of the stepping motor 201 is two, the slit angle cycle value of 4.5° of the light shield plate 124 is also selected so an to satisfy a one divided by an integral multiple of 2 (i.e., 16=1/(2×8)) of the angle cycle of 72° of the magnetic poles of the magnet of the rotor 202. The photosensor 208 is of a transmission type and includes an LED at a light emitting side thereof and a phototransistor at a light receiving side thereof. The photosensor 208 outputs an output signal depending on the presence or absence of a slit of the light shield plate 207. The photosensor 208 and the light shield plate 207 are accommodated in a housing 209 so as to be prevented from being damaged in handling or the like and smudged due to dust or the like. The output of the photosensor 208 is converted by the binary conversion circuit 210 to binary data.

With such a configuration, the position detecting means 206 generates a single pulse every rotational angle of 4.5° of the stepping motor 201, and detects the rotational angle of the stepping motor. The rotor axis 205 it rotated together with the lead screw 224. Since the screw pitch of the lead screw 224 is 3 mm, the position detecting means 206 generates a single pulse every time the head 221 is moved by 0.0375 mm. The output of the position detecting means 206 is input to the control means 230, the speed detecting means 238, and a closed-loop driving means 237.

The driving means 211 includes the A-phase current driver 212 and the B-phase current driver 123 which are independent two-channel current drivers. The current drivers 212 and 213 supply a current to an A-phase stator 203 and a B-phase stator 204, respectively, based on digital data representing a respective current instruction amount output from the command value selector 234, thereby driving the stepping motor 201. Specifically, the A- and B-phase current drivers 212 and 213 include a D/A converter for converting received digital data to an analog signal, and an amplifier for amplifying the analog signal from the D/A converter and outputting the amplified analog signal.

The microstep driving means 236 outputs digital data representing a current command value to a command value selector 234 in accordance with a timing signal internally generated by the microstep driving means 236 itself, thereby performing microstep driving using open-loop control when the command value selector 234 selects such an output as described later. Specifically, microstep driving is performed by changing a ratio of a driving current through the A-phase Stator 203 to a driving current through the B-phase stator 204, thereby controlling the rest angle of the rotor 202 with a high resolution.

The closed-loop driving means 237 normally detects a magnetic pole of the rotor 202 by converting the output of the position detecting means 206 by means of division or the like. In accordance with the timing of such detection, current command values are switched, thereby performing closed-loop driving of the stepping motor. Specifically, when the stepping motor 201 is actuated by closed-loop driving means 237 to be rotated, initial excitation states of the A- and B-phase stators 203 and 204 are selected based on information on the angular position of the rotor 202 prior to starting, the rotor 202 being held by the output of the microstep driving means 236, and an output pulse of the position detecting means 206 is initially positioned with a magnetic pole of the rotor 202.

Thereby, when a pulse is output from the position detecting means 206 after the rotor 202 begins to be rotated, the closed-loop driving means 237 counts the pulse, and switches current command values every predetermined number of pulses. The state of the rotor 202 when the count of pulses is four corresponds to the state of the rotor 202 when the rotor 202 is rotated by 18° (an electrical angle of 90°). Two-phase excitation driving is performed where an excitation phase is advanced by an electrical angle of 90° every four counts of pulses. The output of the closed-loop driving means 237 is supplied to the instruction amplitude control means 235.

The speed detecting means 238 has a cycle sufficiently shorter than the output of the position detecting means 206, and includes a reference clock generator for generating a reference clock having a sufficiently small cycle error, a counter for counting reference clocks, and the like. The speed detecting means 238 counts clocks from a time when a certain pulse is output by the position detecting means 206 to a time when the next pulse is output, to measure a time interval between pulses output by the position detecting means 206. The rotational speed value of the rotor 202 based on the inverse of the time interval is calculated, and the result is output to the speed comparator 239.

The speed comparator 239 compares a speed value output from the speed detecting means 238 with an intended speed value transmitted from the control means 230, and outputs a value proportional to the difference between the speed value and the intended speed value to an instruction amplitude control means 235 described later.

The instruction amplitude control means 235 multiplies the output of the speed comparator 239 by an appropriate gain, compensates a frequency characteristic, and the like, so as to control the amplitude of a current command value output from the closed-loop driving means 237. In this case, it is assumed that when the output of the speed comparator 239 is positive so that the rotor 202 is accelerated, the excitation phase of a driving current is regarded as a reference. When the output of the speed comparator 239 takes a negative value so that the rotor 202 is decelerated, the instruction amplitude control means 235 shifts the excitation phase of the driving voltage by 180° so that the excitation phase is reversed. The instruction amplitude control means 235 outputs the thus-produced rectangular current command value to the command value selector 234 while outputting a value representing the amplitude of the set current command value as digital data of eight bits to the amplitude comparison means 241.

The command value selector 234 selects one of the output of the instruction amplitude control means 235, and the output of the microstep driving means 236 in accordance with a signal from the control means 230. The selected output is input to the driving means 211.

The control means 230 controls the command value selector 234, the instruction amplitude control means 235, the microstep driving means 236, and the closed-loop driving means 237. The control means 230 controls the stepping motor 201 by switching between first and second control modes. In the first control mode, the command value selector 234 selects a current command value generated by the closed-loop driving means 237 and the instruction amplitude control means 235. In the second control mode, the command value selector 234 selects a current command value generated by the microstep driving means 236. Further, the control means 230 includes an intended speed generating means 244 which has a ROM in which a predetermined intended speed profile of the rotational speed of the rotor 202 is stored. The output of the intended speed generating means 244 is supplied to the microstep driving means 236 and the speed comparator 239.

The amplitude comparison means 241 stores digital data representing the amplitude of a current command value output by the instruction amplitude control means 235, the amount of the digital data corresponding to several to several tens of pulses preceding from the latest data being stored in a buffer. The digital data values are averaged to calculate a representative value of the amplitude of a current command value at a current point in time. The result is transmitted as an amplitude Ia of a current command value in the first operation mods to a driving amplitude setting means 243 described later.

Further, the storage means 242 includes a ROM storing a relationship between the amplitude Ia of a current command value generated by the amplitude comparison means 241 in the first operation mode and an amplitude Ib of a current command value generated by the microstep driving means 236 in the second operation mode described later. The relationship is experimentally obtained in advance.

The driving amplitude setting means 243 calculates the amplitude Ib of a current command value in the second operation mode from the amplitude Ia of a current command value in the first operation mode in accordance with the relationship stored in the storage means 242. The result is transmitted to the microstep driving means 236.

Figure 15:
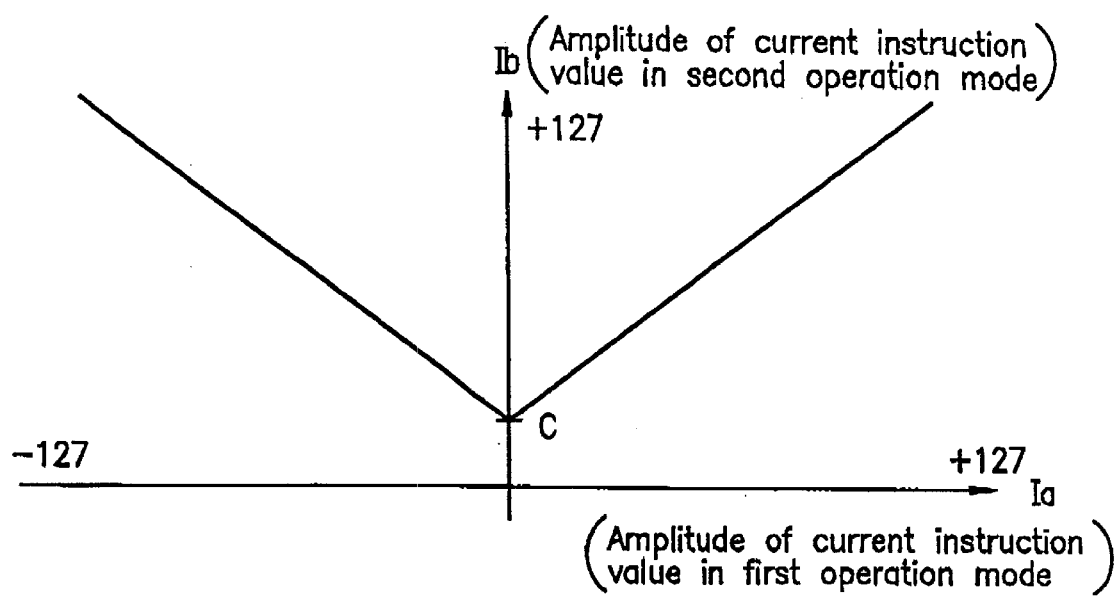
FIG. 15 is a diagram showing a relationship between amplitudes Ia and Ib of current command values in first and second operation modes stored in storage means in Example 5 of the present invention.

FIG. 15 is a diagram showing the relationship between the amplitudes Ia and Ib of current command values in the first and second operation modes stored in the storage means 242 in Example 5.

In FIG. 15, the amplitude Ia of a current command value generated by the amplitude comparison means 241 in the first operation mode is digital data of eight bits which instructs the amplitude of a driving current output from the instruction amplitude control means 235 to the driving means 211. The digital data is a numerical value ranging from +127 to −127. Similar to what is described in the conventional example, a positive value indicates driving towards an acceleration direction, while a negative value indicates a deceleration direction. The positive and negative signs included in amplitudes represent the presence and absence of reversal of excitation phases.

Further, the amplitude of a driving current is actually proportional to the amplitude of the current command value. A maximum driving current is output at +127 or −127. The amplitudes Ia of the current command values in the first operation mode correspond to the amplitudes Ib of current command values in the second operation mode, i.e., the maximum values of current command values (digital data) which are instructed by the microstep driving means 236 to the driving means 211.

The thus-constructed stepping motor control device of Example 5 will be described below.

The head 221 traces a certain track of the optical disk 222 when typical recording and reproduction are performed in the optical disk drive. In this case, the control means 230 controls the stepping motor 201 using the microstep driving means 236. The microstep driving means 236 performs 16-division microstep driving by changing the driving current ratio of the A-phase stator 203 to the B-phase stator 204 in 16 levels. The head 221 is moved at a high resolution of 9.375 μm which is 1/16 of that of a typical two-phase excitation driving (in this case, one step corresponds to 150 μm). Therefore, the stepping motor 201 can stop not only at the rest angular positions of the two-phase excitation but also substantially arbitrary angular positions.

An operation of the stepping motor 201 in a seek operation in which the head 221 is moved from a track, on which reproduction is currently performed, to another track, will be described below.

Initially, the control means 230 determines a method of moving the head 221 by comparing a current position address stored in the optical disk 222 with an intended position address. When a movement distance is extremely short, i.e., several tracks, the head 221 is moved only by an operation of a tracking actuator (not shown) without rotation of the stepping motor 201. When the movement distance is about 1 mm, the head 221 is moved to an intended track by driving the stepping motor 201 in microsteps using the microstep driving means 236.

When the distance is greater than those of the above-described situations (long-distance seek), the stepping motor 201 is driven in four steps, i.e., start, a constant speed driving by closed-loop driving (first operation mode), deceleration by closed-loop driving, deceleration by microstep driving (second operation mode), and stop. Hereinafter, an operation of the stepping motor 201 in each step will be described.

Initially, when the stepping motor 201 is actuated, the control means 230 stops the operation of a tracking actuator of the head 221. Thereafter, a rotational direction of the stepping motor 201 is determined. In this case, the rotational direction is clockwise. At this point in time, the stepping motor 201 is driven by the microstep driving means 236. The stepping motor 201 normally remain a at rest. The control means 230 then gives the closed-loop driving means 237 information, such as information on the angular position of the rotor 202 prior to starting, the rotor 202 being held by the output of the microstep driving means 236, and a direction in which the rotor 202 is intended to be rotated. Further, the control means 230 causes the command value selector 234 to select the output of the closed-loop driving means 237. The closed-loop driving means 237 outputs a command value to the driving means 211 in accordance with a predetermined procedure based on these pieces of information. Thereby, the rotor 202 begins rotating, and the starting operation is ended.

When output of the pulses begins, the control means 230 causes the command value selector 234 to select the output of the instruction amplitude control means 235. Then, the constant driving by the close-loop driving means 237 occurs.

The closed-loop driving means 237 divides a pulse output via the binary conversion circuit 210 from the position detecting means 206 (one pulse corresponding to a rotational angle of 4.5°), thereby generating a current command value. In Example 5, current command values are switched every four pulses from the position detecting means 206. As described above, such an operation can is achieve the same angular position at which the current command values are switched (a relative angle between the rotor 202, and the A- and B-phase stators 203 and 204), thereby making it possible to perform stable driving where out-of-step is unlikely to occur, or the like.

In the driving by the closed-loop driving means 237, a closed-loop speed operation is performed so that the rotational speed value of the rotor 202 is equal to an intended speed value provided by the control means 230. Specifically, whether the rotor 202 is accelerated or decelerated to cause the rotational speed value of the rotor 202 to be close to the intended speed value, is determined based on the magnitude of the speed error. Based on the result of the determination, the amplitude of the current command value is determined, and a current command value to be output to the driving means 211 is modified.

The change in the amplitude of the current command value leads to a change in the amplitude of a driving current output by the driving means 211. Therefore, attraction and repulsion force between the A-phase stator 203 and the B-phase stator 204 are changed, thereby making it possible to accelerate and decelerate the rotor 202. In accordance with the above-described procedure, the head 221 is moved towards an intended track at a high speed by closed-loop driving.

Figure 16A:
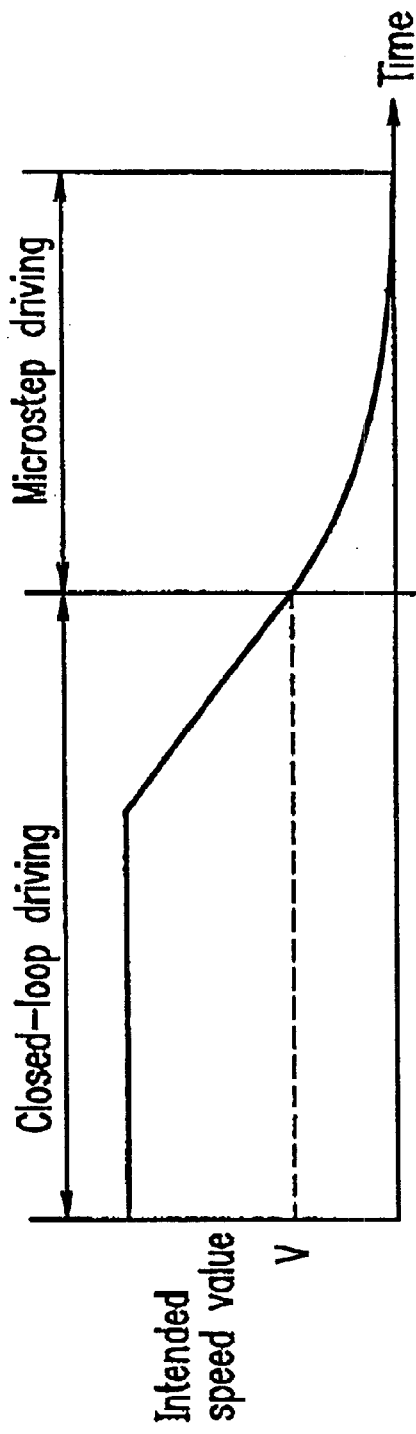
FIG. 16A is an intended speed profile showing an intended speed value in a deceleration operation for a rotor of Example 5 of the present invention.
Figure 16B:
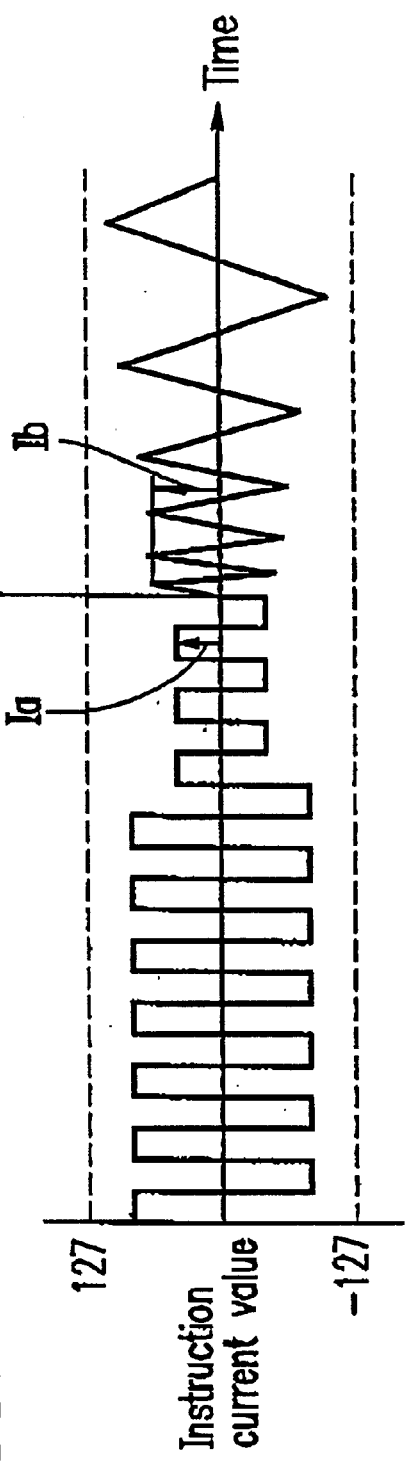
FIG. 16B is a timing chart showing a current command value in a deceleration operation which is output by a command value selector.

FIG. 16A is an intended speed profile showing an intended speed value in a deceleration operation for the rotor 202 of Example 5. FIG. 16B is a timing chart showing a current command value in a deceleration operation which is output by the command value selector 234. As described above, when the head 221 approaches an intended track due to the constant speed driving, the control means switches the intended speed value to deceleration. The deceleration operation is performed in two steps. Each step is described with reference to FIGS. 16A and 16B. For the sake of simplicity, a current command value is described only for one of the A- and B-phase stators.

As shown in FIG. 16A, the control means 230 is in the first operation mode from the start of deceleration to when the rotor 202 reaches a certain speed v. In this case, the command value selector 234 selects the output of the instruction amplitude control means 235 to perform deceleration control by closed-loop driving. In the deceleration by closed-loop driving, the rotor 202 is decelerated at a high deceleration rate in order to reduce the movement speed of the head 221 in as short a time as possible. In Example 5, 30 m/s/s corresponds to 200,000 PPS/s. The deceleration operation by closed-loop driving is basically the same as the above-described operation in the constant speed driving. It should be noted that an intended speed value which in transmitted from the control means 230 is changed over time in order to perform deceleration at a certain accelerating value.

The value of the amplitude Ia (see FIG. 16B) of a current command value generated by the instruction amplitude control means 235 can take various values ranging from −127 to +127, depending on variations in a driving load, such as a frictional force, or different intended command values. The reasons will be described below.

For example, when a subject to be controlled has a friction load and the accelerating value of the natural deceleration due to the friction load is equal to an intended decelerating value by chance, the amplitude Ia of a current command value is substantially zero until an error between the intended speed value and the rotational speed value of the rotor 202 is zero. When the friction load of a subject is great, the subject is decelerated by a decelerating value greater than an intended decelerating value. Therefore, the amplitude Ia of the current command value takes a positive value to accelerate the rotor 202 so that the speed of the rotor 202 is recovered. Further, the greater the frictional load, the higher the amplitude Ia. When the friction load of a subject is small, the subject is decelerated by a decelerating value smaller than an intended decelerating value. Therefore, the amplitude Ia of the current command value takes a negative value to decelerate the rotor 202 so that the speed of the rotor 202 is further reduced.

Thereafter, when the speed is lowered to a certain speed v, the control means 230 switches the driving method to the second operation mode, i.e., the microstep driving means 236 capable of precise positioning. The switching speed is 66 mm/s corresponding to 440 PPS in Example 5. A deceleration operation of microstep driving will be described below.

Initially, a decelerating value for an intended speed value after switching to microstep driving is equal to a decelerating value in closed-loop driving as shown in FIG. 16A. Further, a deceleration rate is gradually lowered over time to a deceleration rate at which a tracking actuator can be actuated. In Example 5, a deceleration rate before a halt is 2.1 m/s/s corresponding to 14000 PPS/s. In this manner, when a deceleration rate for an intended speed value is the same before and after switching the driving methods, an impact force generated by a sudden change in a deceleration rate can be removed. Thereby, the occurrence of unnecessary vibration can be prevented, resulting in stable control.

In microstep driving, the waveform of a current command value (the waveform of a driving current is almost the same as that waveform) is a triangular form, a sine form, or the like. The deceleration operation is performed by reducing the frequency of an instruction current (the state of the current waveform is varied from dense to sparse). In microstep driving which is typically performed in low speed rotation, since the detection precision by the speed detecting means 238 is deteriorated, or the like, deceleration is performed by the open-loop control without monitoring the output of the speed detecting means 238.

A method for controlling the amplitude of a driving current by microstep driving will be described below. In microstep driving, the amplitude Ib of a current command value output by the microstep driving means 236 is designed depending on the amplitude Ia of a current command value in closed-loop driving.

The amplitude comparison means 241 stores digital data representing the amplitude Ia of a current command value in closed-loop driving immediately before switching to microstep driving, the amount of the digital data corresponding to several to several tens of pulses preceding from the latest data being stored in a buffer. Immediately before switching to microstep driving, the average of Ia stored in the buffer is calculated. The resultant value is transmitted to the driving amplitude setting means 243. The driving amplitude setting means 243 is stored in the storage means 242. Based on a relationship between Ia and Ib (the amplitudes of current command values by microstep driving), Ib is calculated from the average of Ia transmitted from the amplitude comparison means 241. The result is transmitted to the microstep driving means 236.

The relationship between Ia and Ib stored in the storage means 242 is represented by the following (formula 5) (see FIG. 15):

$$Ib = k \cdot |Ia| + C \qquad \text{(formula 5)}$$

($k$ and $C$ are positive constants)

where k and C are equal to 0.76 and 30, respectively, in Example 5. The relationship represented by formula 5 will be described below. In formula 5, the smaller the absolute value of Ia, the smaller the value of Ib.

For example, when in closed-loop driving, the accelerating value of natural deceleration due to a friction load is equal to an intended decelerating value, the error between an intended speed value and the rotational speed value of the rotor 202 is zero. The value of Ia is controlled so as to be zero (i.e., the amplitude of a driving current is zero). In this case, Ib is controlled so as to be equal to the minimum amplitude value C (30 in Example 5). The reason that Ib is set to a small value will be described below. In the intended speed profile (FIG. 16A), the deceleration rate of microstep driving is set to the same value as the deceleration rate of closed-loop driving immediately before switching. In microstep driving as well as closed-loop driving, the accelerating value of the natural deceleration is equal to an intended decelerating value. Therefore, substantially no driving force is required for deceleration in microstep driving. Further, even if the value of Ib is small, out-of-step does not occur. Furthermore, since the amplitude of a current command value is caused to be small, a large current command value is not suddenly input when closed-loop driving is switched to microstep driving (the amplitude of a driving current is not suddenly increased). Since a driving force is not suddenly changed, it is possible to prevent the occurrence of unnecessary vibration.

Further, as shown in the intended speed profile of FIG. 16A, a deceleration rate is set to a small value before stopping (gradual deceleration). In this case, to prevent the occurrence of out-of-step upon deceleration, the amplitude of a current command value is gradually increased as the deceleration rate is lowered. The final amplitude is set to a value greater than the amplitude Ib of a current command value when closed-loop driving is switched to microstep driving, thereby performing positioning at an intended position. The settings of Example 5, i.e., k=0.76 and C=30, vary depending on a subject to be controlled.

Next, when in closed-loop driving, the accelerating value of natural deceleration due to a friction load is different from an intended decelerating value due to variations in the magnitude of a frictional load, an external force is required for acceleration and deceleration by a driving current in order to recover an actual speed having an intended speed value. The value of the required external force is obtained as the amplitude Ia of a current command value. In this case, the greater the value of Ia, the greater the value of Ib, in accordance with the relationship between Ia and Ib (formula 5). As described above, when the accelerating value of natural deceleration due to a friction load is different from an intended decelerating value, a relatively great driving force is required to prevent out-of-step even in microstep driving. As described above, in this case, Ib is set to a large value with reference to Ia, thereby obtaining a necessary driving force.

Conversely, Ib can be set to as small a value as possible in a range in which out-of-step does not occur. It is also possible to minimize unnecessary vibration when closed-loop driving is switched to microstep driving.

As described above, in Example 5, the amplitude Ib of a current command value in microstep driving is caused to be related to the amplitude Ia of a current command value in closed-loop driving in accordance with (formula 5), so that Ib is as small as possible. Thereby, when closed-loop driving is switched to microstep driving, the driving means 211 can reduce the amplitudes of driving currents supplied to the A- and B-phase stators 203 and 204 to small values and suppress a sudden change in a driving force occurring upon switching. Therefore, it is possible to reduce an impact or unnecessary vibration occurring upon switching.

Further, according to Example 5, even when a frictional load is large, or when a frictional load is small and a subject to be controlled has a great inertial force which causes the subject to retain its speed, the amplitude Ib of a current command value in microstep driving is increased depending on the magnitudes of a frictional load and an inertial force. Therefore, an attraction force between the rotor 202, and the A- and B-phase stators 203 and 204 can be increased, thereby preventing out-of-step.

It should be noted that in Example 5, the amplitude Ia of a current command value in closed-loop driving is caused to be related to the amplitude Ib of a current command value in microstep driving in accordance with (formula 5), so that Ib is calculated from Ia. Alternatively, as shown in FIG. 17, a table in which Ia is related to Ib may be stored in the storage means 244 so that Ib is searched based on the value of Ia. Thereby, similar effects can be obtained. In this case, a time required for the calculation can advantageously be omitted. Further, the relationship between Ia and Ib in the table of FIG. 17 can easily represent a relationship which cannot be expressed by a simple formula, such as (formula 5), e.g., the value of k in (formula 5) varies depending on the magnitude of Ia, causing Ia not to be simply proportional to Ib.

Example 6

An operation of a stepping motor control device according to Example 6 of the present invention will be described with reference to FIGS. 18A, 18B, and 14.

Figure 18A:
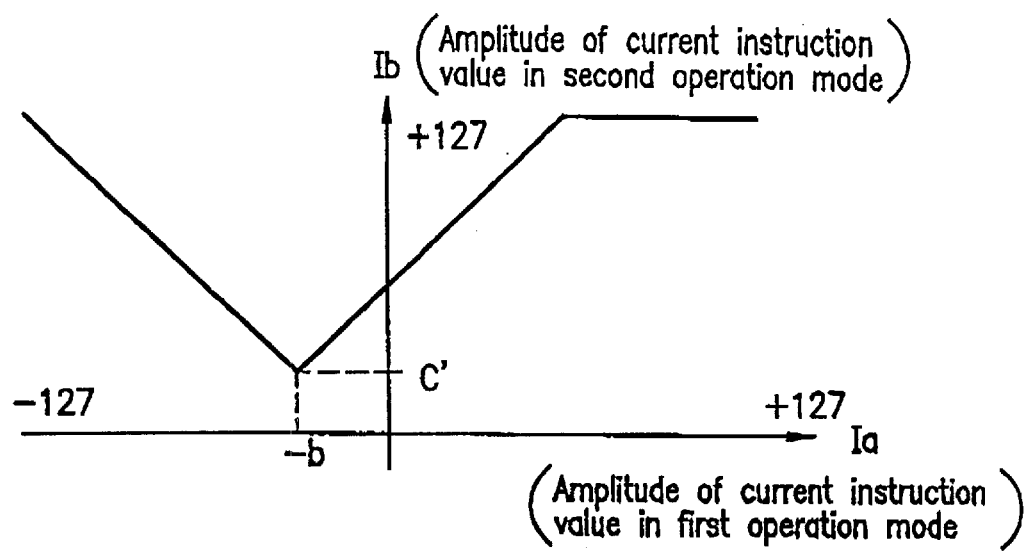
FIG. 18A is a diagram showing a relationship between the amplitude of a current command value upon closed-loop driving (first operation mode) and the amplitude of a current command value in microstep driving (second operation mode) in Example 6 of the present invention.

FIG. 18A shows a relationship between the amplitude of a current command value in closed-loop driving (first operation mode) and the amplitude of a current command value in microstep driving (second operation mode). FIG. 18D is a diagram showing an intended speed profile which instructs how a subject to be controlled is decelerated and which is generated by another intended speed generating means 244' instead of the intended speed generating means 244 of FIG. 14.

In Example 6, the storage means 242 which stores a relationship between the amplitudes Ia and Ib of current command values in the first and second operation modes in Example 5 is replaced with a storage means 242' which stores another relationship. The device of Example 6 has the same configuration and operation as those of the device of Example 5, except that the other intended speed generating means 244' is used instead of the intended speed generating means 244.

A relationship between the amplitude Ia of a current command value in the first operation mode and the amplitude Ib of a current command value in the second operation mode, the relationship being stored in the storage means 244', will be described below.

Figure 18B:
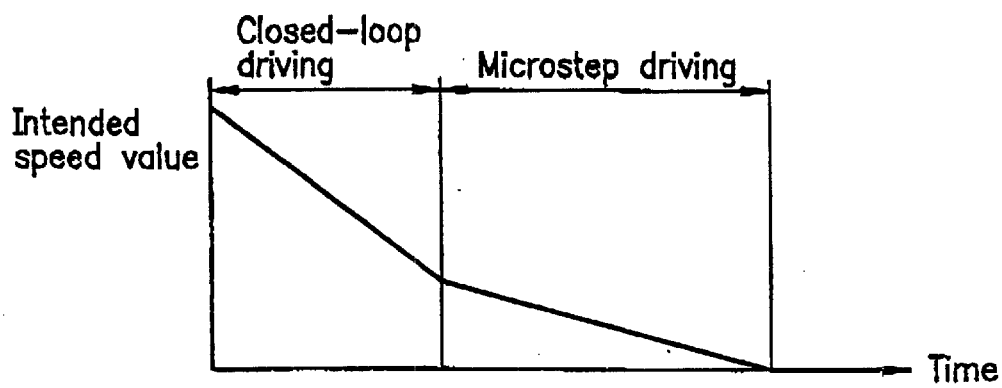
FIG. 18B is a diagram showing an intended speed profile which instructs how a subject to be controlled is decelerated and which is generated by an intended speed generating means.

First, as shown in FIG. 18B, in the intended speed profile of Example 6, a decelerating value in microstep driving is smaller than a decelerating value in close-loop driving. In the intended speed profile, sudden deceleration is performed by closed-loop driving in which a high level of torque is generated and a decelerating value can take a large value, thereby minimizing total deceleration time. Further, the decelerating value takes the same value from a time when closed-loop driving is switched to microstep driving to a time of the halt. Therefore, speed control in microstep driving is advantageously easy.

As shown in FIG. 18A, the amplitude Ib of a current command value output from microstep driving means 236 has a relationship with the amplitude Ia of a current command value in closed-loop driving, the relationship being represented by $$Ib = k' \cdot |Ia + b| + C' \qquad \text{(formula 6)}$$

where k', b, and C' are positive constants. Further, Ia is positive when a driving current is supplied to a stepping motor in an acceleration direction while Ia is negative when a driving current is supplied to a stepping motor in a deceleration direction.

In this case, k', b, and C' are equal to 0.86, 15, and 30, respectively, in Example 6. Formula 6 defines a relationship between Ia and Ib in which Ib can be set to as small a value as possible in a range in which out-of-step does not occur.

The relationship of formula 6 will be described below. In closed-loop driving, the state of a frictional load is assumed in which an intended decelerating value is equal to an accelerating value of natural deceleration. This state requires the least driving torque for deceleration, so that Ia=0. In the state of a frictional load where Ia=0, when closed-loop driving is switched to microstep driving, the intended decelerating value is reduced. Therefore, driving towards the acceleration direction is required. Since a certain level of driving torque is required for prevention of out-of-step, Ib needs to take a predetermined amplitude. Specifically, a predetermined amplitude as Ib is required for Ia=0 (Ib=k'b+C').

Next, it is assumed that a frictional load is increased for the state that Ia=0. A further amount of driving torque in the acceleration direction is required to maintain an intended decelerating value. The value of Ia is large in the positive direction in closed-loop driving. In microstep driving, a greater force is required for driving in the acceleration direction. In order to avoid out-of-step, Ib needs to be increased. Specifically, a relationship is reqiured in which if Ia is increased in the positive direction, Ib is also increased.

Further, it is assumed that a frictional load is reduced with respect to the state that Ia=0. A further amount of driving in a deceleration direction is required in order to remain an intended decelerating value. In closed-loop driving, Ia is large in the negative direction. In this case, a change in an accelerating value of natural deceleration when Ia is increased in the negative direction is equal to an intended decelerating value in closed-loop driving when Ia=0. As Ia is increased in the negative direction (a frictional load is decreased), the accelerating value of the natural deceleration is decreased. At a certain point (where Ia=−b), the accelerating value of the natural deceleration is equal to an intended decelerating value in microstep driving.

In this state of a frictional load, out-of-step is most unlikely to occur in microstep driving. Since substantially no driving force ts required, Ib can be related to the least amplitude value (C'). Specifically, when Ia=−b, Ib=C'.

It ts assumed that the frictional load is further decreased an compared to when la=−b. The accelerating value of the natural deceleration is smaller than the accelerating value in microstep driving. Driving torque in the deceleration direction is required. In order to prevent out-of-step, Ib needs to be increased. Specifically, in view of Ia=−b, a relationship between Ia and Ib is required in which the smaller the value of Ia, the larger the value of Ib.

As described, in the intended speed profile shown in FIG. 18A, Ia and Ib need to have a relationship as shown in FIG. 18A so that Ib can be set to as small a value as possible in a range in which out-of-step does not occur.

As described above, the amplitude Ib of a current command value in microstep driving and the amplitude Ia of a current command value in closed-loop driving have the relationship shown in formula 6. Ib is set to as small a value as possible in a range in which out-of-step does not occur. Thus, when closed-loop driving is switched to microstep driving, the driving means 211 reduces the amplitudes of driving currents supplied to the A- and B-phase stators 203 and 204, thereby suppressing a sudden change in a driving force generated upon the switching. Therefore, it is possible to reduce an impact or unnecessary vibration occurring upon switching.

Further, according to Example 6, even when a frictional load is large, or when a frictional load is small and a subject to be controlled has a great inertial force which causes the subject to retain its speed, the amplitude Ib of a current command value in microstep driving is increased depending on the magnitudes of a frictional load and an inertial force. Therefore, an attraction force between the rotor 202, and the A- and B-phase stators 203 and 204 can be increased, thereby preventing out-of-step.

Example 7

An operation of a stepping motor control device according to Example 7 of the present invention will be described with reference to FIGS. 19A, 19B, and 14.

Figure 19A:
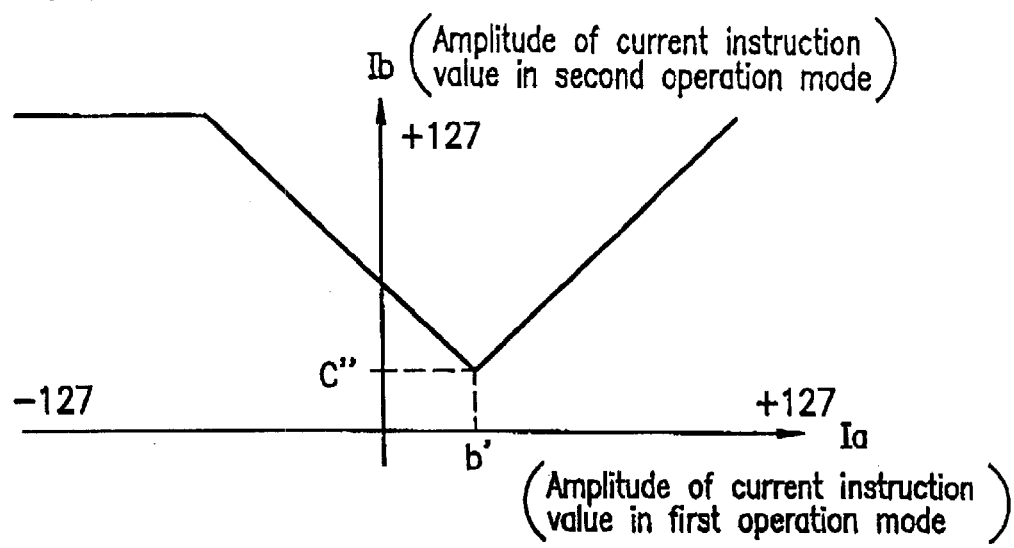
FIG. 19A is a diagram showing a relationship between the amplitude of a current command value in closed-loop driving (first operation mode) and the amplitude of a current command value in microstep driving (second operation mode).

FIG. 19A shows a relationship between the amplitude of a current command value in closed-loop driving (first operation mode) and the amplitude of a current command value in microstep driving (second operation mode). FIG. 19B is a diagram showing an intended speed profile which instructs how a subject to be controlled is decelerated and which is generated by another intended speed generating means 244" instead of the intended speed generating means 244 of FIG. 14.

In Example 7, the storage means 242 which stores a relationship between the amplitudes Ia and Ib of current command values in the first and second operation modes in Example 5 is replaced with a storage means 242" which stores another relationship. The device of Example 7 has the same configuration and operation as those of the device of Example 5, except that the other intended speed generating means 244" is used instead of the intended speed generating means 244.

A relationship between the amplitude Ia of a current command value in the first operation mode and the amplitude Ib of a current command value in the second operation mode, the relationship being stored in the storage means 244", will be described below.

Figure 19B:
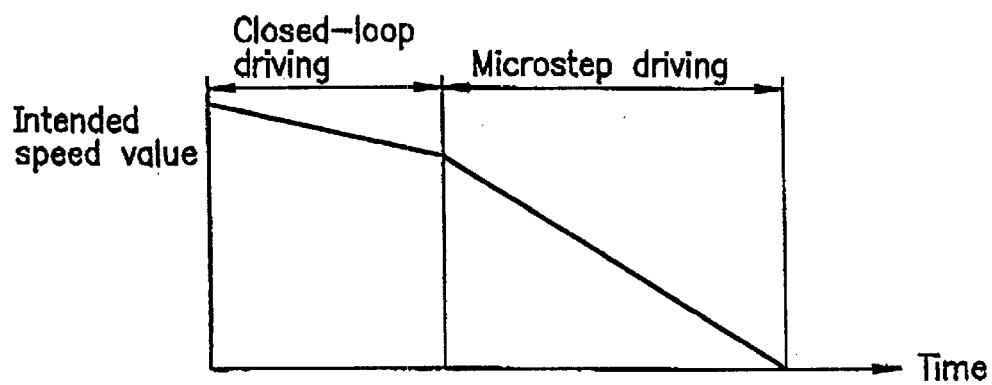
FIG. 19B is a diagram showing an intended speed profile which instructs how a subject to be controlled is decelerated and which is generated by an intended speed generating means.
Figure 20A:
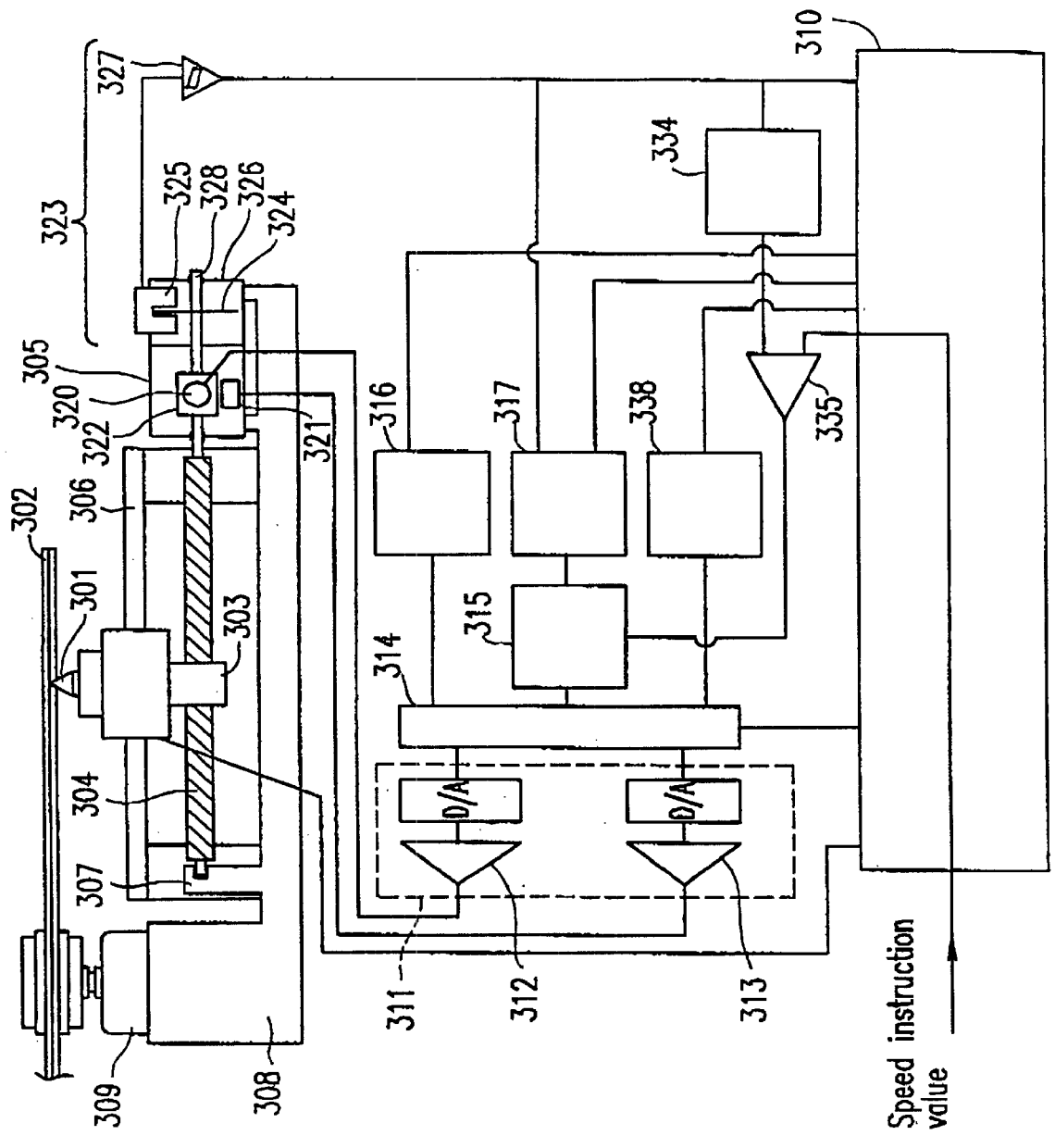
FIG. 20A is a schematic diagram showing an exemplary configuration of an optical disk drive using a conventional motor control device.
Figure 21:
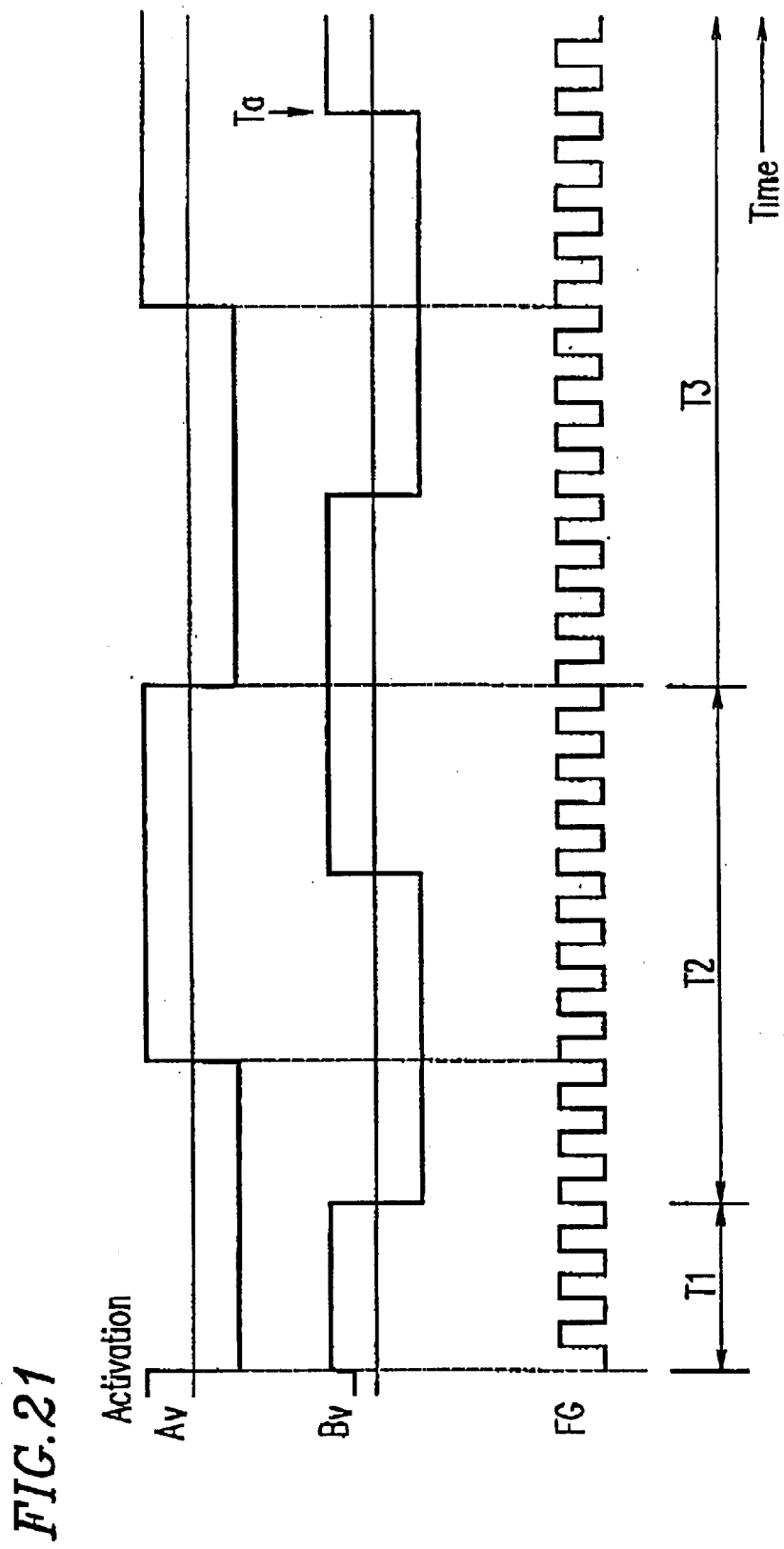
FIG. 21 is a timing chart showing a temporal relationship between driving voltages applied to exciting coils of conventional A-phase and B-phase stators, and an output of a position detecting means.
Figure 22:
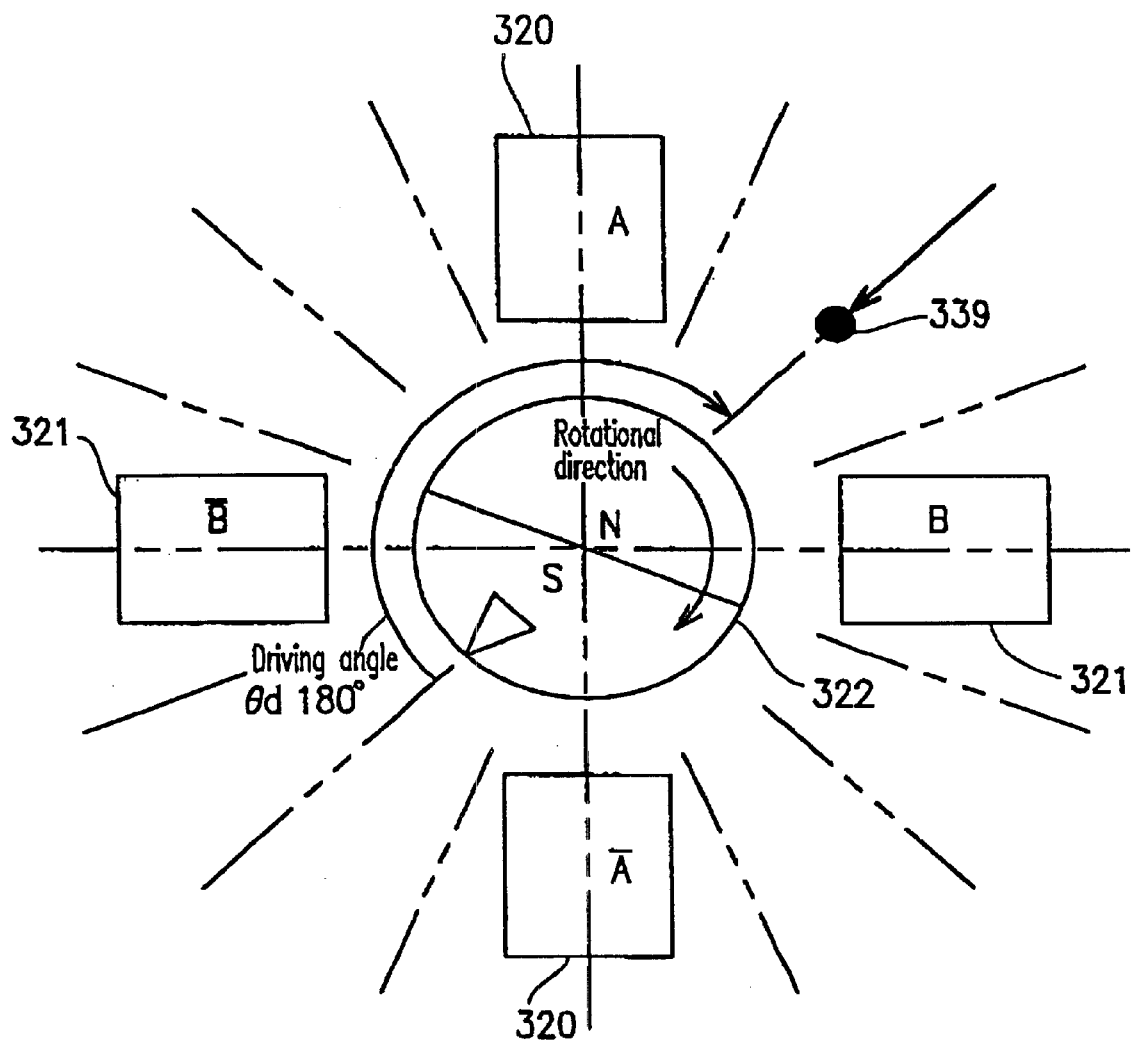
FIG. 22 is a diagram showing a conventional relationship of a phase between a rotor and driving with respect to the time of Ta in FIG. 21.
Figure 23:
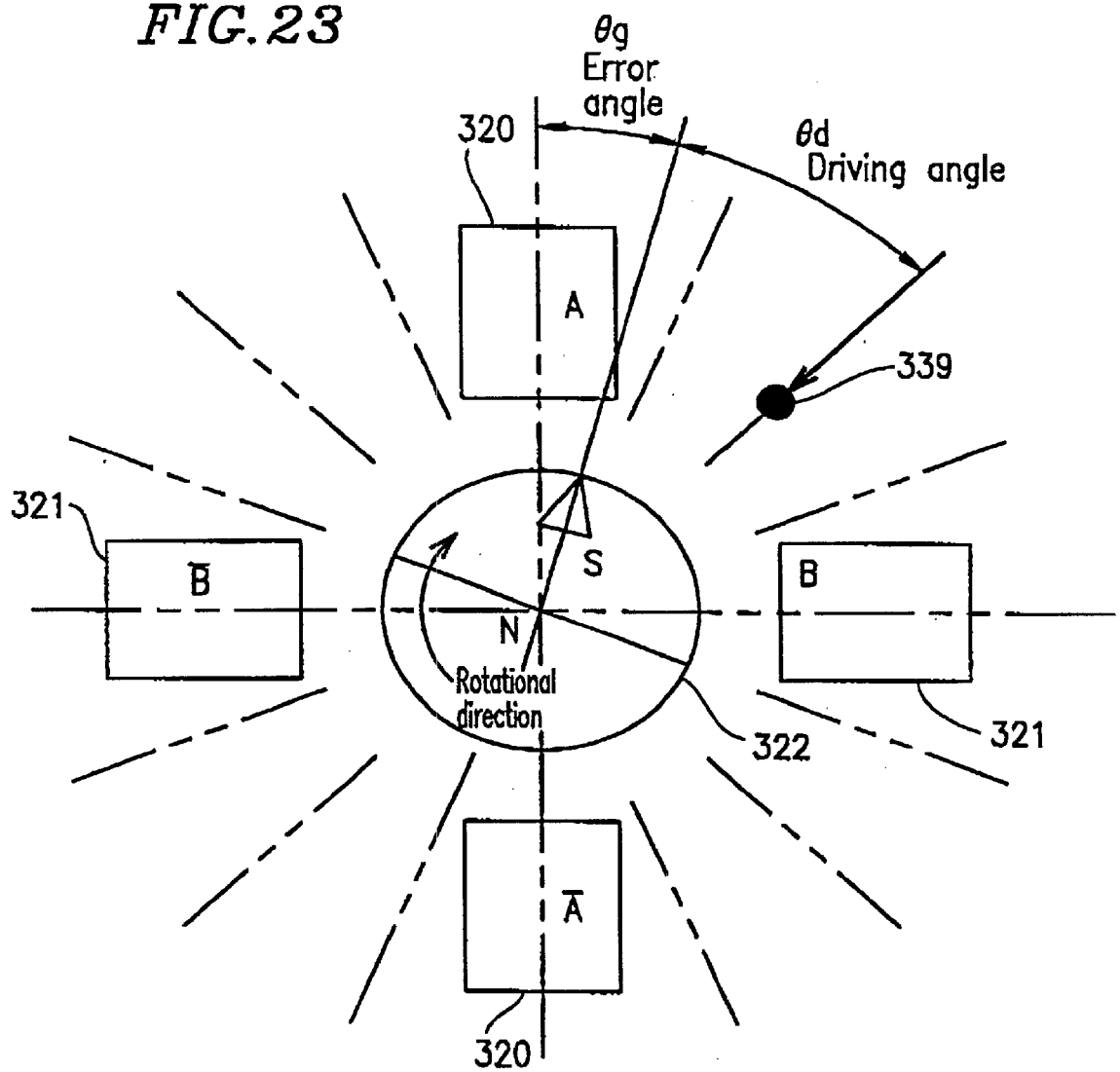
FIG. 23 is a diagram showing a conventional relationship between the position of a rotor and an electromagnetic force when the position of the rotor is shifted towards a rotational direction.
Figure 24:
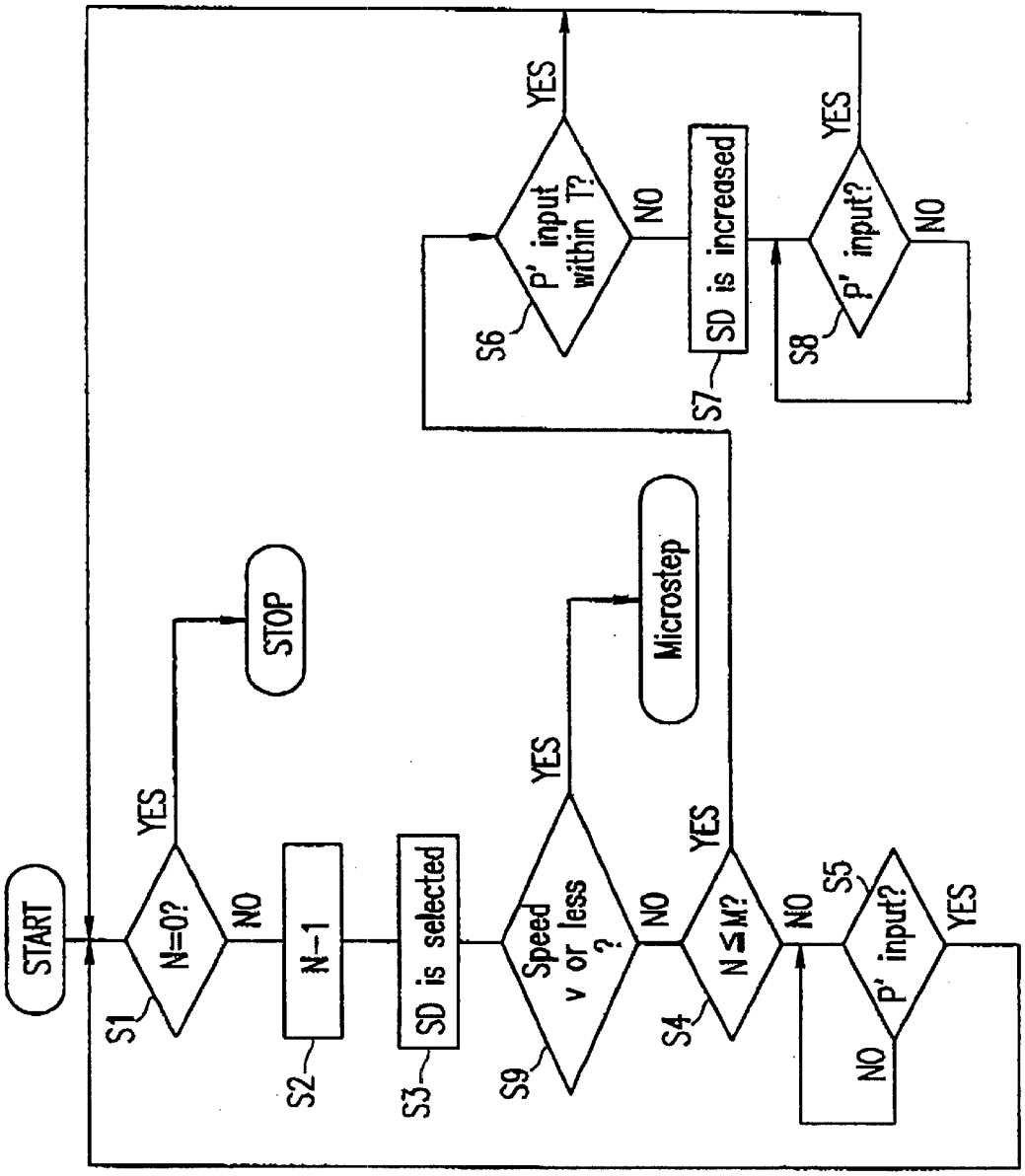
FIG. 24 is a flowchart used for explaining a conventional speed control operation.
Figure 25A:
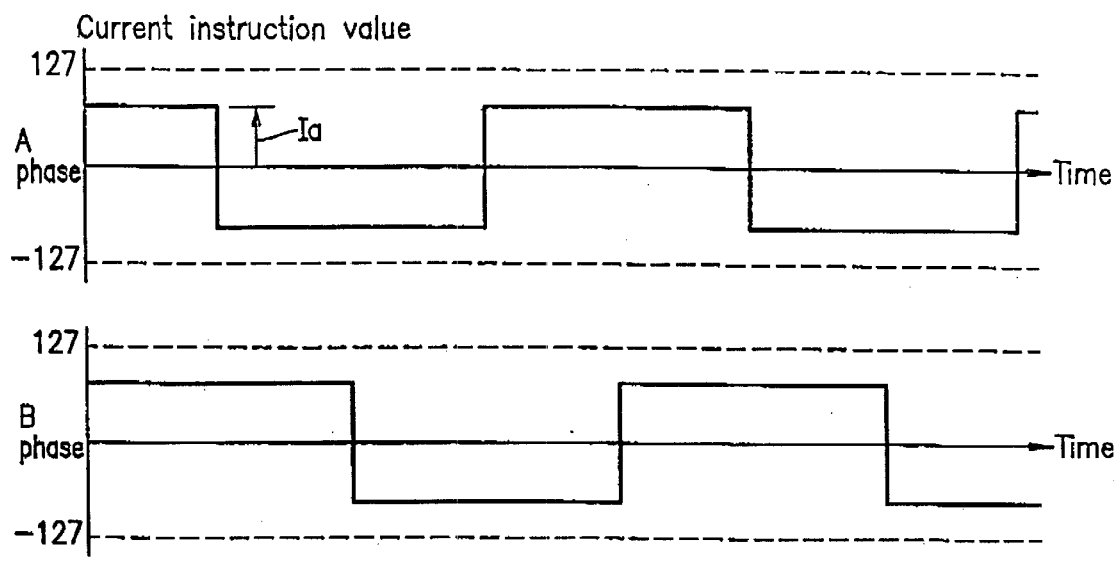
FIGS. 25A and 25B are diagrams used for explaining an excitation sequence, showing a time-varying current command value output from an instruction amplitude control means and a microstep driving means.
Figure 25B:
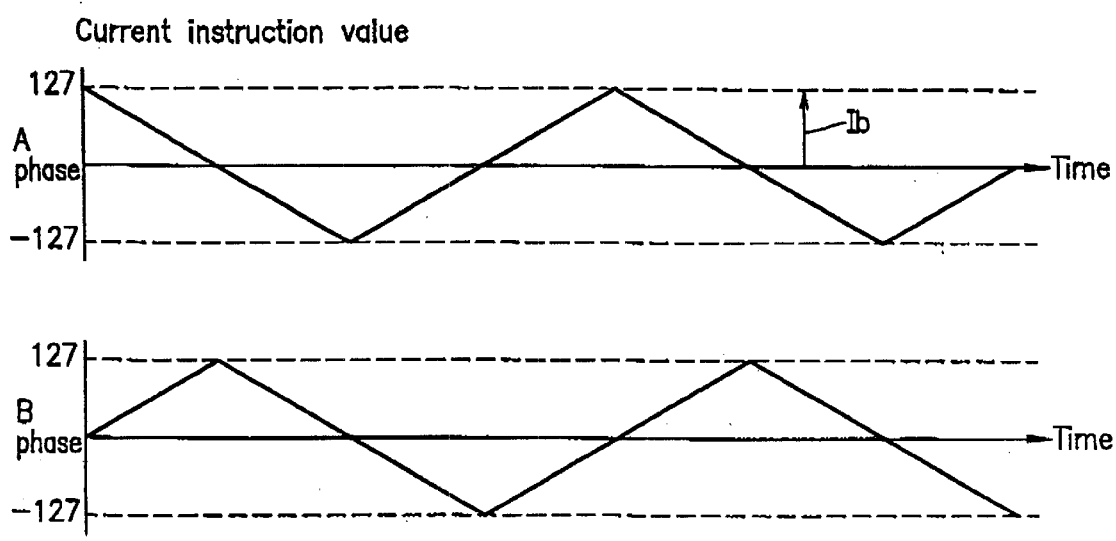
Figure 26A:
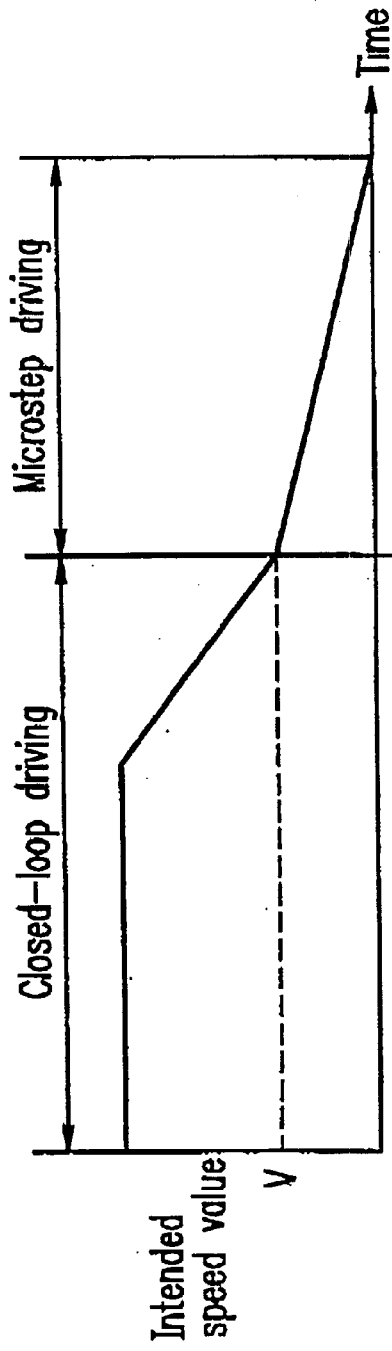
FIGS. 26A and 26B are a conventional profile of an intended speed of a rotor and a conventional time chart of a current command value output from a command value selector.
Figure 26B:
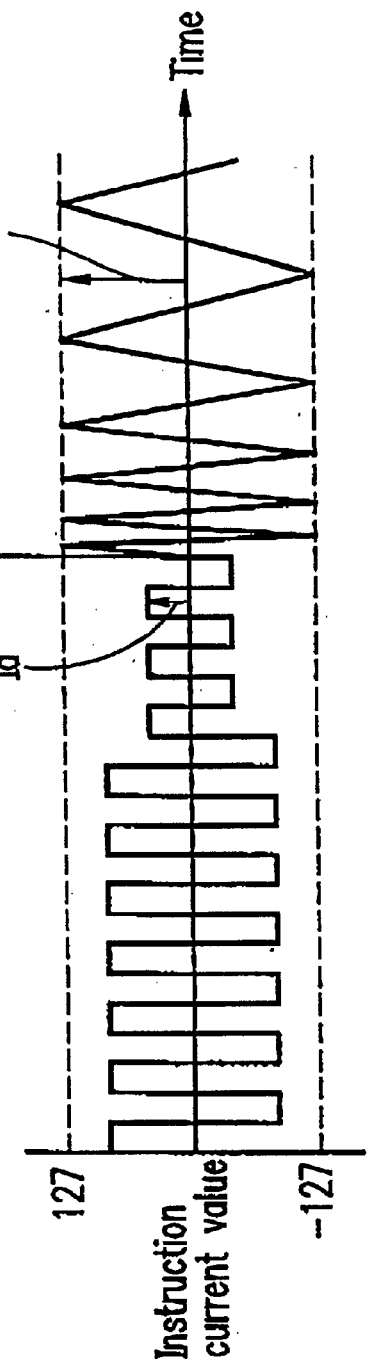

First, as shown in FIG. 19B, in the intended speed profile of Example 7, a decelerating value in microstep driving is smaller than a decelerating value in close-loop driving. In the intended speed profile, the same decelerating value is used from a time when closed-loop driving is switched to microstep driving to a time of halt. Speed control can advantageously be easy in microstep driving.

As shown in FIG. 19A, the amplitude Ib of a current command value output from microstep driving means 236 has a relationship with the amplitude Ia of a current command value in closed-loop driving, the relationship being represented by $$Ib=k''\cdot|Ia-b'|+C'' \quad \text{(formula 7)}$$

where k", b', and C" are positive constants. Further, Ia is positive when a driving current is supplied to a stepping motor in an acceleration direction while Ia is negative when a driving current is supplied to a stepping motor in a deceleration direction.

In this case, k", b', and C" are equal to 0.86, 15, and 30, respectively, in Example 7. Formula 7 defines a relationship between Ia and Ib in which Ib can be met to as small a value as possible in a range in which out-of-step does not occur.

The relationship of formula 7 will be described below. In closed-loop driving, the state of a frictional load is assumed in which an intended decelerating value is equal to an accelerating value of natural deceleration. This state requires the least driving torque for deceleration, so that Ia=0. In the state of a frictional load where Ia=0, when closed-loop driving is switched to microstep driving, the intended decelerating value is reduced. Therefore, driving towards the acceleration direction is required. Since a certain level of driving torque is required for prevention of out-of-step. Ib needs to take a predetermined amplitude.

Specifically, a predetermined amplitude Ib is required for Ia=0 (Ib k"b'+C" in Example 7).

Next, it is assumed that a frictional load in decreased for the state that Ia=0. A further amount of driving torque in the deceleration direction is required to maintain an intended decelerating value. The value of Ia a large in the negative direction in closed-loop driving. In microstep driving, a greater force 18 required for driving in the acceleration direction. In order to avoid out-of-step, Ib needs to be increased. Specifically, a relationship is reqiured in which if Ia is increased in the negative directions Ib is also increased.

Further, it is assumed that a frictional load is increased with respect to the state that Ia=0. A further amount of driving in an acceleration direction is required in order to retain an intended decelerating value. In closed-loop driving, Ia is large in the positive direction. In this case, a change in an accelerating value of natural deceleration when Ia is increased in the positive direction, is equal to an intended decelerating value in closed-loop driving when Ia=0. As Ia is increased in the positive direction (a frictional load is increased), the accelerating value of the natural deceleration increased. At a certain point (where Ia=b'), the accelerating value of the natural deceleration is equal to an intended decelerating value in microstep driving.

In this state of a frictional load, out-of-step is most unlikely to occur in microstep driving. Since substantially no driving force is required, Ib can be related to the least amplitude value (C"). Specifically, when Ia=b', Ib=C".

It is assumed that the frictional load is further increased as compared to when Ia=b'. The accelerating value of the natural deceleration is larger than the accelerating value in microstep driving. Driving torque in the deceleration direction is required. In order to prevent out-of-step, Ib needs to be increased. Specifically, in View of Ia=b', a relationship between Ia and Ib is required in which the larger the value of Ia, the larger the value of Ib.

As described above, in the intended speed profile shown in FIG. 19B, Ia and Ib need to have a relationship as shown in FIG. 19A so that Ib can be set to as small a value as possible in a range in which out-of-step does not occur.

As described above, the amplitude Ib of a current command value in microstep driving and the amplitude Ia of a current command value in closed-loop driving have the relationship shown in (formula 7). Ib is set to as small a value as possible in a range in which out-of-step does not occur. Thus, when closed-loop driving is switched to microstep driving, the driving means 211 reduces the amplitudes of driving currents supplied to the A- and B-phase stators 203 and 204, thereby suppressing a sudden change in a driving force generated upon the switching. Therefore, it is possible to reduce an impact or unnecessary vibration occurring upon switching.

Further, according to Example 7, even when a frictional load is large, or when a frictional load is small and a subject to be controlled has a great inertial force which causes the subject to retain its speed, the amplitude Ib of a current command value in microstep driving is increased depending on the magnitudes of a frictional load and an inertial force. Therefore, an attraction force between the rotor 202, and the A- and B-phase stators 203 and 204 can be increased, thereby preventing out-of-step.

It should be noted that in the above descriptions in Examples 1–7 of the present invention, the devices for controlling a stepping motor are applied to head driving for an optical disk drive. The present invention is not limited to this. The present invention can be applied to a number of devices for controlling a stepping motor other than those devices.

INDUSTRIAL APPLICABILITY

As described above, according to the present invention, an instruction generating means switches between a first command value for supplying a positive first driving current to an excitation coil, a second command value for supplying a negative second driving current whose direction is reverse to that of the first driving current to an excitation coil, and a third command value for supplying a third driving current taking a value between the first and second driving currents to an excitation coil. Even if an error angle exists, actuation can be performed at the same driving angle. A phase advancing time can substantially be further increased. Therefore, a high speed can be obtained without deteriorating the stability at a low rotation range.

Further, when the instruction generating means generates the third command value, a command value in which a lead angle in excitation is increased in such a direction to compensate a delay in excitation due to the inductance of an excitation coil, is generated. Thereafter, a command value in which the lead angle in excitation is smaller than that lead angle is generated, depending on an output of a timer means. Therefore, a further substantially increased phase advanced time can be obtained where a driving angle is unchanged, thereby obtaining a high speed without deteriorating stability in a low rotation operation.

A control means for switching between first, second, and third operation modes generates a command value to the command value generating means in accordance with a timing generated by the control means itself when a stepping motor is rotated by a predetermined amount. Thereafter, in the is second operation mode which is switched to the third operation mode, the instruction generating means generates the first command value for supplying a positive first driving current to an excitation coil, the second command value for supplying a negative second driving current whose direction is reverse to that of the first driving current to an excitation coil, and the third command value for supplying a third driving current taking a value between the first and second driving currents to an excitation coil. Further, the control means causes the command value generating means to generate different command values, depending on the angular positions of a rotor, thereby increasing angular positions at which driving is performed by an electromagnetic force, and decreasing variations in a rotation angle. Therefore, even if there exist an error angle of a certain size, actuation can be performed by a driving angle which results in maximum torque. The possibility of actuation failure can be significantly reduced.

Further, according to the present invention, a reference value varies depending on a current speed. Therefore, a decrease in a speed can be reliably detected for any speed. The out-of-control in a high speed range can be detected in a short time. Further, erroneous detection of the out-of-control in a low rotation range can be prevented. An output voltage is gradually increased over time. Moreover, similar to typical control, the increase of the output voltage is proportional to a speed error. Therefore, even if a driving system has variations in the frictional load of a motor or a transmission system, or the like, a halt of the motor can be certainly prevented and large overshoot does not occur.

Further, according to the present invention, when closed-loop driving is switched to microstep driving, if the amplitude of a driving current in closed-loop driving is small, the amplitude of a driving current in microstep driving is set to a small value. Therefore, when closed-loop driving is switched to microstep driving, a sudden change in the driving current does not occur. Out-of-step due to the occurrence of unnecessary vibration and the sudden halt of a rotor can be prevented. Thereby, stable speed control can be obtained.

Further, a decelerating value in closed-loop driving is substantially the same as a decelerating value in microstep driving. When closed-loop driving is switched to microstep driving, there is no change in an accelerating value, thereby preventing the occurrence of unnecessary vibration.

What is claimed is:
1. A stepping motor control device, comprising:
   a stepping motor including a rotor having magnetic poles equally spaced in a circumferential direction at intervals of an angle of $\theta°$, and M-phase excitation coils (M is an integer greater than or equal to two, and the M-phase does not include a reverse phase);
   driving means for supplying a driving current having a plurality of levels to the excitation coil in accordance with command values;
   command value generating means for generating the command value, where the driving current takes a different value having at least K levels (K is an integer);

rotational angle detecting means for generating n pulses (n is an integer satisfying n≧M·K) corresponding to rotation of the rotor; and excitation switching timing generating means for selecting pulses from the n pulses of the rotational angle detecting means in a predetermined order, and generating an excitation switching timing in the K levels to each M-phase excitation coil, wherein in accordance with an output of the excitation switching timing generating means, the command value generating means switches between a first command value for supplying a positive first driving current to the excitation coils, a second command value for supplying a negative second driving current whose direction is reverse to that of the first driving current to the excitation coils, and a third command value for supplying a third driving current taking a value between the first and second driving currents to the excitation coils, where K is three or more, and generates a command value which causes a lead angle in excitation to be increased in such a direction as to compensate a delay in excitation due to inductance of the excitation coils, and thereafter, generates a command value which causes a lead angle in excitation to be smaller than that lead angle.

2. A stepping motor control device according to claim 1, wherein the command value generating means includes timer means, and wherein when the command value generating means generates the third command value, the command values are switched in accordance with an output of the timer means.

3. A stepping motor control device according to claim 2, wherein when the command value generating means outputs the third command value, the command value generating means generates a command value which causes a large lead angle in excitation in such a direction as to compensate an excitation delay due to inductance of the excitation coils, and thereafter, generates a value which causes a lead angle in excitation smaller than that lead angle in accordance with an output of the timer means.

4. A stepping motor control device, comprising:

a stepping motor including a rotor having magnetic poles equally spaced in a circumferential direction at intervals of an angle of θ°, and M-phase excitation coils (M is an integer greater than or equal to two, and the M-phase does not include a reverse phase);

driving means for supplying a driving current having a plurality of levels to the excitation coils in accordance with command values;

command value generating means for generating the command value where the driving current takes a different value having at least K levels (K is an integer);

rotational angle detecting means for generating n pulses (n is an integer satisfying n≧M·K) corresponding to rotation of the rotor;

excitation switching timing generating means for selecting pulses from the n pulses of the rotational angle detecting means in a predetermined order, and generating an excitation switching timing in the K levels to each M-phase excitation-coil;

control means for switching between first, second, and third operation modes, wherein in the first operation mode, microstep driving is performed by the driving means, and the rotor is held at a predetermined angular position when the stepping motor is at rest, in the second operation mode, when the stepping motor is rotated by a predetermined amount or more, the command value generating means is caused to generate a command value in accordance with a timing generated by the control means itself, and thereafter, the second operation mode is switched to the third operation mode, in the third operation mode, the stepping motor is controlled by changing the command value in accordance with an output of the excitation switching timing means, and wherein in the second operation mode, the command value generating means generates a first command value for supplying a positive first driving current to the excitation coils, a second command value for supplying a negative second driving current whose direction is reverse to that of the first driving current to the excitation coils, and a third command value for supplying a third driving current taking a value between the first and second driving currents to the excitation coils, and generates different command values to the command value generating means in accordance with an angular position of the rotor by the control means.

5. A stepping motor control device according to claim 4, wherein the third command value in the second operation mode of the control means is a constant value designed in such a manner that a driving current to the excitation coils is zero.

6. A stepping motor control device for controlling a speed of a subject to be controlled by a driving current to the stepping motor, comprising:

displacement detecting means for generating a detection pulse signal in accordance with a predetermined amount of displacement of the subject to be controlled;

timer means for measuring a time interval from the last detection pulse signal to the present time;

control means for changing the driving current when an output of the timer means exceeds a predetermined reference value; and reference value updating means for updating the reference value in accordance with an output of the displacement detecting means.

7. A stepping motor control device according to claim 6, wherein the reference value updating means includes:

speed detecting means for detecting a speed of the subject to be controlled by measuring a time interval between each detection signal generated by the displacement detecting means; and converting means for converting an output of the speed detecting means to the reference value in accordance with predetermined correspondence, and wherein an output of the converting means is updated as a reference value every time the displacement detecting means generates the detection signal.

8. A stepping motor control device according to claim 7, wherein the converting means calculates an allowable speed based on an output of the speed detecting means and a predetermined allowable accelerating value, and generates the reference value in such a manner as to be proportional to an inverse of the allowable speed.

9. A stepping motor control device, comprising:

a stepping motor including a rotor and a plurality of excitation coils;

displacement detecting means for generating a detection pulse signal corresponding to a rotational displacement of the rotor;

driving means for supplying a driving current to each excitation coil in accordance with an input command value;

control means for controlling the stepping motor by changing the command value supplied to the driving means in accordance with a timing corresponding to the detection pulse signal of the displacement detecting means; and timer means for measuring a time interval from the last detection pulse signal to the present time, wherein the control means changes a ratio of a driving current supplied to each excitation coil by changing the command value when an output of the timer means exceeds a reference value.

10. A stepping motor control device according to claim 9, further comprising means for changing the ratio of the driving current in such a direction as to delay an excitation phase of the stepping motor when a change in an intended speed is in a deceleration direction.

11. A stepping motor control device for controlling a speed of a subject to be controlled by a driving current to the stepping motor, comprising:

displacement detecting means for generating a detection signal corresponding to a predetermined amount of displacement of the subject to be controlled;

timer means for measuring a time interval from the last detection signal to the present time; and control means for changing the driving current when an output of the timer means exceeds a predetermined reference value, wherein a change in the driving current is increased in accordance with an output of the timer means.

12. A stepping motor control device, comprising:

a stepping motor including a rotor and at least one excitation coil;

driving means for supplying a driving current to the excitation coils in accordance with an input command value;

control means for controlling the stepping motor by changing the command value supplied to the driving means;

displacement detecting means for generating a detection signal corresponding to a rotational displacement of the rotor; and timer means for measuring a time interval from the last detection signal to the present time, wherein the control means switches between a first operation mode and a second operation mode, changes the command value supplied to the driving means in accordance with a timing generated by the control means itself in the first operation mode, and changes the command value supplied to the driving means in accordance with a timing corresponding to the detection signal of the displacement detecting means in the second operation mode, to control the stepping motor, and wherein the control means switches the operation mode from the second operation mode to the first operation mode when an output of the timer means exceeds a predetermined reference value.

13. A stepping motor control device according to claim 12, wherein the reference value is a predetermined constant value.

14. A stepping motor control device according to claim 12, further comprising:

reference value updating means for updating the reference value in accordance with an output of the displacement detecting means, wherein an output of the speed detecting means is updated by converting to the reference value in accordance with correspondence predetermined by the reference value updating means every time the displacement detecting means generates the detection signal.

15. A stepping motor control device, comprising:

a stepping motor including an armature and an excitation coil;

control means for controlling an amplitude and an excitation phase of a driving current supplied to the excitation coils; and a position detecting means for generating a detection signal corresponding to a position of the armature, wherein the control means provides a first operation mode and a second operation mode, the first and second operation modes being capable of being switched, in the first operation mode, an excitation phase of the driving current is controlled in accordance with a timing corresponding to the detection signal of the position detecting means, in the second operation mode, an excitation phase of the driving current is controlled in accordance with a timing generated by the control means itself, and when an operation mode of the control means is switched from the first operation mode to the second operation mode, a maximum amplitude of the driving current in the second operation mode is designed in accordance with an amplitude of the driving current in the first operation mode.

16. A stepping motor control device according to claim 15, wherein the control means performs speed control of the stepping motor in accordance with a predetermined intended speed profile, the control means decelerates the stepping motor with a first decelerating value in the first operation mode, and thereafter, decelerates the stepping motor with a second decelerating value in the second operation mode, the control means sets the first and second decelerating values to substantially the same value, and as an amplitude of the driving current in the first operation mode is decreased, an amplitude of the driving current in the second operation mode is decreased.

17. A stepping motor control device according to claim 16, wherein an amplitude Ia of the driving current in the first operation mode and an amplitude Ib of the driving current in the second operation mode have a relationship represented by $$Ib = k \cdot |Ia| + C$$

where k and C are positive constants, Ia is positive when the driving current is supplied in such a direction as to accelerate the stepping motor and is negative when the driving current is supplied in such a direction as to decelerate the stepping motor.

18. A stepping motor control device according to claim 16, wherein the control means performs speed control of the stepping motor in accordance with a predetermined intended speed profile, the control means decelerates the stepping motor with a first decelerating value in the first operation mode, and thereafter, decelerates the stepping motor with a second decelerating value in the second operation mode, the control means sets the first and second decelerating values so that the first decelerating value is greater than the second decelerating value, and an amplitude Ia of the driving current in the first operation mode and an amplitude Ib of the driving current in the second operation mode have a relationship represented by $$Ib = k' \cdot |Ia+b| + C'$$

where k', b, and C' are positive constants, Ia is positive when the driving current is supplied in such a direction as to accelerate the stepping motor and is negative when the driving current is supplied in such a direction as to decelerate the stepping motor.

19. A stepping motor control device according to claim 16, wherein the control means performs speed control of the stepping motor in accordance with a predetermined intended speed profile, the control means decelerates the stepping motor with a first decelerating value in the first operation mode, and thereafter, decelerates the stepping motor with a second decelerating value in the second operation mode, the control means sets the first and second decelerating values so that the first decelerating value is smaller than the second decelerating value, and an amplitude Ia of the driving current in the first operation mode and an amplitude Ib of the driving current in the second operation mode has a relationship represented by $$Ib = k'' \cdot |Ia-b'| + C''$$

where k'', b', and C'' are positive constants, Ia is positive when the driving current is supplied in such a direction as to accelerate the stepping motor and is negative when the driving current is supplied in such a direction as to decelerate the stepping motor.

20. A stepping motor control device according to claim 4, wherein in the second operation mode, the command value generating means generates a first command value for supplying a positive first driving current to the excitation coils, a second command value for supplying a negative second driving current whose direction is reverse to that of the first driving current to the excitation coils, and a third command value for supplying a third driving current taking a value between the first and second driving currents to the excitation coils, and generates different command values in accordance with an angular position of the rotor in the first operation mode by the control means, and wherein an angle at which the rotor is intended to be rotated by an electromagnetic force ranges from 90° to 135°.

* * * * *